(12) United States Patent
Kelly et al.

(10) Patent No.: US 6,421,611 B1
(45) Date of Patent: Jul. 16, 2002

(54) METHOD FOR DETERMINATION OF PAY SATURATION FROM SEISMIC DATA

(75) Inventors: Michael C. Kelly, Spokane, WA (US); Charles M. Skidmore, Tulsa, OK (US); Raymond D. Cotton, Broken Arrow, OK (US); William P. May; Richard O. Lindsay, both of Tulsa, OK (US); Davis W. Ratcliff, Houston, TX (US)

(73) Assignee: Emerald Geoscience Research Corporation, Houston, TX (US)

( * ) Notice: Subject to any disclaimer, the term of this patent is extended or adjusted under 35 U.S.C. 154(b) by 0 days.

(21) Appl. No.: 09/393,867

(22) Filed: Sep. 10, 1999

Related U.S. Application Data
(60) Provisional application No. 60/100,033, filed on Sep. 11, 1998.

(51) Int. Cl.⁷ .................................................. G01V 1/28
(52) U.S. Cl. ........................................................ 702/18
(58) Field of Search .............................. 702/14, 16, 17, 702/18; 367/73

(56) References Cited

U.S. PATENT DOCUMENTS
4,596,005 A * 6/1986 Frasier ........................ 702/14

* cited by examiner

Primary Examiner—Donald E. McElheny, Jr.
(74) Attorney, Agent, or Firm—John W. Montgomery; Haynes and Boone, LLP

(57) ABSTRACT

Methods for determination of pay saturation ($S_{PAY}$) and water saturation ($S_w$) from surface seismic data use amplitude changes with angle of incidence in conjunction with rock property relationships to determine pay saturation for a variety of situations. These situations include cases where P-P data is used and anisotropy and absorption are negligible; cases where P-P data is used and anisotropic effects are important; cases where contact events are evident; and cases where P-S data is used and anisotropy and absorption are negligible.

26 Claims, 12 Drawing Sheets

⊞ Cross: 0.50026, 0   Center: 0.47551, −0.14967   Scale: 0.13125 : 0.0625

⊞ Cross: 0.50041, 0.1    Center: 0.50041, 0.07    Scale: 0.1375 : 0.02

⊞ Cross: 0.50012, 0.074751   Center: 0.46736, 0.14003   Scale: 0.13322 : 0.040007

METHOD FOR DETERMINATION OF PAY SATURATION FROM SEISMIC DATA

CROSS REFERENCE TO RELATED APPLICATIONS

This application claims the benefit of U.S. Provisional Application No. 60/100,033, filed Sep. 11, 1998.

BACKGROUND OF THE INVENTION

This invention relates generally to processing seismic trace data, and more specifically, it relates to methods for processing seismic trace data into estimations of hydrocarbon saturation. Existing methods for determining water saturation $S_w$ or pay saturation $S_{PAY}$ from seismic trace data is restricted to pre-stack isotropic P-P data. In addition, most existing methods make assumptions about the relationships between the rock properties for the reservoir. These assumptions limit either the accuracy or applicability of the technique.

SUMMARY OF THE INVENTION

The method of the present invention overcomes these problems with existing methods, by providing a methods which apply to pre-stack P-P data and to P-P angle stacked data for both the isotropic and, the more general, anisotropic case. In addition, the present invention provides a method for water and pay saturation determination from P-S data.

DETAILED DESCRIPTION OF THE INVENTION

A number of methods will be outlined for determining hydrocarbon saturation from both P-P and P-S data. Each method will be applicable to areas and zones in which certain assumptions are satisfied. These assumptions, as well as the methods, will be described in some detail below.

Method 1

In the case where the cap rock and the reservoir are each isotropic, and the data type is P-P, the equations which describe the amplitude variation with offset and hence angle of incidence ($\theta$), due to a reflection between the cap rock and reservoir, is given by:

$$AMP(\theta)=A+B\ SIN^2\theta+C(TAN^2\theta-SIN^2\theta) \quad \text{Equation 1}$$

Where:

$$A = \frac{1}{2}\frac{\Delta Vp}{Vp} + \frac{1}{2}\frac{\Delta\rho}{\rho}$$

$$B = \frac{1}{2}\frac{\Delta Vp}{Vp} - \frac{2}{g^2}\left(2\frac{\Delta Vs}{Vs} + \frac{\Delta\rho}{\rho}\right) + \frac{1}{2}\Delta\delta$$

$$C = \frac{1}{2}\frac{\Delta Vp}{Vp} + \frac{1}{2}\Delta\varepsilon$$

Or by:

$$AMP(\theta)=B_0+B_1\ TAN^2\theta+B_2\ TAN^2\theta\ SIN^2\theta \quad \text{Equation 2}$$

Where:

$$B_0 = A = \frac{1}{2}\frac{\Delta Vp}{Vp} + \frac{1}{2}\frac{\Delta\rho}{\rho}$$

$$B_1 = B = \frac{1}{2}\frac{\Delta Vp}{Vp} - \frac{2}{g^2}\left(2\frac{\Delta Vs}{Vs} + \frac{\Delta\rho}{\rho}\right)$$

$$B_2 = C - B = \frac{2}{g^2}\left(2\frac{\Delta Vs}{Vs} + \frac{\Delta\rho}{\rho}\right)$$

Where:

$$g = \frac{\overline{Vp}}{\overline{Vs}}$$

$$\frac{\Delta Vp}{\overline{Vp}} = \frac{Vp_2 - Vp_1}{\overline{Vp}}$$

$$\frac{\Delta Vs}{\overline{Vs}} = \frac{Vs_2 - Vs_1}{\overline{Vs}}$$

$$\frac{\Delta\rho}{\overline{\rho}} = \frac{\rho_2 - \rho_1}{\overline{\rho}}$$

$$\overline{Vp} = \frac{Vp_1 + Vp_2}{2}$$

$$\overline{Vs} = \frac{Vs_1 + Vs_2}{2}$$

$$\overline{\rho} = \frac{\rho_1 + \rho_2}{2}$$

The subscript values 1 and 2, as in $V_{p1}$ and $V_{p2}$ should be interpreted as follows. "1" indicates the properties of the layer above the interface, while "2" indicates the properties of the layer below.

Figure 1:
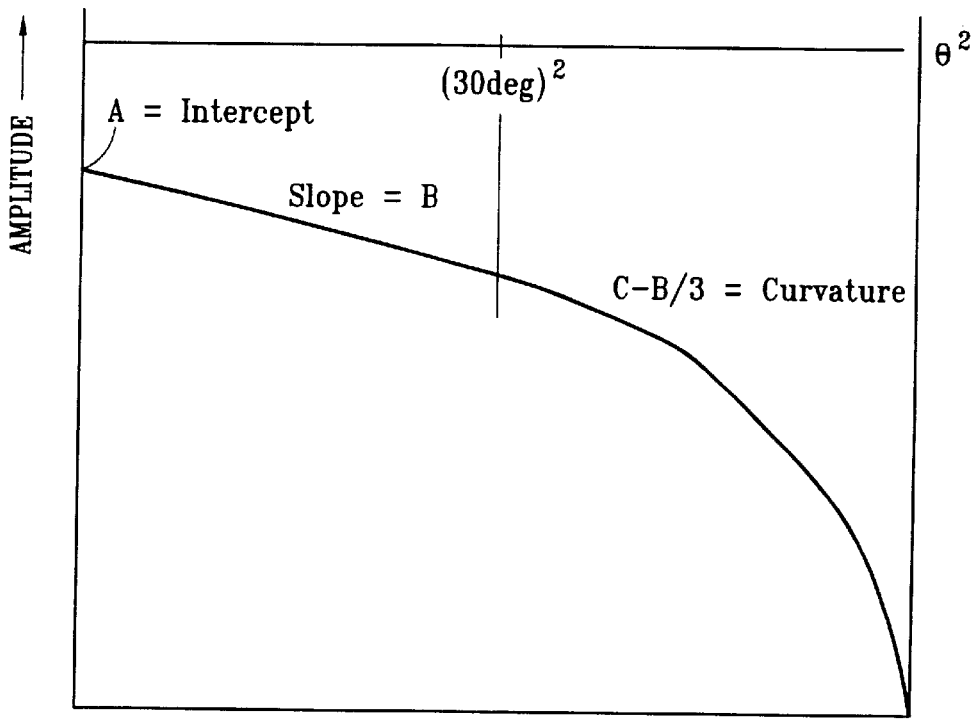
FIG. 1 illustrates the AVO signature that results from using Equation 1.
Figure 2:
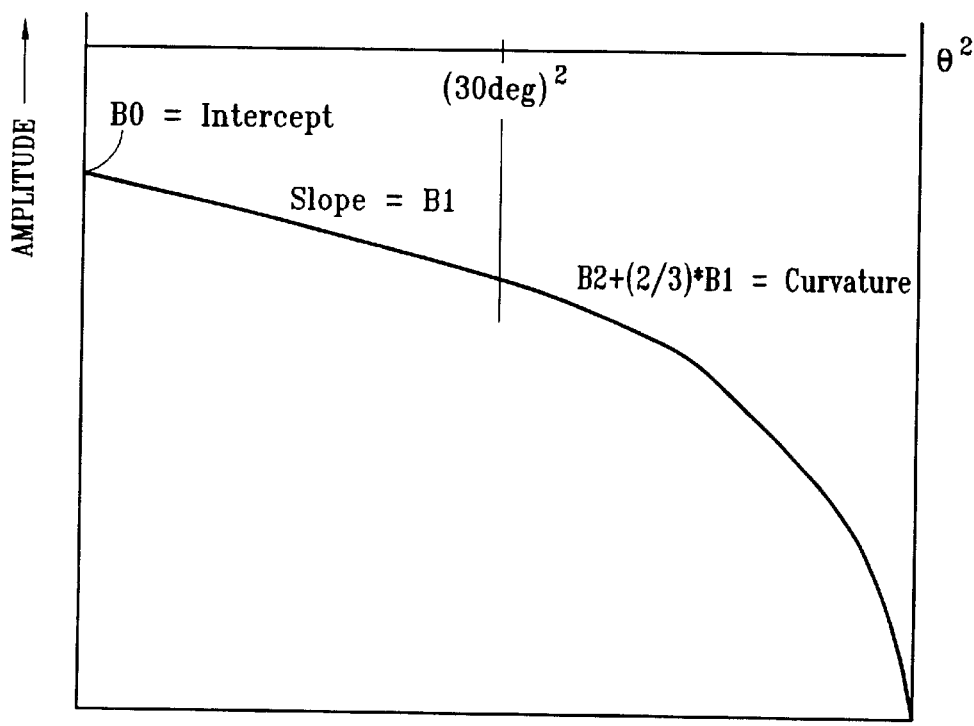
FIG. 2 illustrates the AVO signature that results from using Equation 2.

The rock property contrasts can be solved for in terms of the curve shape parameters. FIGS. 1 and 2 show the AVO ("amplitude versus offset") signature that results from using Equations 1 and 2. Note the significance of the curve shape parameters A, B and C, or $B_0$, $B_1$ and $B_2$.

$$\frac{\Delta \rho}{\rho} = 2(A - C) \quad \text{Equation 3}$$

$$\frac{\Delta Vp}{Vp} = 2C \quad \text{Equation 4}$$

$$\frac{\Delta Vs}{Vs} = (C - A) + \frac{g^2}{4}(C - B) \quad \text{Equation 5}$$

Or:

$$\frac{\Delta \rho}{\rho} = 2(B_0 - B_1 - B_2) \quad \text{Equation 6}$$

$$\frac{\Delta Vp}{Vp} = 2C = 2(B_1 + B_2) \quad \text{Equation 7}$$

$$\frac{\Delta Vs}{Vs} = B_0 - B_1 - B_2\left(1 + \frac{g^2}{4}\right) \quad \text{Equation 8}$$

The water saturation, $S_w$ is given by:

$$S_w = \frac{\Delta \rho}{\phi(\rho_{BR} - \rho_{PAY})} \quad \text{Equation 9}$$

$$S_w = \frac{2(A - C)\bar{\rho}}{\phi(\rho_{BR} - \rho_{PAY})} \quad \text{Equation 10}$$

Where:

A and C are the data derived curve fit coefficients;

$\Delta \rho$ is the density contrast between the cap rock and the pay filled reservoir;

$\rho_{PAY}$ is the density of the pure pay fluid in situ;

$\rho_{BR}$ is the density of the pure brine fluid in situ;

$\bar{\rho}$ is the average density of the fluid filled reservoir and the shale cap rock; and $\phi$ is the porosity of the reservoir.

The four parameters—$\rho_{PAY}$, $\rho_{BRINE}$, $\bar{\rho}$, $\phi$—can be accurately estimated for a specific case.

Figure 3:
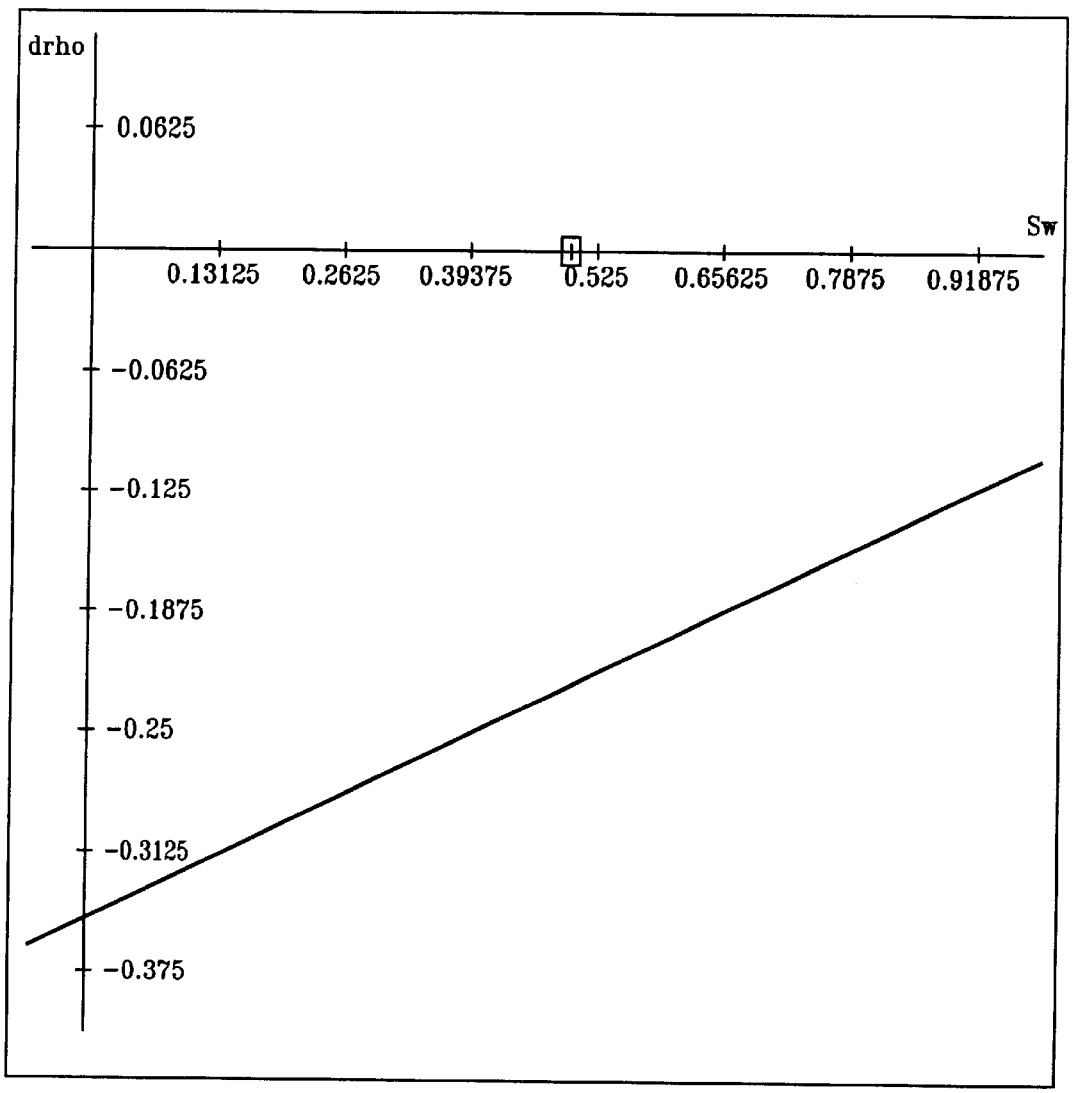
FIG. 3 shows the density contrast $\Delta\rho$ as a function of the water saturation $S_w$.

FIG. 3 shows the density contrast $\Delta \rho$ as a function of the water saturation $S_w$.

Finally, since:

$$S_{PAY} = 1 - S_w \quad \text{Equation 11}$$

Then:

$$S_{PAY} = 1 - \frac{2(A - C)\bar{\rho}}{\phi(\rho_{BR} - \rho_{PAY})} \quad \text{Equation 12}$$

Figure 4:
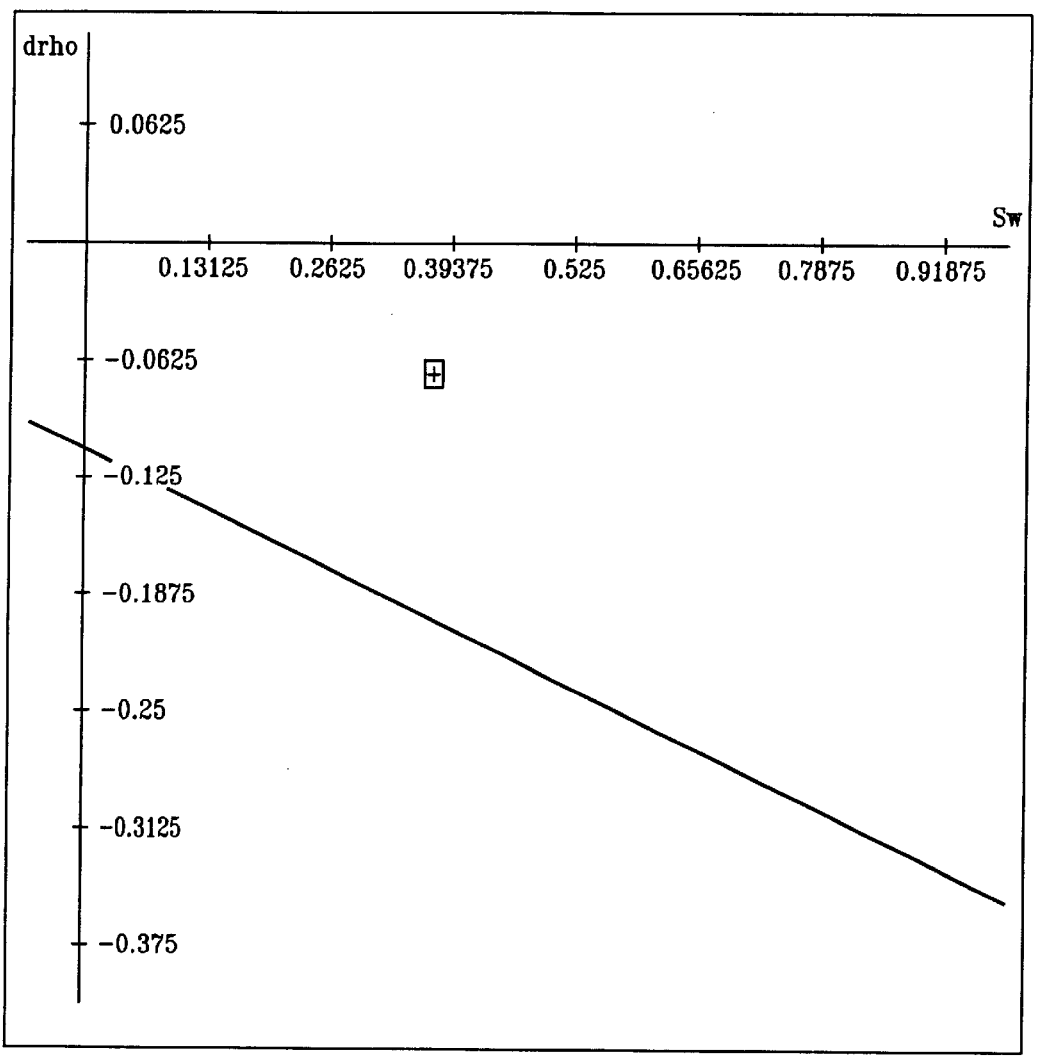
FIG. 4 shows the density contrast $\Delta\rho$ as a function of the water saturation $S_{PAY}$.

FIG. 4 shows the density contrast $\Delta \rho$ as a function of the pay saturation $S_{PAY}$.

Or, in terms of $B_0$, $B_1$ and $B_2$:

$$S_w = \frac{\Delta \rho}{\phi(\rho_{BR} - \rho_{PAY})} \quad \text{Equation 13}$$

$$S_W = \frac{2(B_0 - B_1 - B_2)\bar{\rho}}{\phi(\rho_{BR} - \rho_{PAY})} \quad \text{Equation 14}$$

Where:

$B_0$, $B_1$ and $B_2$ are the data derived curve fit coefficients;

$\Delta \rho$ is the density contrast between the cap rock and the pay filled reservoir;

$\rho_{PAY}$ is an estimate of the density of pay fluid in situ;

$\rho_{BR}$ is an estimate of the density of brine fluid in situ;

$\bar{\rho}$ is an estimate of the average density of the fluid filled reservoir and the cap rock; and $\phi$ is an estimate of the porosity of the reservoir.

The four parameters—$\rho_{PAY}$, $\rho_{BRINE}$, $\bar{\rho}$, $\phi$—can be accurately estimated for a specific case.

Finally, using equation 11, then $$S_{PAY} = 1 - \frac{2(B_0 - B_1 - B_2)\bar{\rho}}{\phi(\rho_{BR} - \rho_{PAY})} \quad \text{Equation 15}$$

Method 2

The next method applies where either the cap rock or the reservoir, or both, are anisotropic. In that case, the equations which describe the amplitude variation with offset, and hence angle of incidence ($\theta$) due to a reflection between the cap rock and the reservoir, is given by:

$$AMP(\theta) = A + B\, SIN^2\theta + C\, (TAN^2\theta - SIN^2\theta) \quad \text{Equation 16}$$

Where:

$$A = \frac{1}{2}\frac{\Delta Vp}{Vp} + \frac{1}{2}\frac{\Delta \rho}{\rho}$$

$$B = \frac{1}{2}\frac{\Delta Vp}{Vp} - \frac{2}{g^2}\left(2\frac{\Delta Vs}{Vs} + \frac{\Delta \rho}{\rho}\right) + \frac{1}{2}\Delta\delta$$

$$C = \frac{1}{2}\frac{\Delta Vp}{Vp} + \frac{1}{2}\Delta\varepsilon$$

Or by:

$$AMP(\theta) = B_0 + B_1\, TAN^2\theta + B_2\, TAN^2\theta\, SIN^2\theta \quad \text{Equation 17}$$

$$B_0 = A = \frac{1}{2}\frac{\Delta Vp}{Vp} + \frac{1}{2}\frac{\Delta \rho}{\rho}$$

$$B_1 = B = \frac{1}{2}\frac{\Delta Vp}{Vp} - \frac{2}{g^2}\left(2\frac{\Delta Vs}{Vs} + \frac{\Delta \rho}{\rho}\right) + \frac{1}{2}\Delta\delta$$

$$B_2 = C - B = \frac{2}{g^2}\left(2\frac{\Delta Vs}{Vs} + \frac{\Delta \rho}{\rho}\right) + \frac{1}{2}\Delta\varepsilon - \frac{1}{2}\Delta\delta$$

Where:

$$g = \frac{\overline{Vp}}{\overline{Vs}}$$

$$\frac{\Delta Vp}{Vp} = \frac{Vp_2 - Vp_1}{\overline{Vp}}$$

$$\frac{\Delta Vs}{Vs} = \frac{Vs_2 - Vs_1}{\overline{Vs}}$$

$$\frac{\Delta \rho}{\rho} = \frac{\rho_2 - \rho_1}{\bar{\rho}}$$

$$\Delta\delta = \delta_2 - \delta_1$$

$$\Delta\varepsilon = \varepsilon_2 - \varepsilon_1$$

$$\overline{Vp} = \frac{Vp_1 + Vp_2}{2}$$

$$\overline{Vs} = \frac{Vs_1 + Vs_2}{2}$$

$$\bar{\rho} = \frac{\rho_1 + \rho_2}{2}$$

Where 1 indicates the properties for the layer above the interface while 2 indicates the layer below.

The rock property can be solved for in terms of the curve shape parameters A, B and C.

$$\frac{\Delta\rho}{\rho} = 2(A - C) + \Delta\varepsilon \qquad \text{Equation 18}$$

$$\frac{\Delta V\rho}{V\rho} = 2C - \Delta\varepsilon \qquad \text{Equation 19}$$

$$\frac{\Delta Vs}{Vs} = (C - A) + \frac{g^2}{4}(C - B) + \frac{g^2}{8}(\Delta\varepsilon - \Delta\delta) + \frac{1}{2}\Delta\varepsilon \qquad \text{Equation 20}$$

$$\Delta\varepsilon = 2C - \frac{\Delta V\rho}{V\rho} \qquad \text{Equation 21}$$

$$\Delta\delta = \frac{8}{g^2}\cdot A + 2\cdot B - \left(1 + \frac{4}{g^2}\right)\frac{dV\rho}{V\rho} + \frac{8dV_s}{V_s} \qquad \text{Equation 22}$$

The rock property can be solved for in terms of the curve shape parameters $B_0$, $B_1$ and $B_2$.

$$\frac{\Delta\rho}{\rho} = 2(B_0 - B_1 - B_2) + \Delta\varepsilon \qquad \text{Equation 23}$$

$$\frac{\Delta V\rho}{V\rho} = 2(B_1 + B_2) - \Delta\varepsilon \qquad \text{Equation 24}$$

$$\frac{\Delta Vs}{Vs} = B_0 - B_1 - B_2\left(1 + \frac{g^2}{4}\right) + \frac{g^2}{8}(\Delta\varepsilon - \Delta\delta) + \frac{1}{2}\Delta\varepsilon \qquad \text{Equation 25}$$

$$\Delta\delta = \frac{8}{g^2}B_0 + 2B_1 - \left(1 + \frac{4}{g^2}\right)\frac{dV\rho}{V\rho} + \frac{8dV_s}{V_s} \qquad \text{Equation 26}$$

$$\Delta\varepsilon = 2(B_1 + B_2) - \frac{\Delta V\rho}{V\rho} \qquad \text{Equation 27}$$

The water saturation, $S_w$ is given by the following derivation of equation 9:

$$S_w = \frac{\left(2A - \frac{\Delta Vp}{Vp}\right)}{\phi(\rho_{BR} - \rho_{PAY})} \qquad \text{Equation 28}$$

Where:

A and C are the data derived curve fit coefficients;

$\rho_{PAY}$ is the density of the pay fluid in situ;

$\rho_{BR}$ is the density of brine fluid in situ;

$\bar{\rho}$ is the average density of the fluid filled reservoir and the shale cap rock;

$\phi$ is the porosity of the reservoir; and $$\frac{\Delta Vp}{Vp}$$

is the velocity contrast.
The five parameters—$\rho_{PAY}$, $\rho_{BRINE}$, $\bar{\rho}$, $\phi$, $$\frac{\Delta Vp}{Vp}$$

—can be accurately estimated.

The following equation for $S_{PAY}$ is derived from equation 11:

$$S_{PAY} = 1 - \frac{2A - \frac{\Delta Vp}{Vp}}{\phi((\rho_{BR} - \rho_{PAY})} \qquad \text{Equation 29}$$

Or, in terms of $B_0$, $B_1$ and $B_2$, using equation 9, $$S_w = \frac{\left(2B_0 - \frac{\Delta Vp}{Vp}\right)}{\phi(\rho_{BR} - \rho_{PAY})} \qquad \text{Equation 30}$$

Where:

$B_0$, $B_1$ and $B_2$ are the data derived curve fit coefficients;

$\rho_{PAY}$ is an estimate of the density of pay fluid in situ;

$\rho_{BR}$ is an estimate of the density of brine fluid in situ;

$\bar{\rho}$ is an estimate of the average density of the fluid filled reservoir and the cap rock;

$\phi$ is an estimate of the porosity of the reservoir; and $$\frac{\Delta Vp}{Vp}$$

is the velocity contrast.
The five parameters—$\rho_{PAY}$, $\rho_{BRINE}$, $\bar{\rho}$, $\phi$, $$\frac{\Delta Vp}{Vp}$$

—can be accurately estimated.
Using equation 11,
Then:

$$S_{PAY} = 1 - \frac{2B_0 - \frac{\Delta Vp}{Vp}}{\phi(\rho_{BR} - \rho_{PAY})} \qquad \text{Equation 31}$$

A well known set of equations describes the relationships between the anisotropic parameters ($\delta$ and $\epsilon$) and the crack density (e), and the incompressibility of the fluid filling the cracks. The equations are part of the Hudson anisotropic model. This model accurately represents the anisotropic behavior of a cracked medium filled with a fluid when the crack density is less than 0.1. Although very useful, the Hudson model equations are complicated and cannot be easily inverted to find the value of $k_f$, which is the fluid incompressibility from values of $\delta$ and $\epsilon$.

The Hudson equations apply only for small crack densities e, which is the norm in the subsurface. By making a series-expansion of the Hudson equation, but keeping only terms linear in e and not including products of e with any of the small parameters $\delta$ and $\epsilon$, we get the following simplified relationships:

$$\varepsilon = \varepsilon_{intr} + \frac{8\cdot e}{(3\cdot(1 + Kf))} \qquad \text{Equation 32}$$

$$\delta = \delta_{intr} + \qquad \text{Equation 33}$$
$$\left(\frac{4\cdot e}{1 + Kf}\right)\left(\frac{1}{3\cdot(g - 1)} - \frac{1}{3\cdot(g + 1)} + \frac{8}{3}\right) + \left(\frac{32\cdot e}{3\cdot(2 - 3\cdot g^2)}\right)$$

Figure 13:
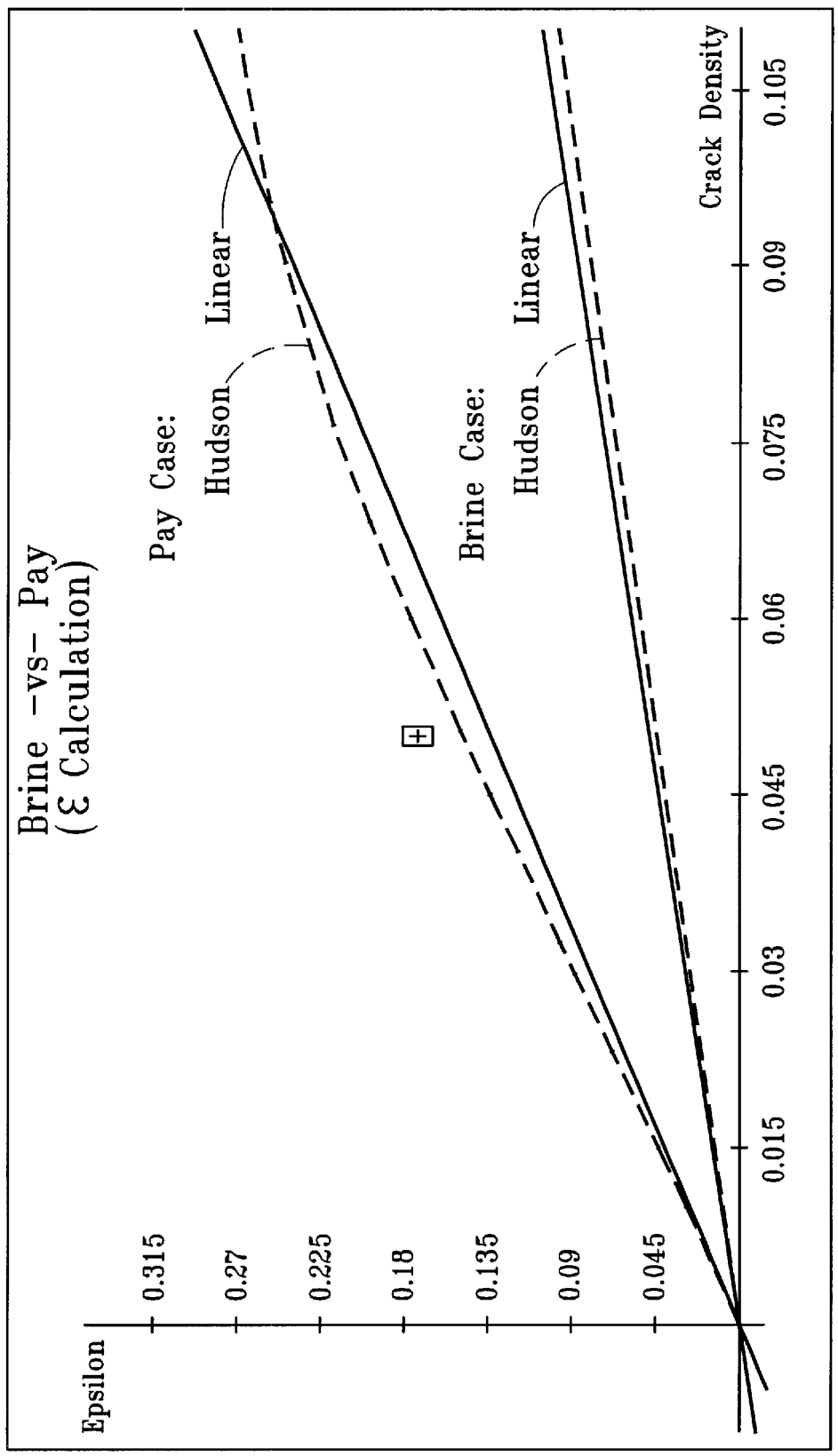
FIGS. 13 and 14 show the accuracy of Equations 32 and 33, approximations to the Hudson equations.
Figure 14:
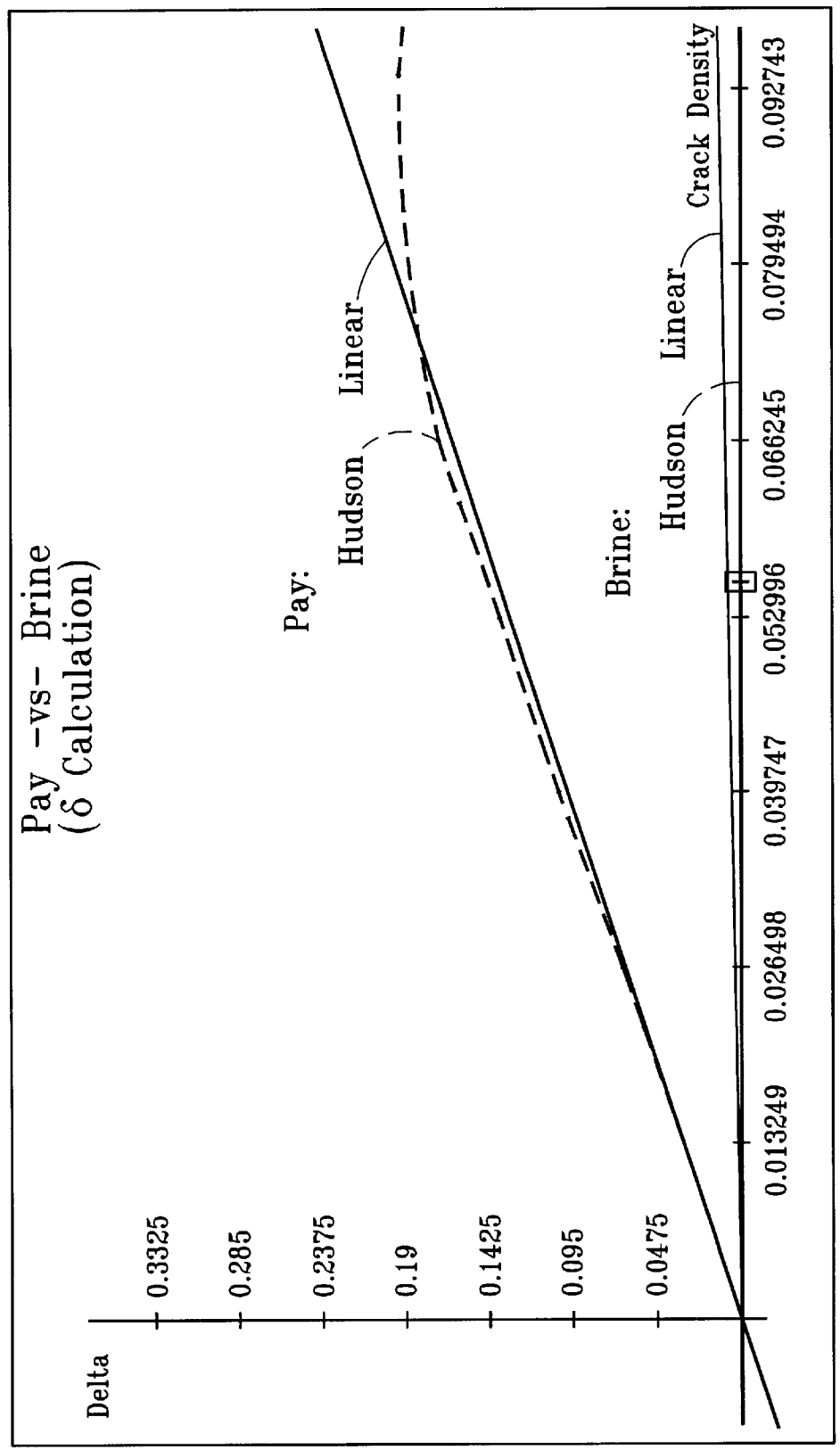
Figure 1:
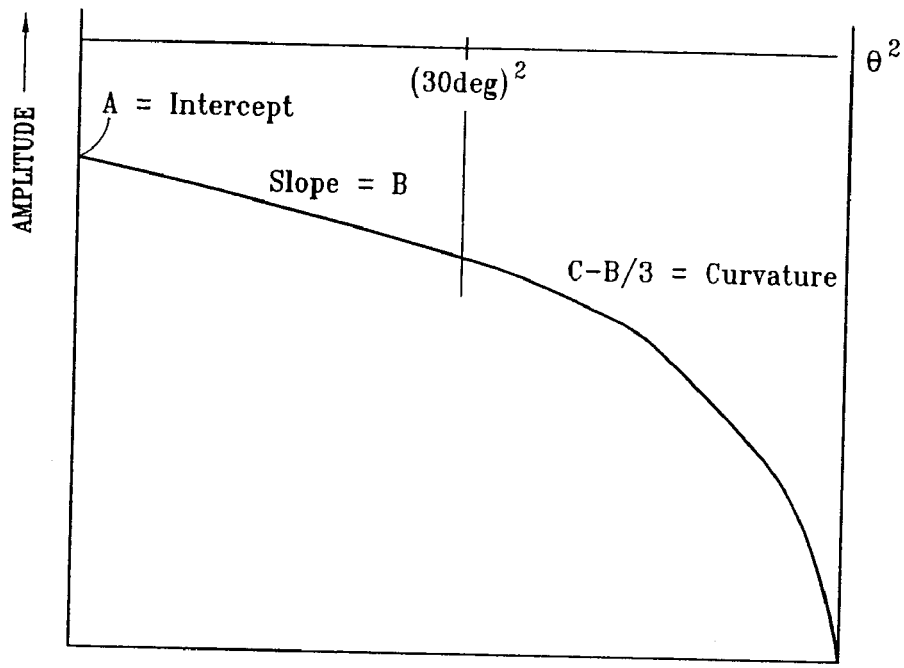
Figure 2:
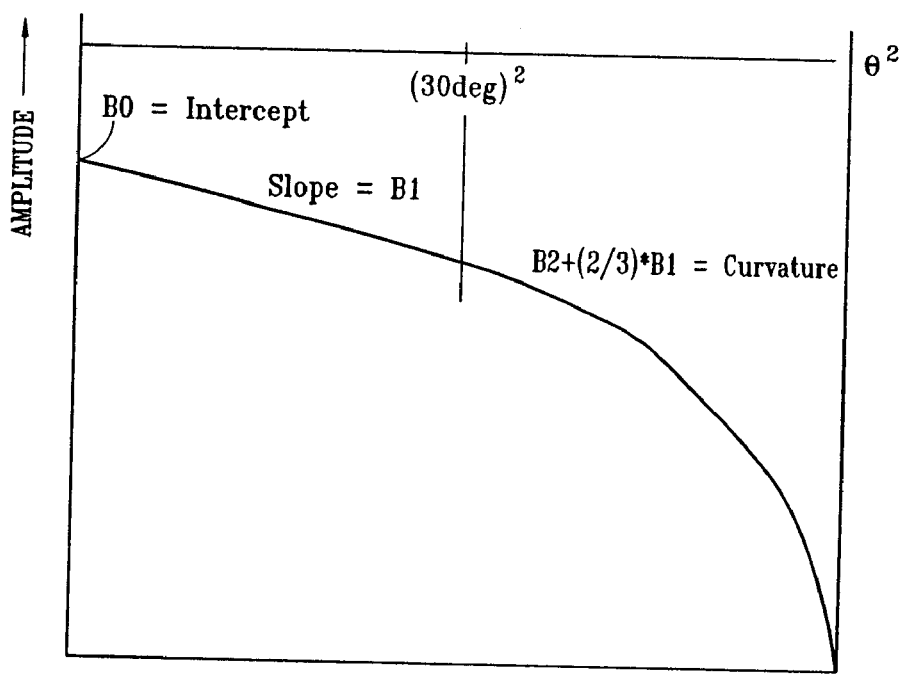
Figure 3:
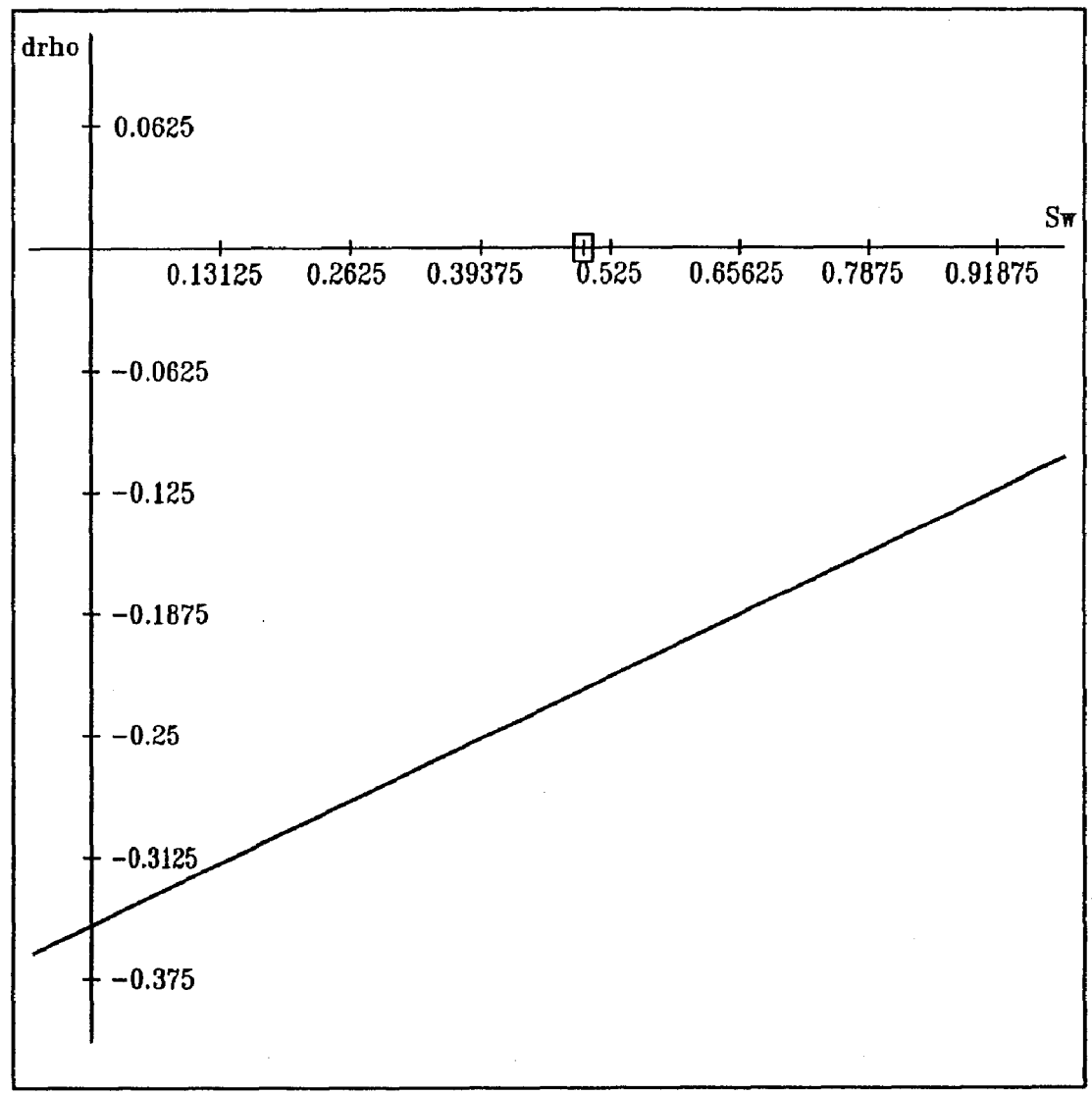
Figure 4:
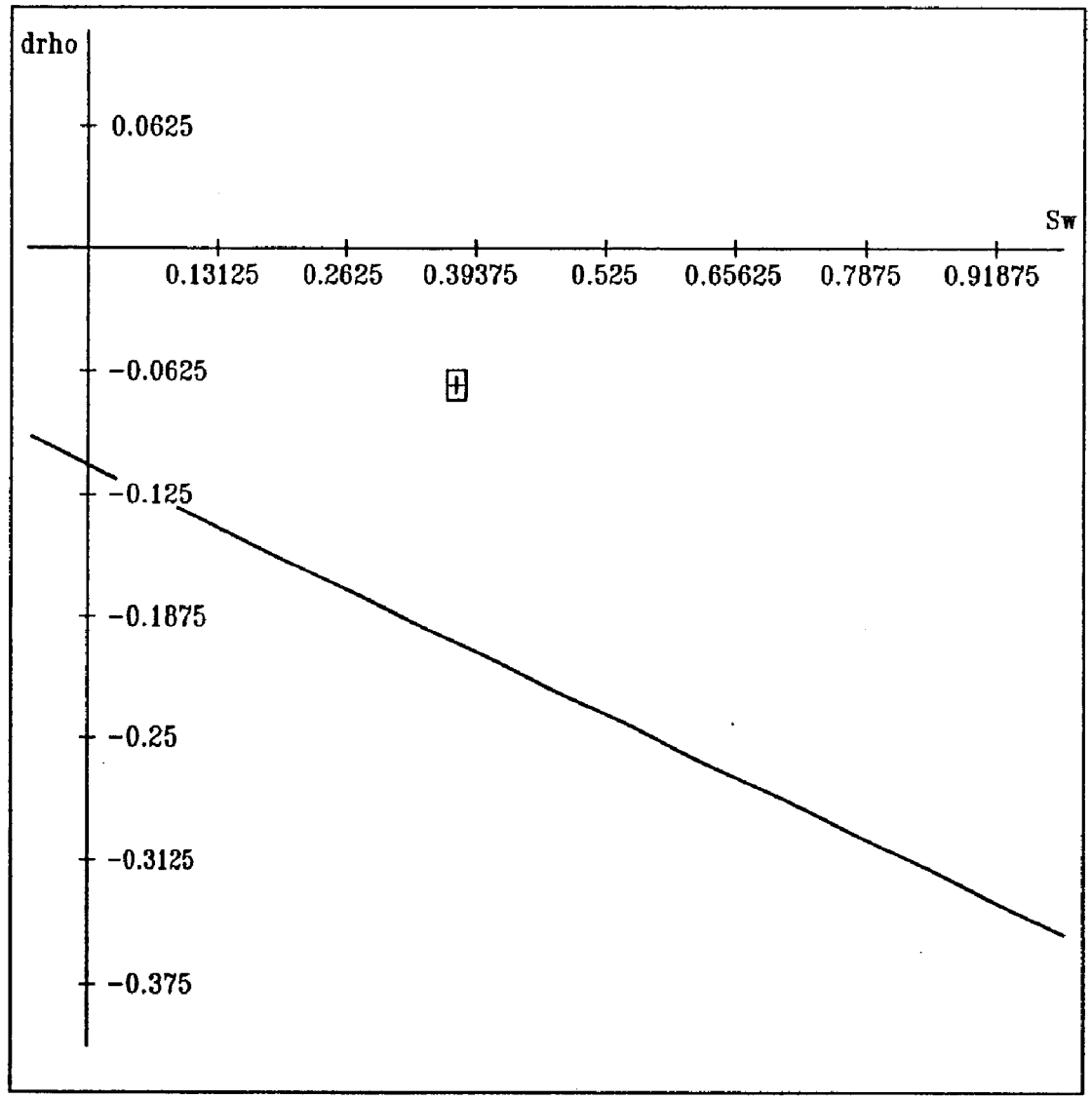
Figure 5:
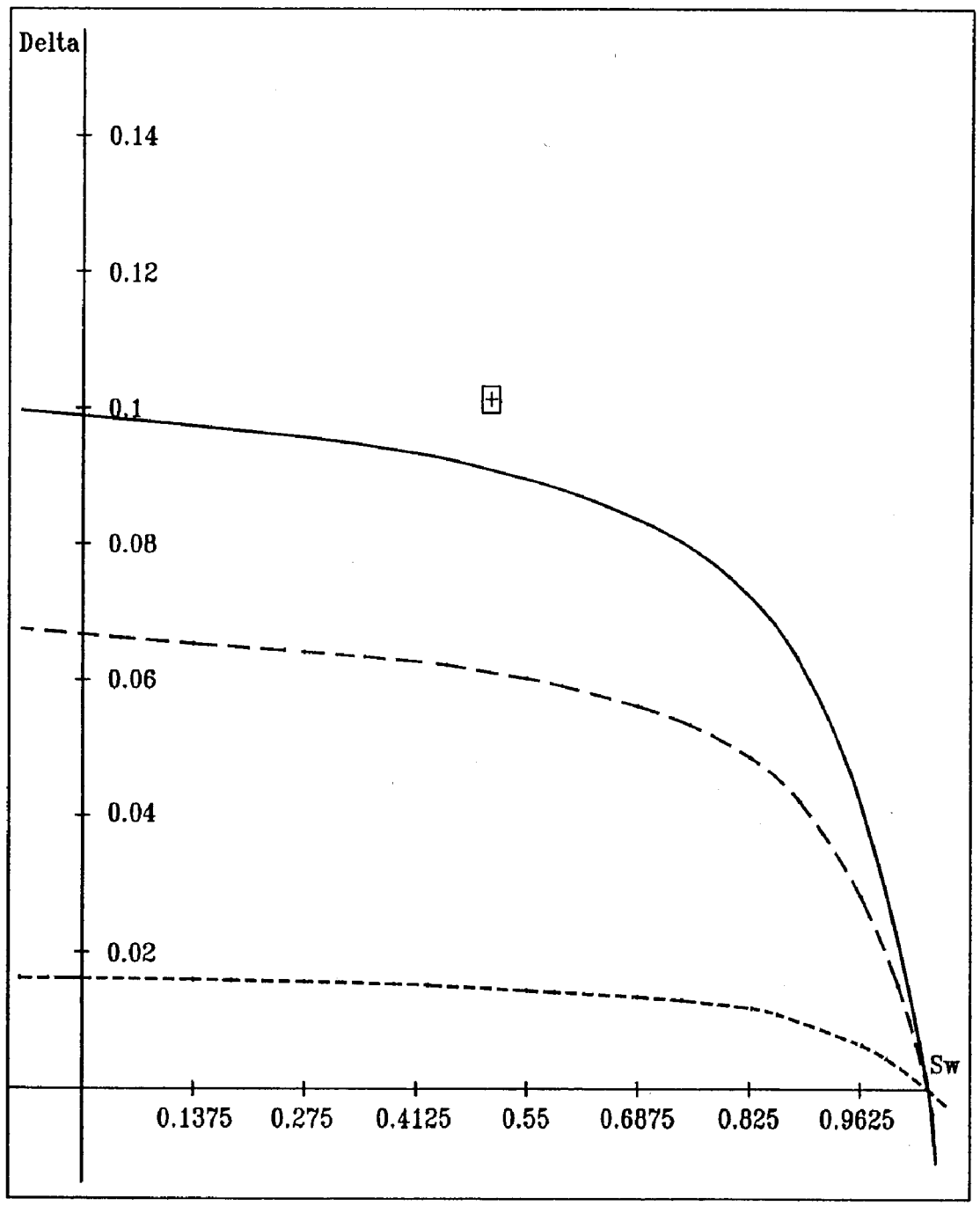
Figure 6:
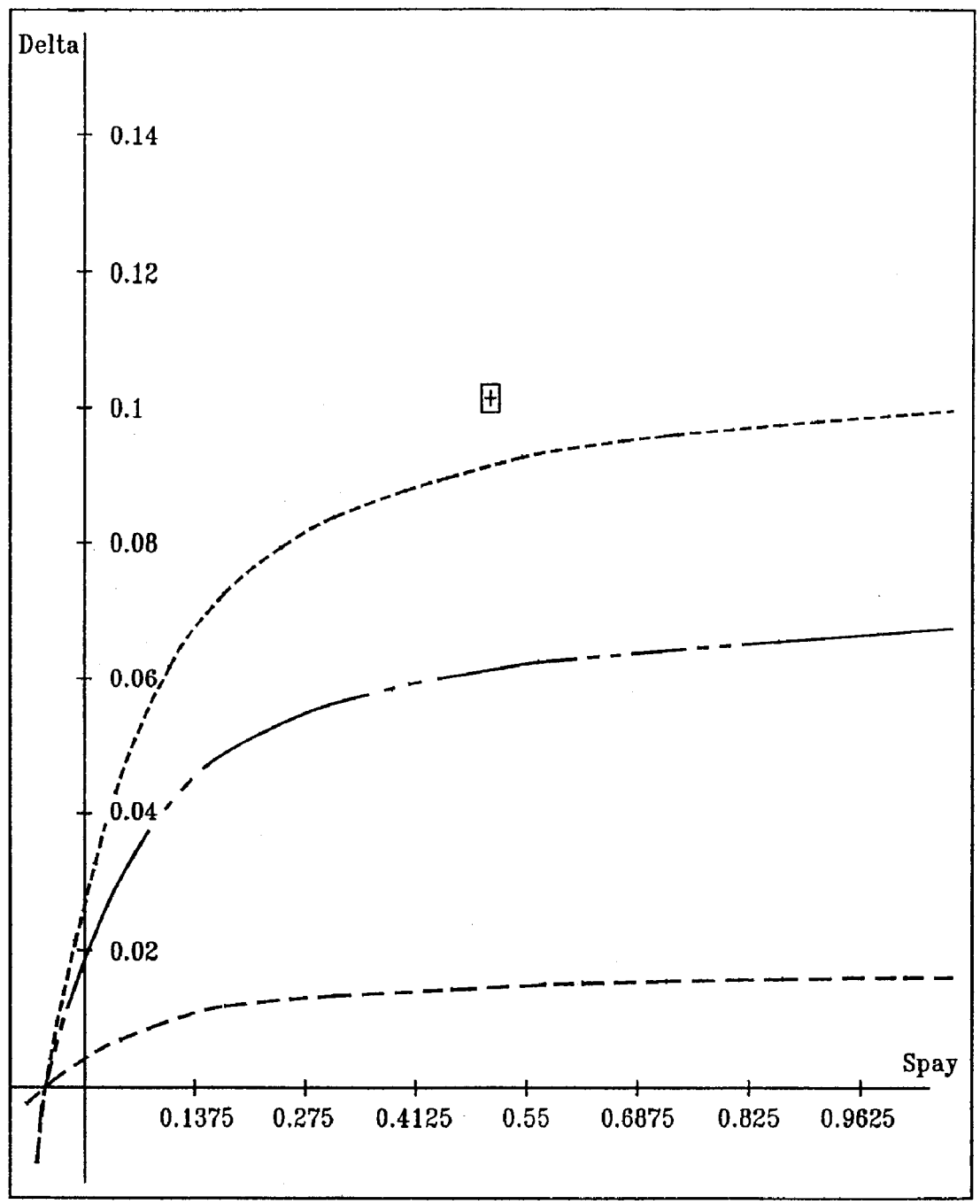
Figure 7:
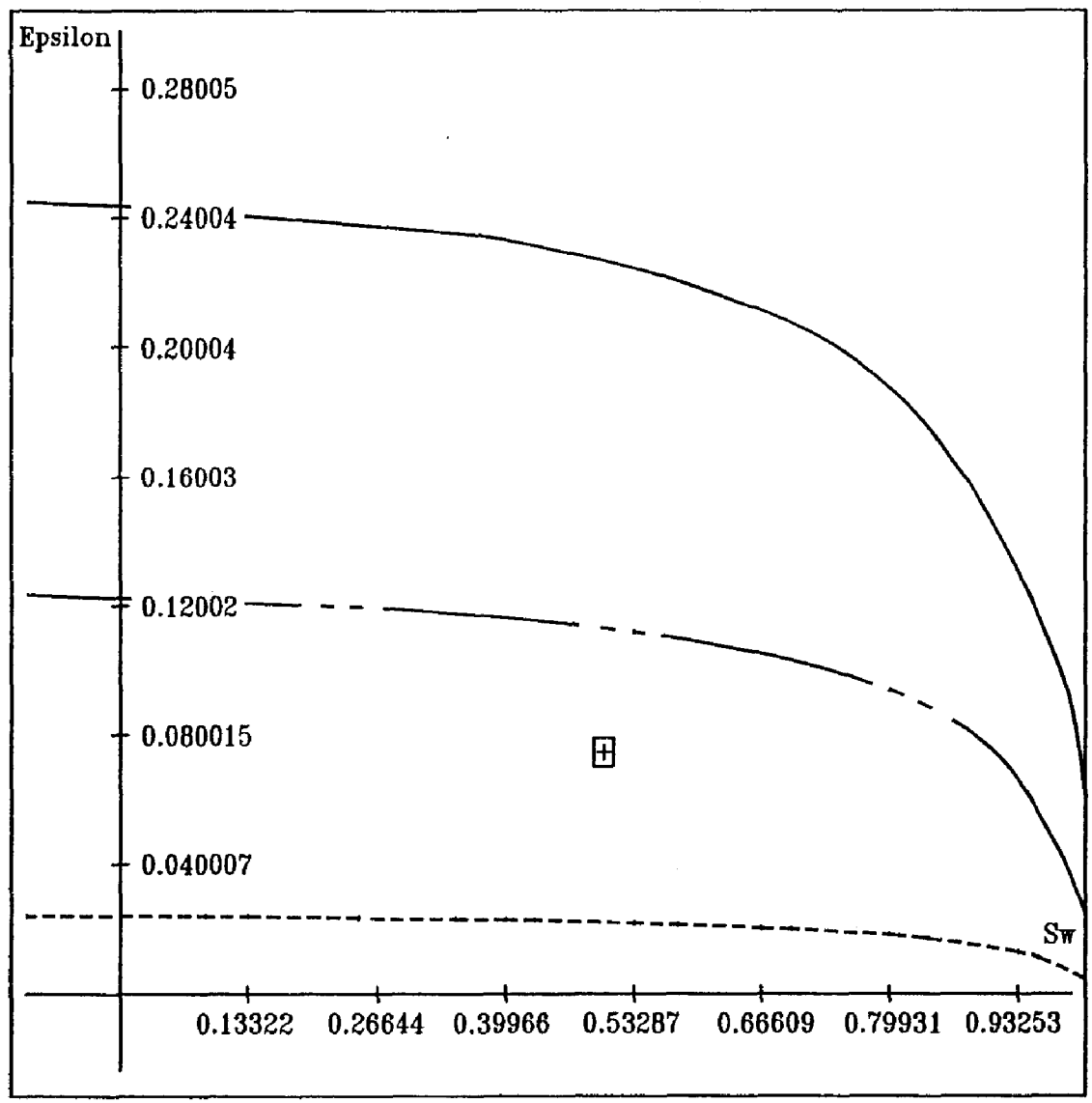
Figure 8:
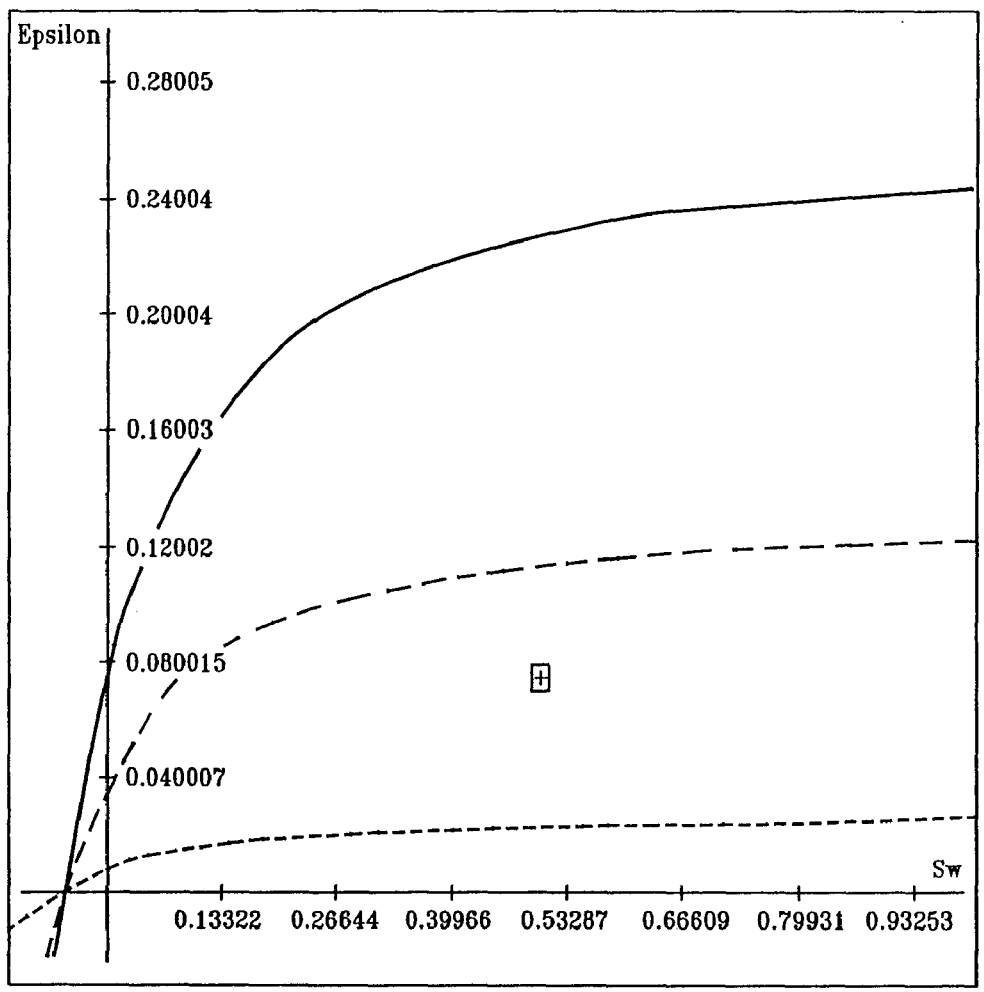
Figure 9:
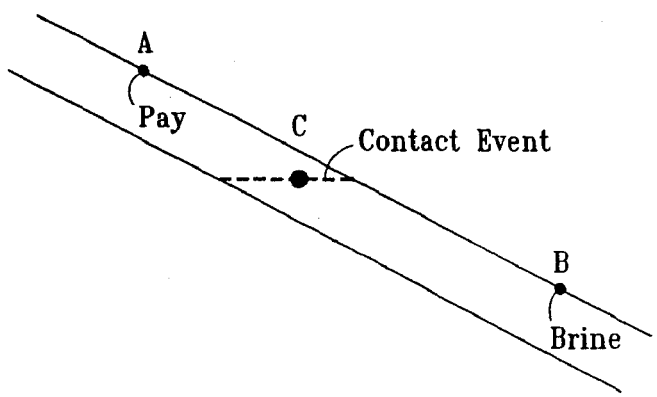
Figure 10:
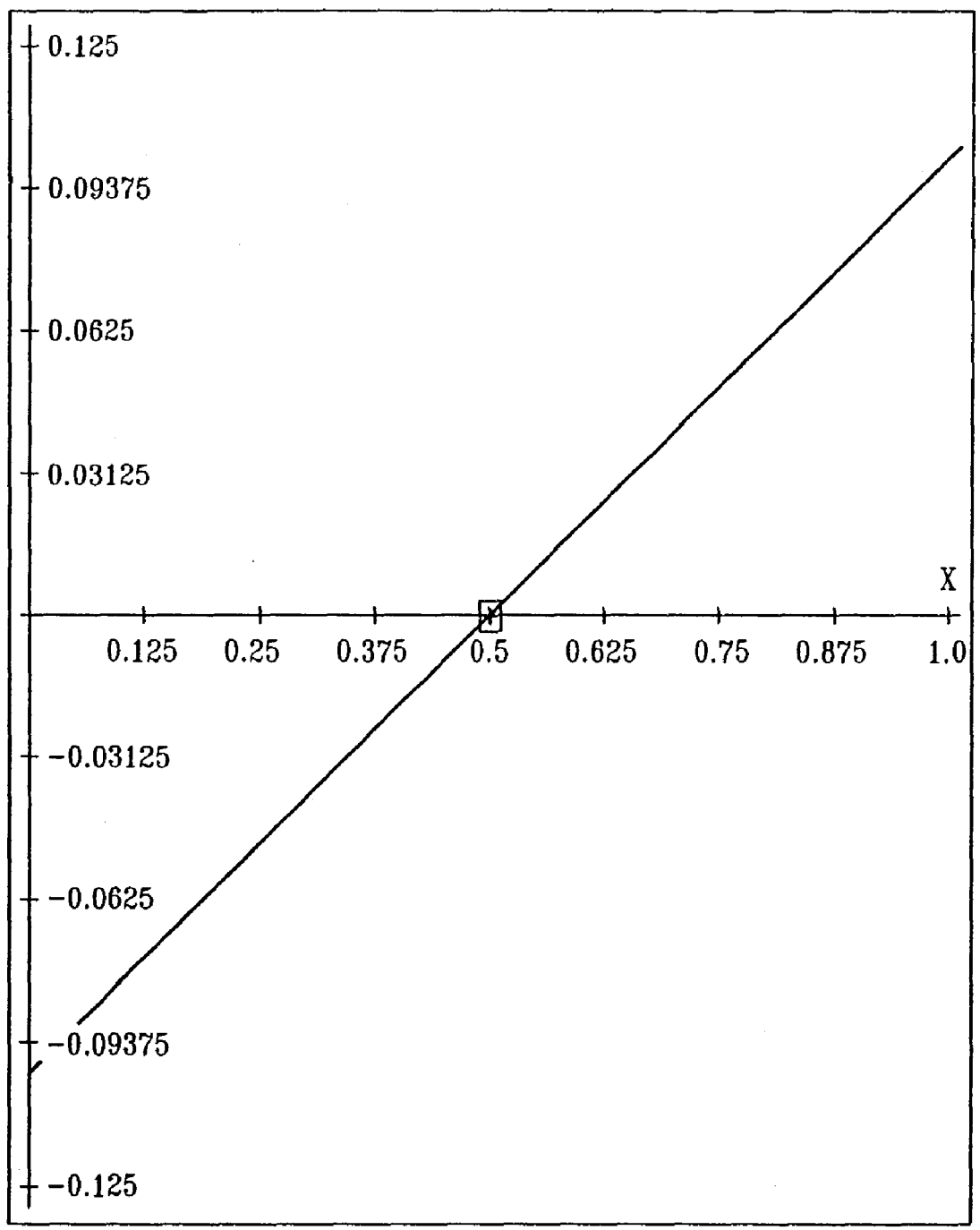
Figure 11:
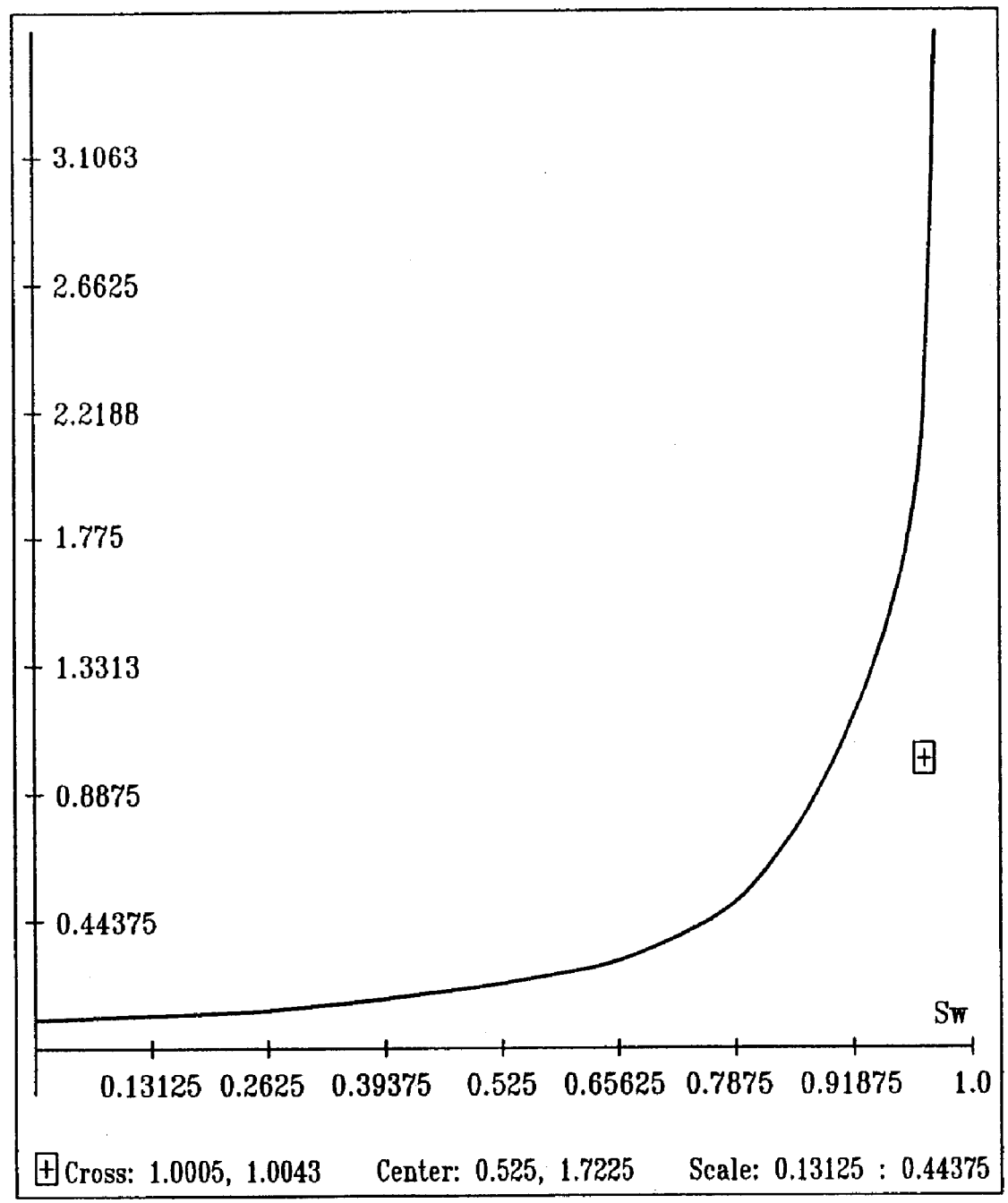
Figure 12:
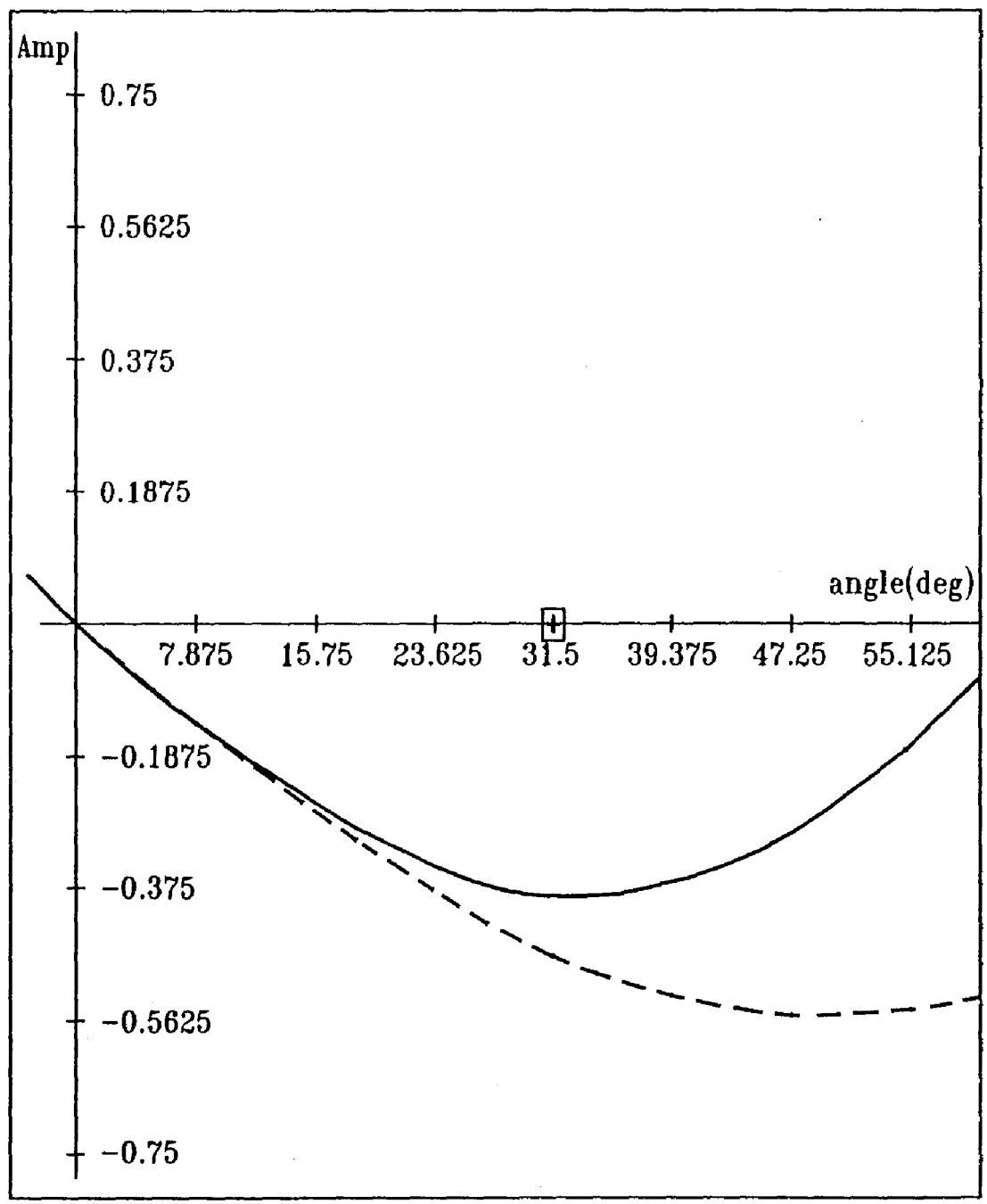
Figure 13:
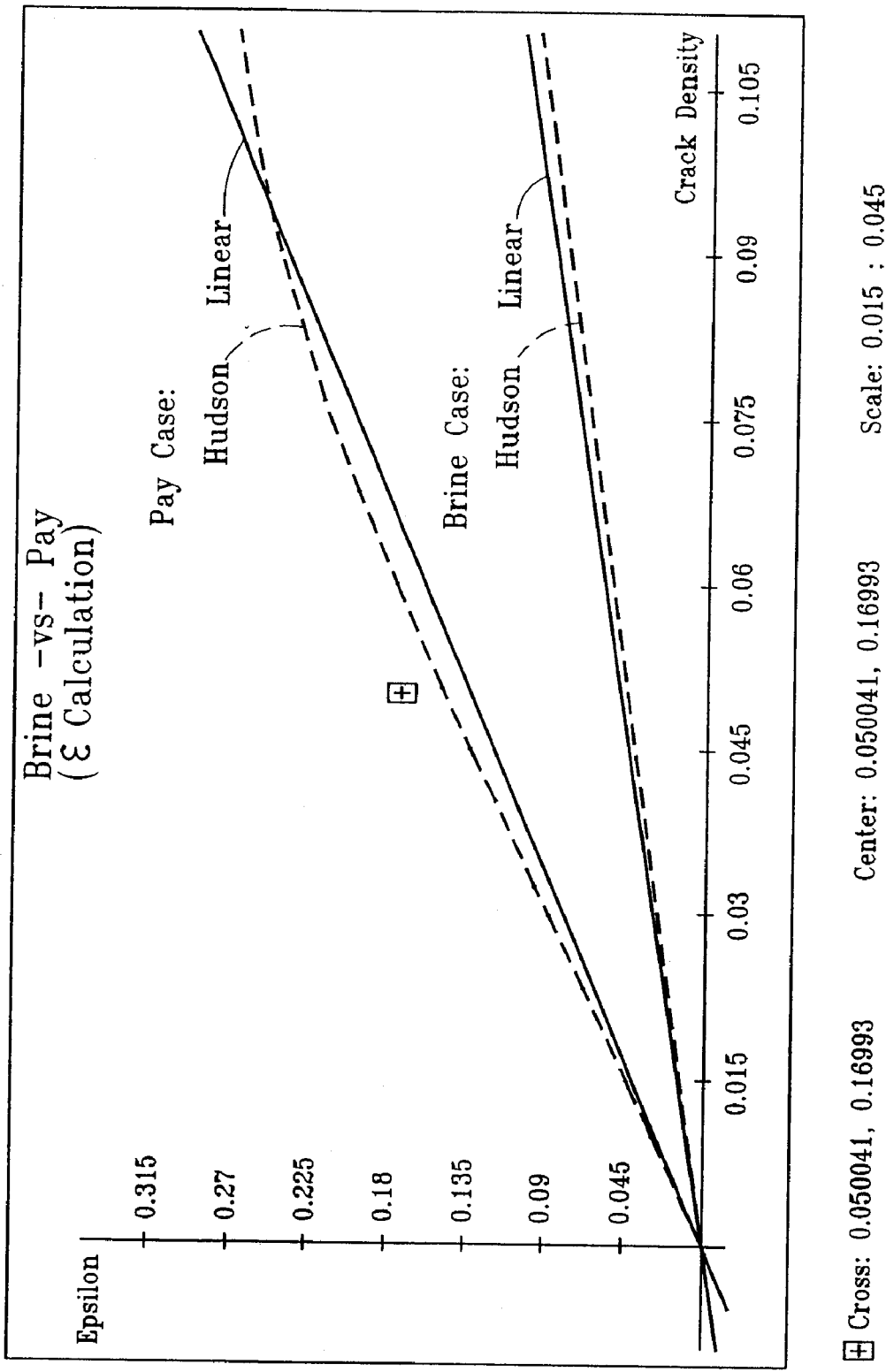
Figure 14:
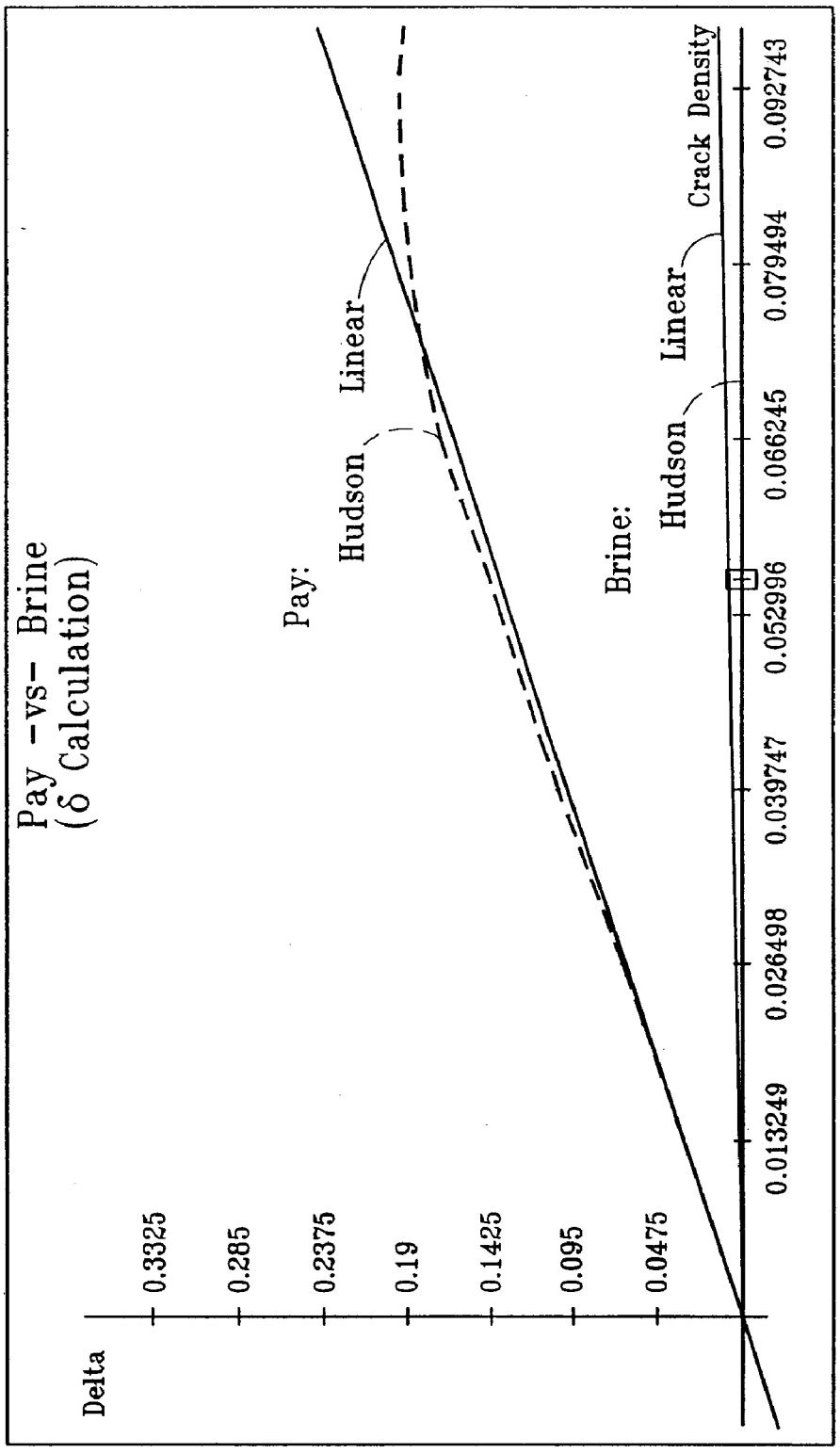
Figure 15A:
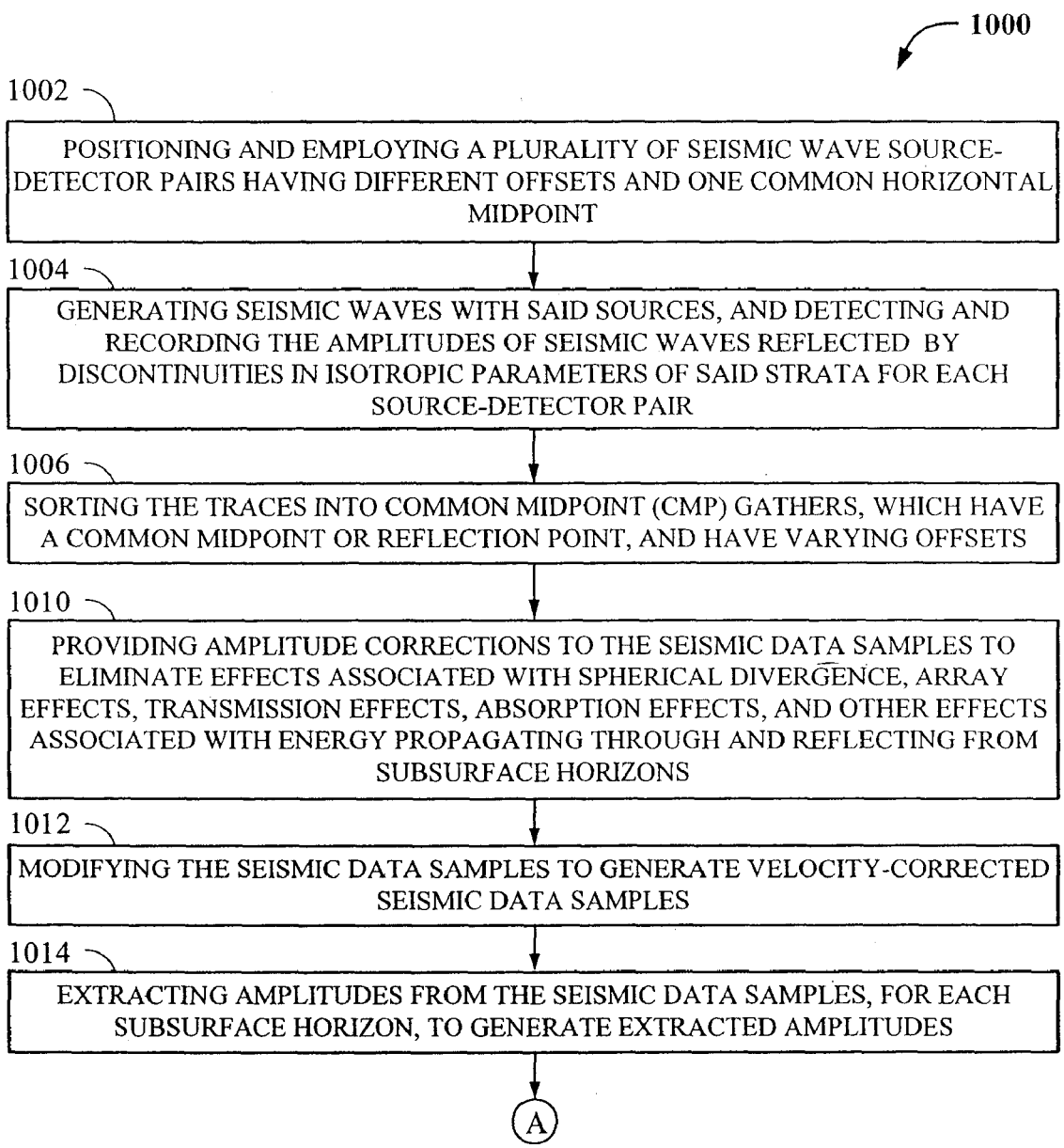
Figure 15B:
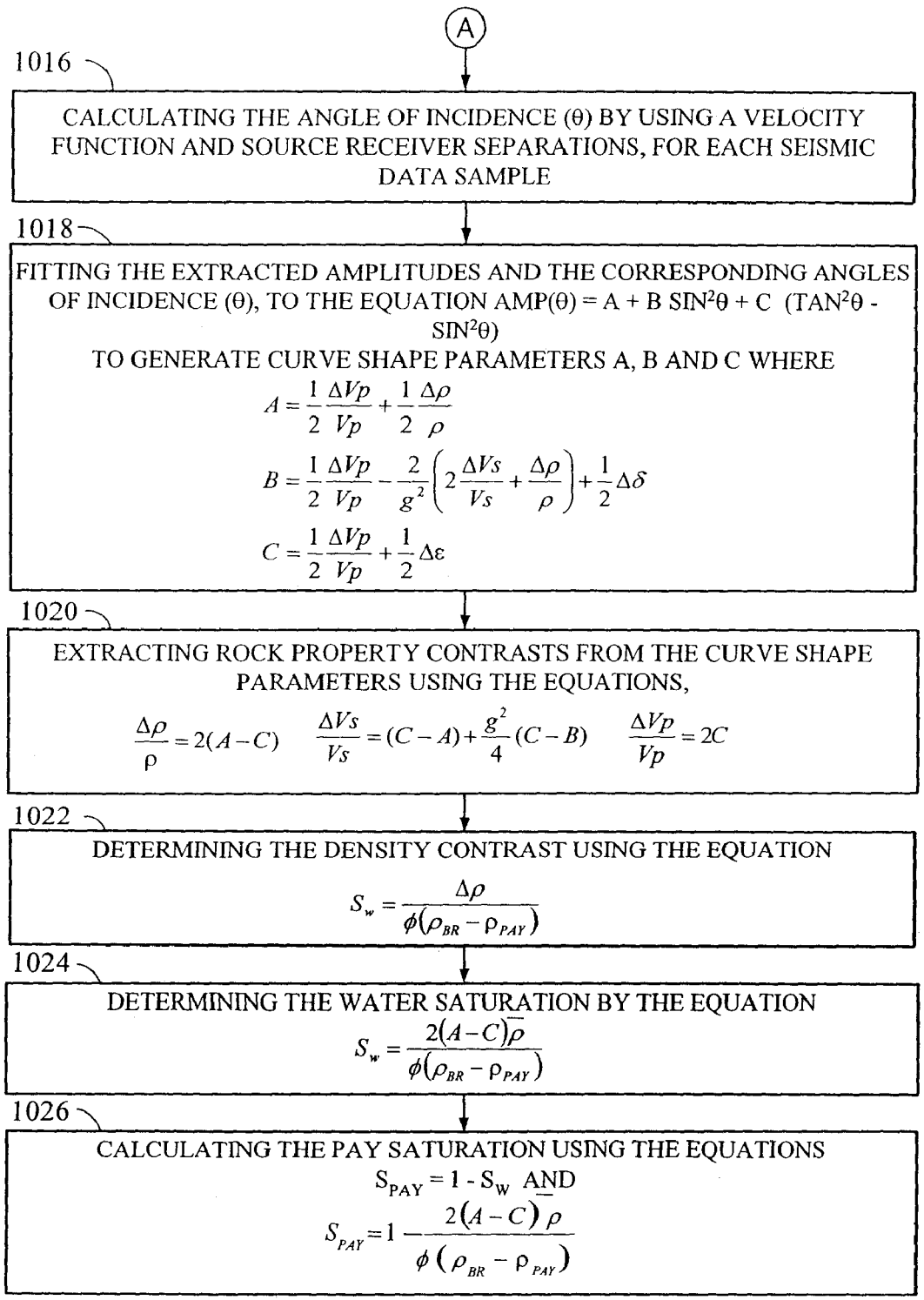
Figure 16A:
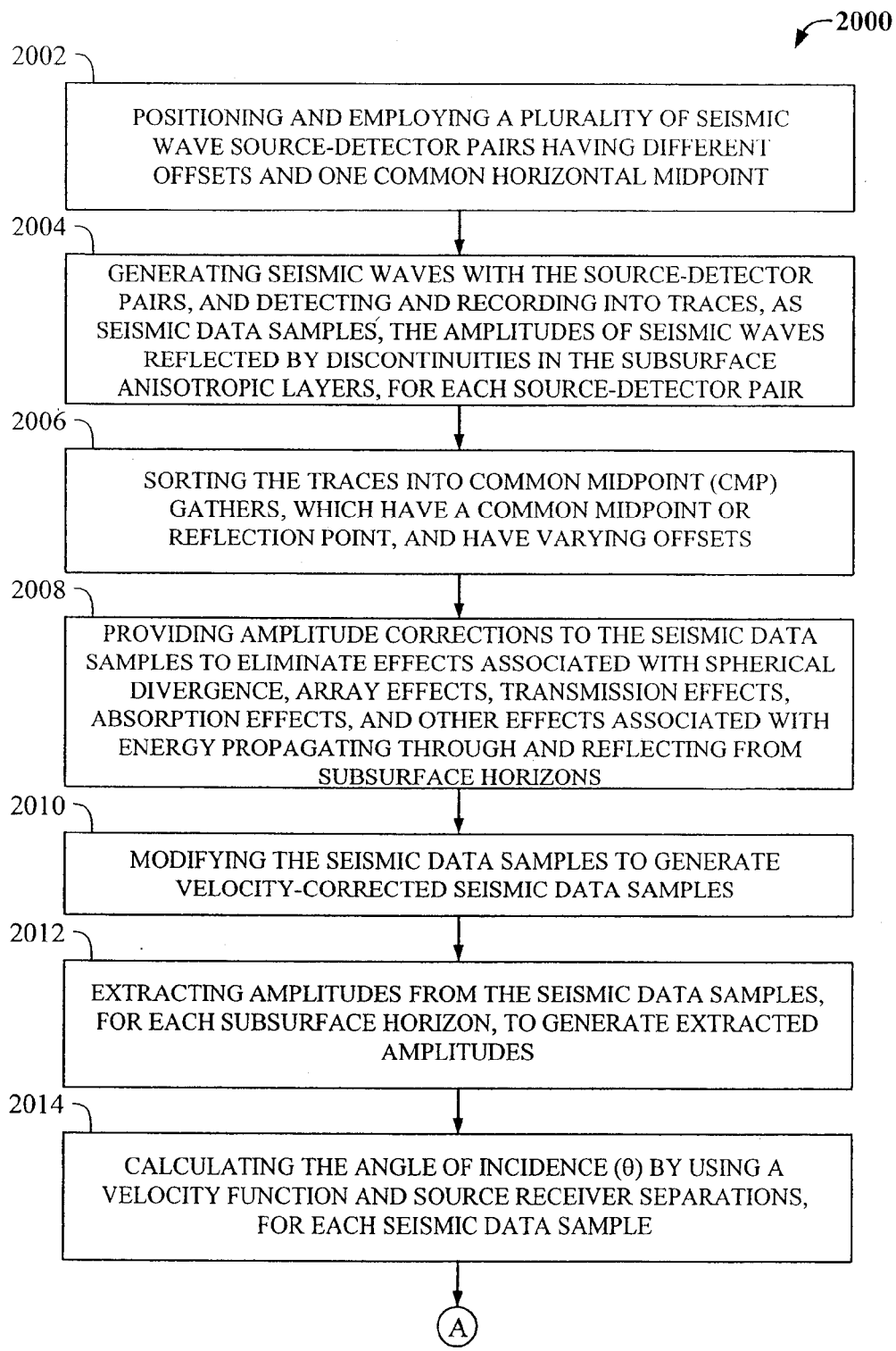
Figure 16B:
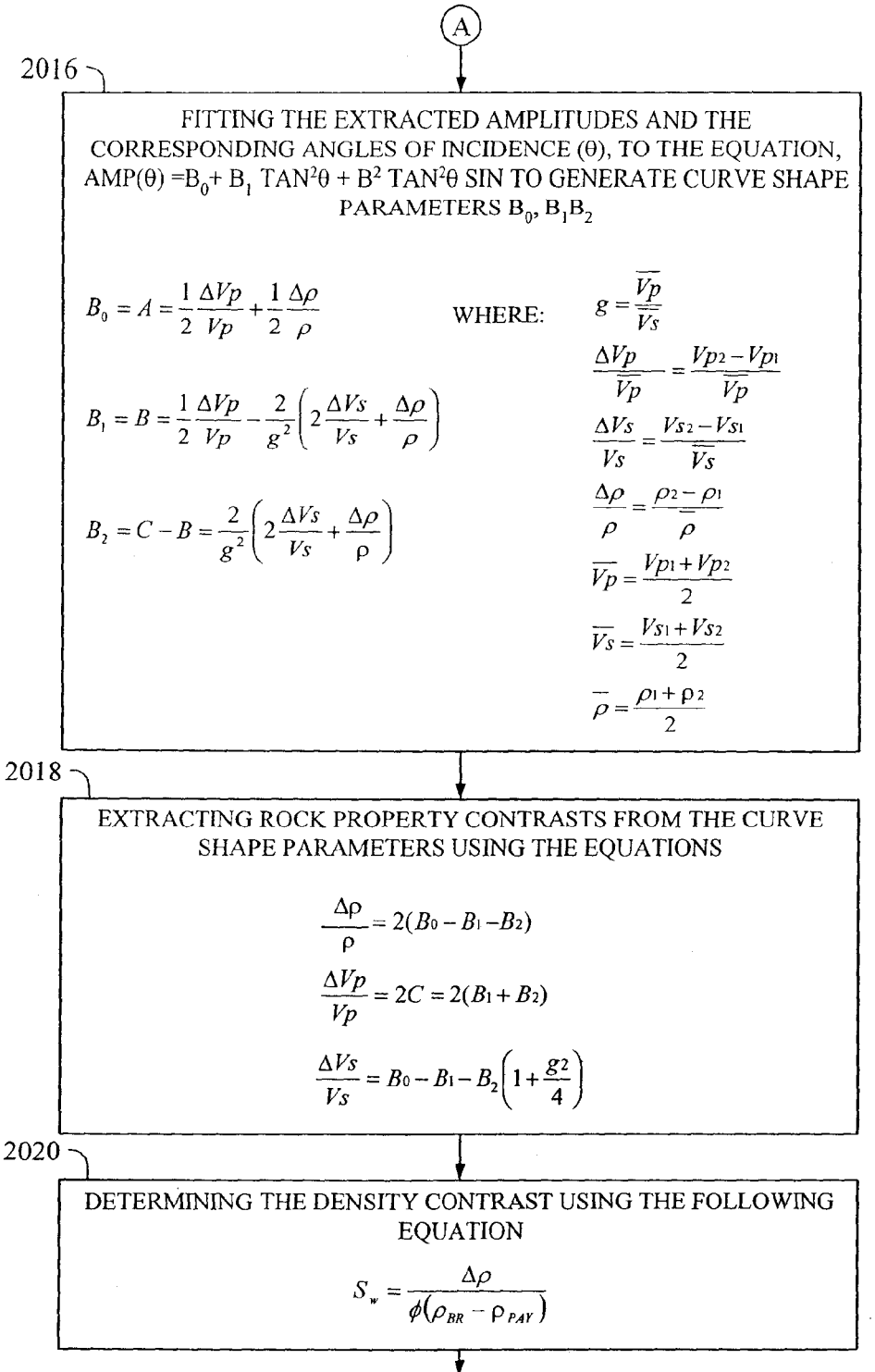
Figure 16C:
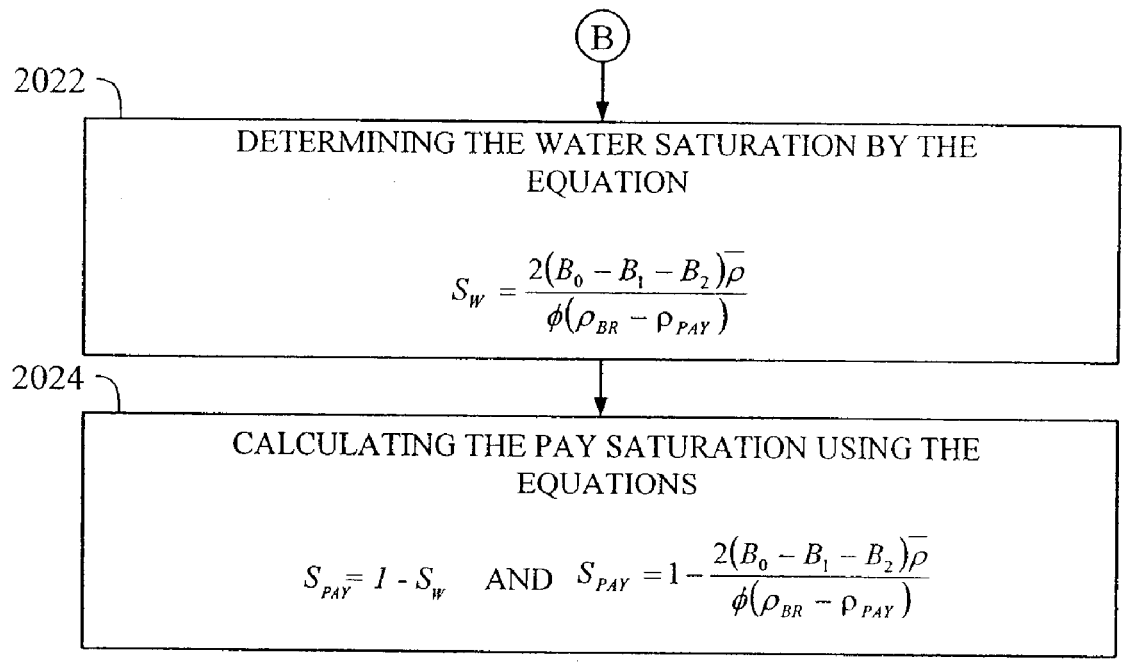
Figure 17A:
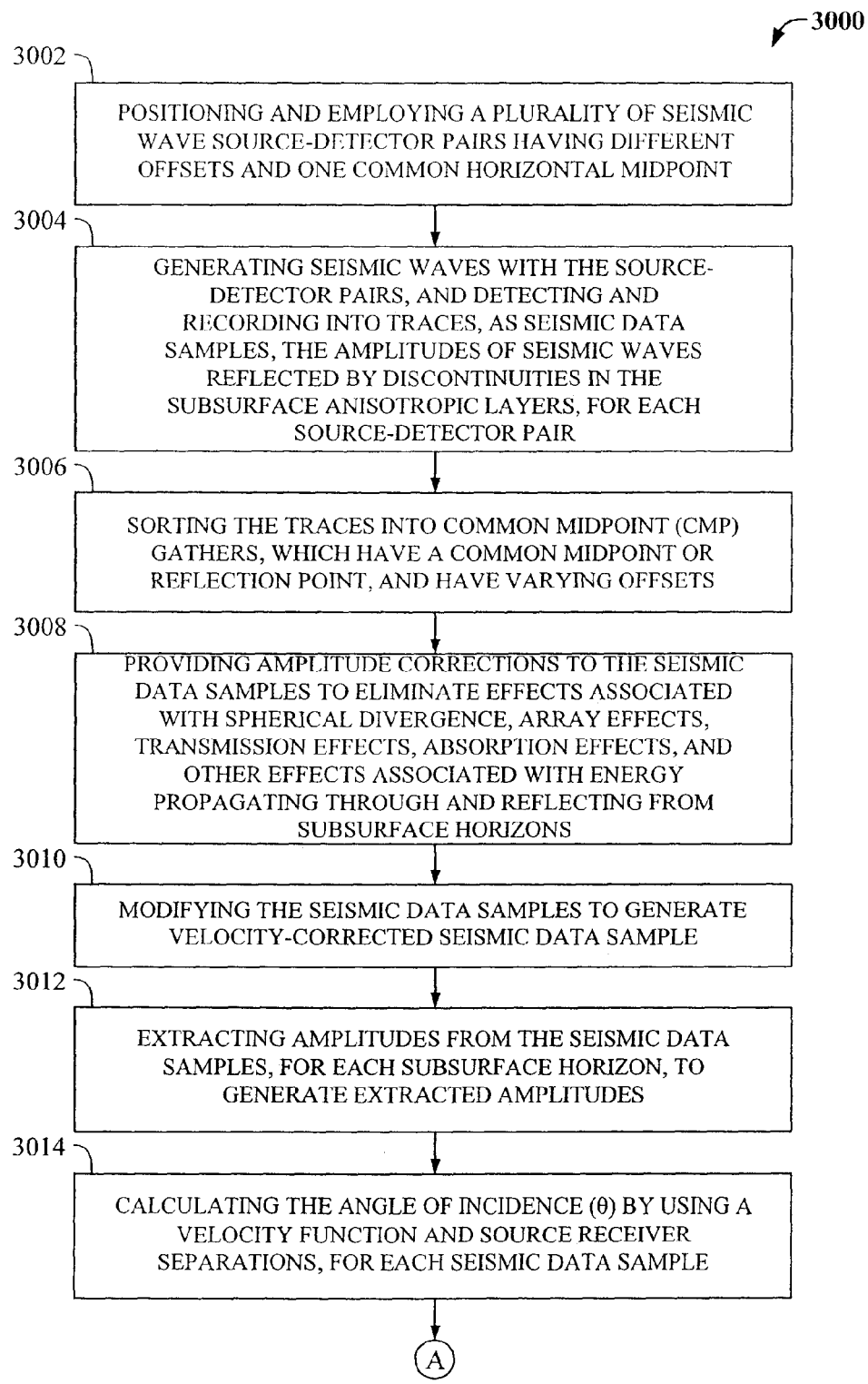
Figure 17C:
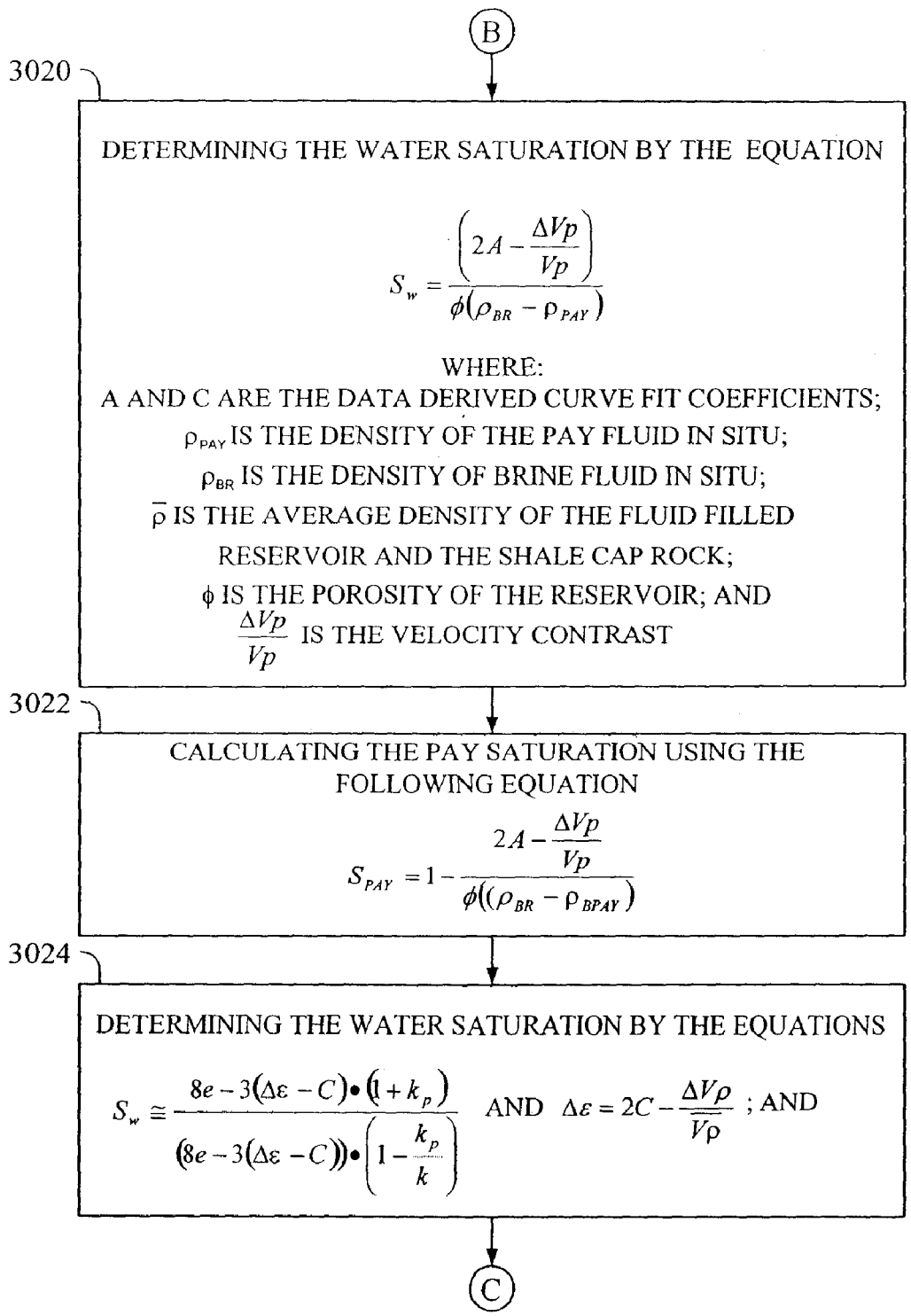
Figure 17D:
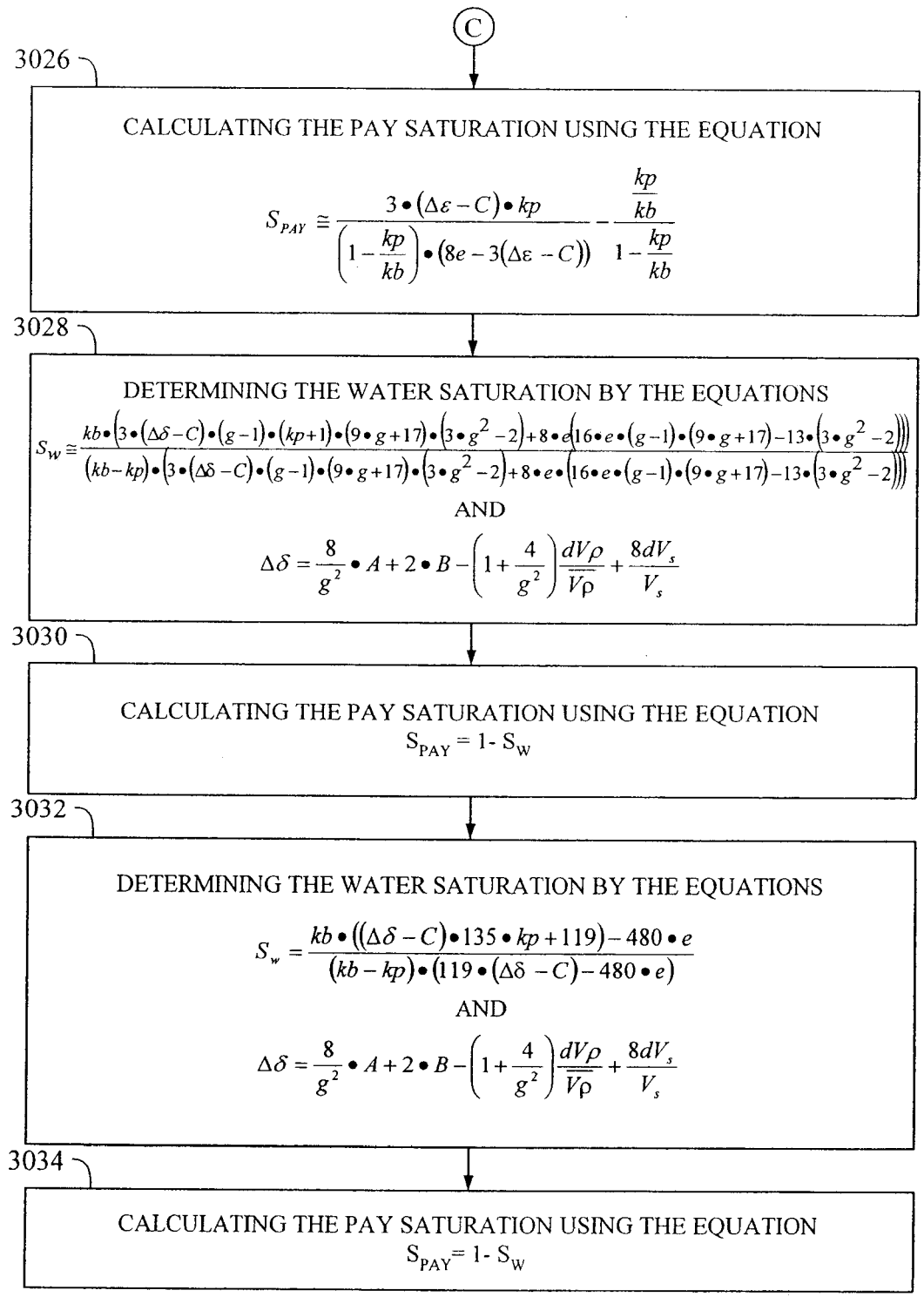

Or:

$$\delta = \delta_{intr} + e \cdot \left( \frac{32}{(9 \cdot (1 + Kf))} - \frac{16}{15} \right) \quad \text{Equation 34}$$

Where $\epsilon_{intr}$ and $\delta_{intr}$ are the contributions due to the intrinsic anisotropy, which is the part not due to the presence of cracks. FIGS. 13 and 14 show the accuracy of Equations 32 and 33, approximations to the Hudson equations. The results of Equations 32 and 33 are marked "Linear" in FIGS. 13 and 14. The fluid incompressibility as a function of water saturation $S_w$ can be written approximately as:

$$k_f = \frac{k_p \cdot k_b}{k_b + s_w(k_p - k_b)} \quad \text{Equation 35}$$

Where:

$k_f$ is the incompressibility of the composite fluid;
$k_b$ is the incompressibility of the pure brine fluid; and
$k_p$ is the incompressibility of the pure pay fluid.

Figure 11:
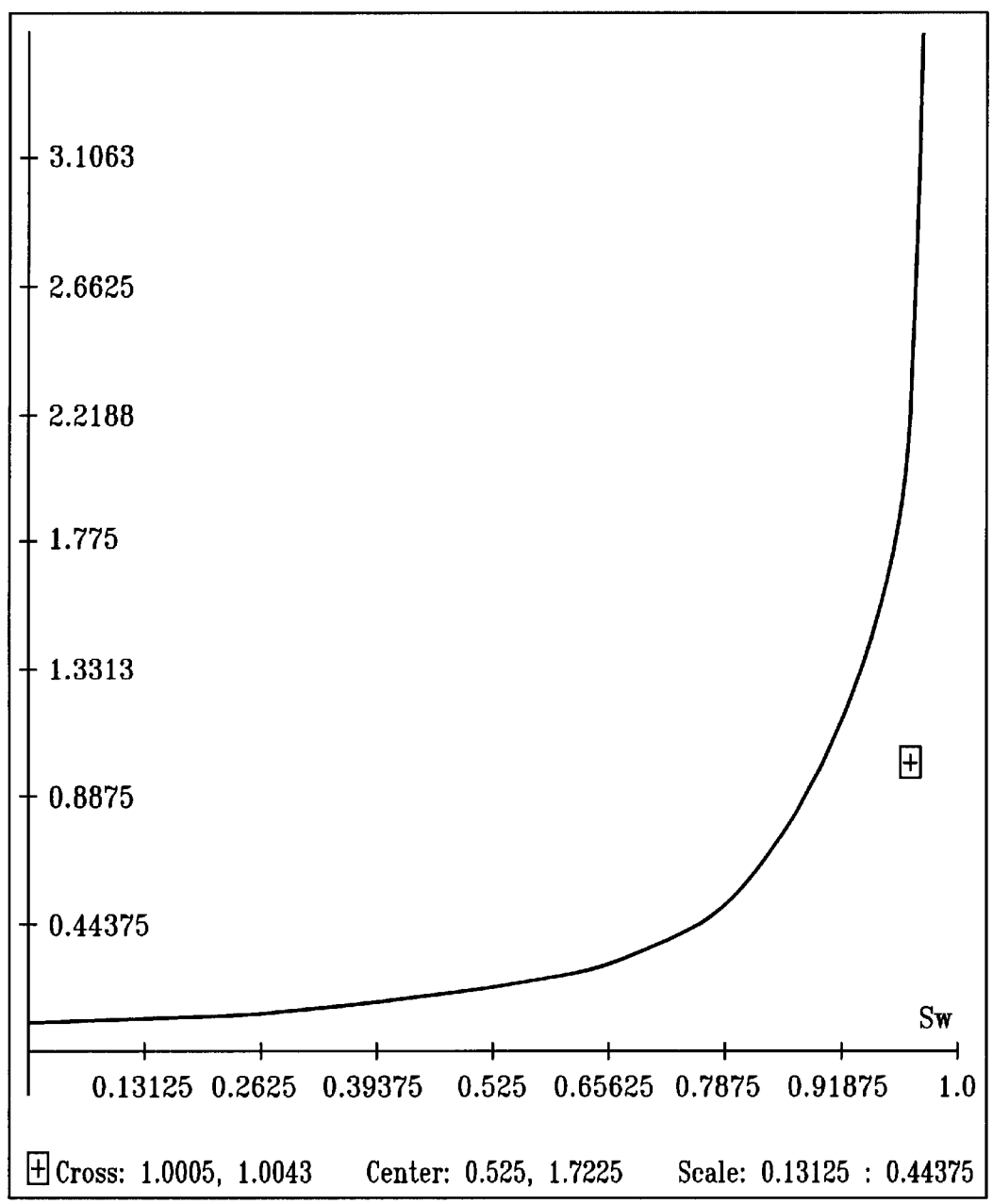
FIG. 11 shows the sensitivity of $k_f$ to the water saturation $S_w$.

FIG. 11 shows the sensitivity of $k_f$ to the water saturation $S_w$.

Figure 7:
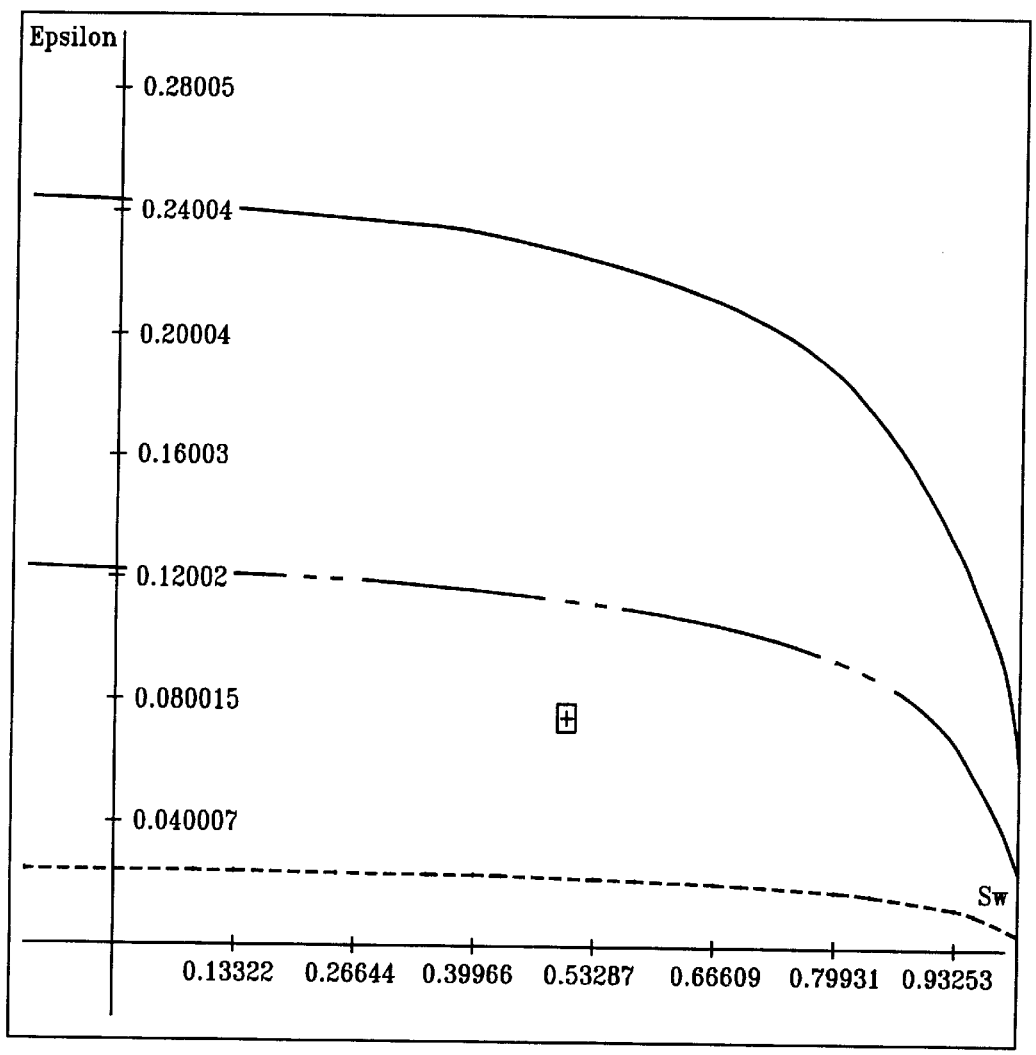
FIG. 7 illustrates, for a pay fluid of gas, the sensitivity of the anisotropic parameter $\epsilon$ to $S_w$, for various reasonable crack densities.

By substituting Equation 34 into Equation 35, we get:

$$\varepsilon = \frac{8 \cdot e(S_w[k_p - k_b] + k_b)}{3(k_b(k_p + 1) + S(k_p - k_b))} \quad \text{Equation 36}$$

$$\Delta\varepsilon = \frac{8 \cdot e(S_w[k_p - k_b] + k_b)}{3(k_b(k_p + 1) + S(k_p - k_b))} + C \quad \text{Equation 37}$$

Where C is a constant dependent on the anisotropy of the cap rock. For a pay fluid of gas, the sensitivity of the anisotropic parameter $\epsilon$ to $S_w$ is shown in FIG. 7 for various reasonable crack densities. Note the excellent sensitivity of the parameter $\epsilon$ to $S_w$. Solving for $S_w$ we get:

$$S_w \cong \frac{8e - 3(\Delta\varepsilon - C) \cdot (1 + k_p)}{(8e - 3(\Delta\varepsilon - C)) \cdot \left(1 - \frac{k_p}{k}\right)} \quad \text{Equation 38}$$

And $S_{PAY}$ is given by:

$$S_{PAY} \cong \frac{3 \cdot (\Delta\varepsilon - C) \cdot k_p}{\left(1 - \frac{kp}{kb}\right) \cdot (8e - 3(\Delta\varepsilon - C))} - \frac{\frac{kp}{kb}}{1 - \frac{kp}{kb}} \quad \text{Equation 39}$$

Figure 8:
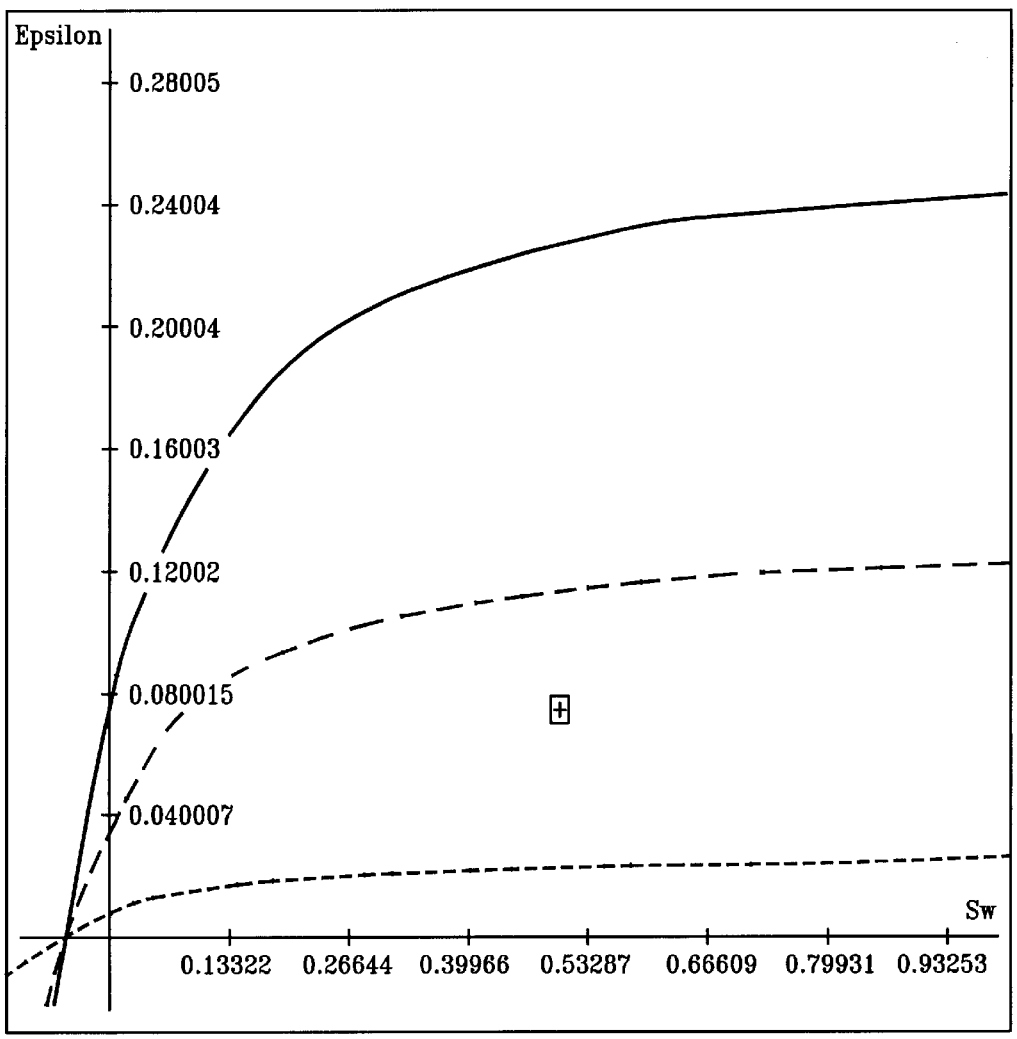
FIG. 8 illustrates, for a pay fluid of gas, the sensitivity of the anisotropic parameter $\delta$ to $S_{PAY}$, for various reasonable crack densities.

For a pay fluid of gas, the sensitivity of the anisotropic parameter $\epsilon$ to $S_{PAY}$ is shown in FIG. 8 for various reasonable crack densities. Note the excellent sensitivity of the parameter to $S_{PAY}$.

Next, by substituting Equation 35 into Equation 33, we get:

$$\delta = \frac{8 \cdot e(16 \cdot e \cdot (g - 1) \cdot (9 \cdot g + 17) - 13 \cdot (3 \cdot g^2 - 2)) \cdot (kb \cdot (s - 1) - kp \cdot s)}{3 \cdot (g - 1) \cdot (9 \cdot g + 17) \cdot (3 \cdot g - 2) \cdot (kb \cdot (kp - s + 1) + kp \cdot s)} \quad \text{Equation 40}$$

Figure 5:
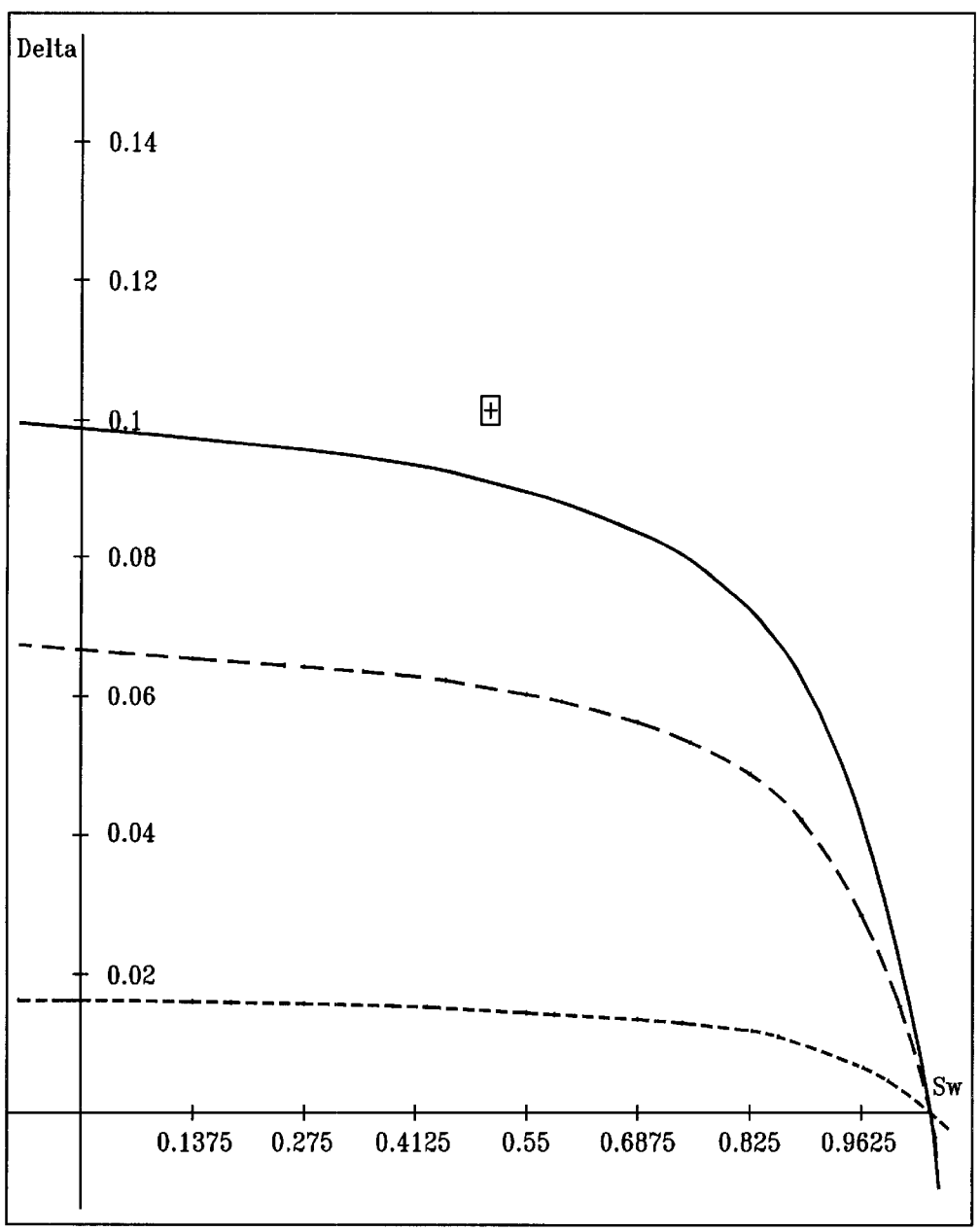
FIG. 5 illustrates, for a pay fluid of gas, the sensitivity of the anisotropic parameter $\delta$ to $S_w$, for various reasonable crack densities.

Or:

$$\Delta\delta = \frac{8 \cdot e(16 \cdot e \cdot (g - 1) \cdot (9 \cdot g + 17) - 13 \cdot (3 \cdot g^2 - 2)) \cdot (kb \cdot (s - 1) - kp \cdot s)}{3 \cdot (g - 1) \cdot (9 \cdot g + 17) \cdot (3 \cdot g - 2) \cdot (kb \cdot (kp - s + 1) + kp \cdot s)} + C \quad \text{Equation 41}$$

Where C is a constant dependent on the anisotropy of the cap rock. For a pay fluid of gas, the sensitivity of the anisotropic parameter $\delta$ to $S_w$ is shown in FIG. 5 for various reasonable crack densities. Note the excellent sensitivity of the parameter to $S_w$.

Solving for $S_w$ we get:

$$S_w \cong \frac{\begin{array}{c}kb \cdot (3 \cdot (\Delta\delta - C) \cdot (g - 1) \cdot (kp + 1) \cdot \\ (9 \cdot g + 17) \cdot (3 \cdot g^2 - 2) + \\ 8 \cdot e(16 \cdot e \cdot (g - 1) \cdot (9 \cdot g + 17) - 13 \cdot (3 \cdot g^2 - \end{array}}{\begin{array}{c}(kb - kp) \cdot (3 \cdot (\Delta\delta - C) \cdot (g - 1) \cdot \\ (9 \cdot g + 17) \cdot (3 \cdot g^2 - 2) + \\ 8 \cdot e \cdot (16 \cdot e \cdot (g - 1) \cdot (9 \cdot g + 17) - 13 \cdot (3 \cdot g^2 - \end{array}} \quad \text{Equation 42}$$

Or, if $g \cong 2$, by substituting Equation 53 into Equation 52, we get:

$$\delta = \frac{480 \cdot e \cdot (kp \cdot s - kb \cdot (s - 1))}{kb \cdot (135 \cdot kp - 119 \cdot (s - 1)) + 119 \cdot kp \cdot s} \quad \text{Equation 43}$$

And:

$$\Delta\delta = \frac{480 \cdot e \cdot (kp \cdot s - kb \cdot (s - 1))}{kb \cdot (135 \cdot kp - 119 \cdot (s - 1)) + 119 \cdot kp \cdot s} + C \quad \text{Equation 43.5}$$

Solving for $S_w$ we get:

$$S_w = \frac{kb \cdot ((\Delta\delta - C) \cdot 135 \cdot kp + 119) - 480 \cdot e}{(kb - kp) \cdot (119 \cdot (\Delta\delta - C) - 480 \cdot e)} \quad \text{Equation 44}$$

Figure 6:
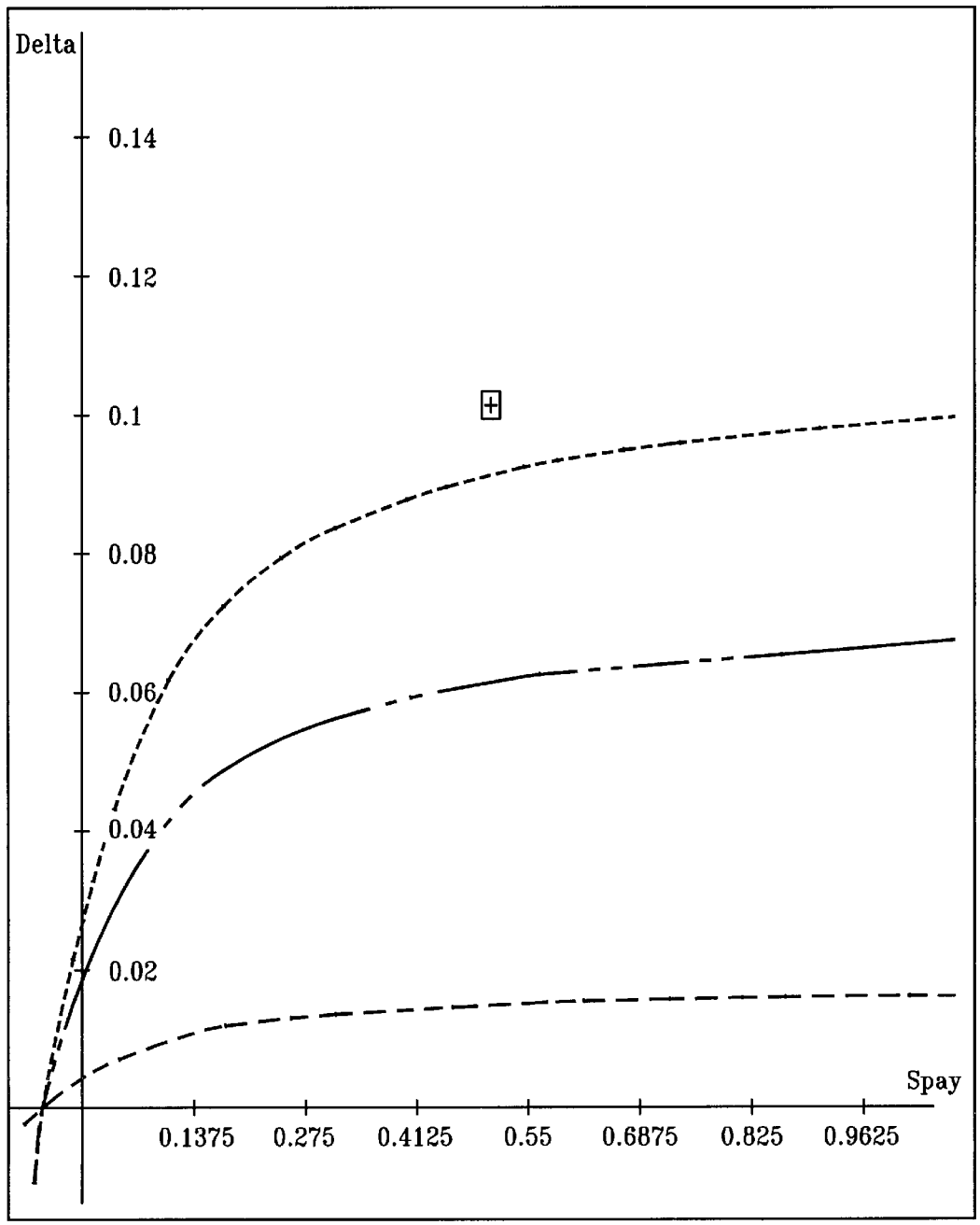
FIG. 6 illustrates, for a pay fluid of gas, the sensitivity of the anisotropic parameter $\delta$ to $S_{PAY}$, for various reasonable crack densities.

Using equation 11, we solve for $S_{PAY}$. For a pay fluid of gas, the sensitivity of the anisotropic parameter $\delta$ to $S_{PAY}$ is shown in FIG. 6 for various reasonable crack densities. Note the excellent sensitivity of the anisotropic parameter $\delta$ to $S_{PAY}$.

Method 3

In a case where a contact event is detectable on P-P data for an isotropic reservoir, the fluid changes, but the frame does not, making the shear modulus contrast zero. In this case, the AVO equation becomes:

$$AMP = A + B\ SIN^2\theta + C(TAN^2\theta - SIN^2\theta) \quad \text{Equation 45}$$

$$A = \frac{1}{2}\frac{\Delta Vp}{Vp} + \frac{1}{2}\frac{\Delta\rho}{\rho}$$

$$B = \frac{1}{2}\frac{\Delta Vp}{Vp}$$

$$C = \frac{1}{2}\frac{\Delta Vp}{Vp}$$

Or:

$$AMP = B_0 + B_1 TAN^2\theta + B_2 TAN^2\theta * SIN^2\theta \quad \text{Equation 46}$$

-continued $$B_0 = \frac{1}{2}\frac{\Delta V_p}{V_p} + \frac{1}{2}\frac{\Delta \rho}{\rho}$$

$$B_1 = \frac{1}{2}\frac{\Delta V_p}{V_p}$$

$$B_2 = 0$$

Using the above gives:

$$\frac{\Delta \rho}{\rho} = 2(A - B) \qquad \text{Equation 47}$$

The water saturation in g is given by:

$$S_W = \frac{\Delta \rho}{\phi(\rho_{BR} - \rho_{PAY})} \qquad \text{Equation 48}$$

$$S_w = \frac{2(A - B)\bar{\rho}}{\phi(\rho_{BR} - \rho_{PAY})} \qquad \text{Equation 49}$$

Where:
  A and B are the data derived curve fit coefficients;
  $\rho_{PAY}$ is the density of pure pay in situ;
  $\rho_{BR}$ is the density of pure brine in situ;
  $\bar{\rho}$ is the average density if the brine and fluid filled reservoir; and
  $\phi$ is the porosity of the reservoir.
The four parameters—$\rho_{PAY}$, $\rho_{BR}$, $\bar{\rho}$, $\phi$—can be accurately estimated.
Using equation 11, then:

$$S_{PAY} = 1 - \frac{2(A - B)\bar{\rho}}{\phi(\rho_{BR} - \rho_{PAY})} \qquad \text{Equation 50}$$

If Equation 46 is used, then the density contrast becomes:

$$\frac{\Delta \rho}{\rho} = 2(B_0 - B_1) \qquad \text{Equation 51}$$

but:

$$S_w = \frac{\Delta \rho}{\phi(\rho_{BR} - \rho_{PAY})} \qquad \text{Equation 52}$$

$$S_w = \frac{2(B_0 - B_1)\bar{\rho}}{\phi(\rho_{BR} - \rho_{PAY})} \qquad \text{Equation 53}$$

Where:
  $B_0$ and $B_1$ are the data derived curve fit coefficients;
  $\rho_{PAY}$ is the density of pure pay in situ;
  $\rho_{BR}$ is the density of pure brine in situ;
  $\bar{\rho}$ is the average density of the brine and fluid filled reservoir; and;
  $\phi$ is the porosity of the reservoir.
The four of these parameters—$\rho_{PAY}$, $\rho_{BR}$, $\bar{\rho}$, $\phi$—can be accurately estimated.
Using equation 11, $$S_{PAY} = 1 - \frac{2(B_0 - B_1)\bar{\rho}}{\phi(\rho_{BR} - \rho_{PAY})} \qquad \text{Equation 54}$$

Method 4

The next method uses the amplitudes from the angle stacks of seismic data to determine rock property contrasts, which in turn can be related to the water and pay saturation. The equations which describe the AVO response associated with a contrast in the rock properties are given by:

$$AMP(\theta) = A + B\ TAN^2\theta + C(TAN^2\theta - SIN^2\theta)$$

Or:

$$AMP(\theta) = B_0 + B_1\ TAN^2\theta + B_2\ TAN^2\theta\ SIN^2\theta$$

The angle stack and ending angle $\theta_e$ of the data, from some starting angle $\theta_s$, can be calculated from either of the above equations to produce:

$$STACK(\theta_s, \theta_e) = \frac{\int_{\theta_s}^{\theta_e} AMP(\theta)d\theta}{\int_{\theta_s}^{\theta_e} d\theta}$$

This gives:

$$STACK(\theta_s, \theta_e) = A \cdot f_1(\theta_s, \theta_e) + B \cdot f_2(\theta_s, \theta_e) + C \cdot f_3(\theta_s, \theta_e) \qquad \text{Equation 60}$$

Where:
  A, B and C are the AVO curve shape parameters
And:

$$f_1 = 1 \qquad \text{Equation 61}$$

$$f_2 = \frac{1}{2}\left[1 - \left(\frac{SIN(\theta_e)COS(\theta_e)}{(\theta_e - \theta_s)} - \frac{SIN(\theta_s)COS(\theta_s)}{(\theta_e - \theta_s)}\right)\right] \qquad \text{Equation 62}$$

$$f_3 = \frac{1}{2}\left[-3 + \frac{TAN(\theta_e) - TAN(\theta_s)}{(\theta_e - \theta_s)} + \frac{SIN(\theta_e)COS(\theta_e) - SIN(\theta_s)COS(\theta_s)}{(\theta_e - \theta_s)}\right] \qquad \text{Equation 63}$$

Or:

$$STACK(\theta_s, \theta_e) = B_0 \cdot G_1(\theta_s, \theta_e) + B_1 \cdot G_2(\theta_s, \theta_e) + B_2 \cdot G_3(\theta_{sT}, \theta_e) \qquad \text{Equation 64}$$

Where $B_0$, $B_1$ and $B_2$ are the AVO curve shape parameters.

$$G_1 = 1 \qquad \text{Equation 65}$$

$$G_2 = \left[\frac{1}{(\theta_e - \theta_s)}(TAN(\theta_e) - TAN(\theta_s)) - 1\right] \qquad \text{Equation 66}$$

$$G_3 = \left[-\frac{3}{2} + \left(\frac{1}{(\theta_e - \theta_s)}\right)(TAN\,\theta_e - TAN\,\theta_s) + \frac{1}{2}\left(\frac{1}{\theta_e - \theta_s}\right)(SIN\theta_e COS\,\theta_e - SIN\theta_s COS\,\theta_s)\right] \qquad \text{Equation 67}$$

A collection of angle stack amplitudes $STACK_1$, $STACK_2$, ... $STACK_N$, and their corresponding starting and ending stack angles $(\theta_s, \theta_e)_1$, $(\theta_s, \theta_e)_2$, ... $(\theta_s, \theta_e)_N$, can be fitted to either Equation 60 or 64 depending on which type of fit parameters are desired—A, B and C, or $B_0$, $B_1$ and $B_2$, respectively. The result will be optimal values being generated for the fit parameters A, B and C, or $B_0$, $B_1$ and $B_2$. The basis functions for the fit will be $f_1$, $f_2$ and $f_3$ as given by Equations 61, 62 and 63, if the parameters A, B and C are used, or $G_1$, $G_2$, and $G_3$ as given by Equation 65, 66 and 67, if $B_0$, $B_1$ and $B_2$, respectively, are used.

In terms of the curve shape parameters A, B and C, the rock property contrasts are:

$$\Delta\delta = \frac{8}{g^2} \cdot A + 2 \cdot B - \left(1 + \frac{4}{g^2}\right)\frac{dV\rho}{V\rho} + \frac{8}{g^2}\frac{dV_s}{V_s} \quad \text{Equation 68}$$

$$\Delta\varepsilon = 2C - \frac{\Delta V\rho}{V\rho} \quad \text{Equation 69}$$

$$\frac{\Delta\rho}{\rho} = 2(A - C) + \Delta\varepsilon \quad \text{Equation 70}$$

In terms of the curve shape parameters, $B_0$, $B_1$ and $B_2$, the rock property contrasts are:

$$\Delta\delta = \frac{8}{g^2}B_0 + 2B_1 - \left(1 + \frac{4}{g^2}\right)\frac{dV\rho}{V\rho} + \frac{8}{g^2}\frac{dV_s}{V_s} \quad \text{Equation 71}$$

$$\Delta\varepsilon = 2(B_1 + B_2) - \frac{\Delta V\rho}{V\rho} \quad \text{Equation 72}$$

$$\frac{\Delta\rho}{\rho} = 2(B_0 - B_1 - B_2) \quad \text{Equation 73}$$

The water saturation $S_w$ is given by:

$$S_w = \frac{\Delta\rho}{\phi(\rho_{BR} - \rho_{PAY})} \quad \text{Equation 74}$$

$$S_w = \frac{\left(2A - \frac{\Delta Vp}{Vp}\right)}{\phi(\rho_{BR} - \rho_{PAY})} \quad \text{Equation 75}$$

Where:
A and C are the data derived curve fit coefficients;
$\rho_{PAY}$ is the density of the pay fluid in situ;
$\rho_{BR}$ is the density of brine fluid in situ;
$\bar{\rho}$ is the average density of the fluid filled reservoir and the shale cap rock;
$\phi$ is the porosity of the reservoir; and $$\frac{\Delta Vp}{Vp}$$

is the velocity contrast.
The five parameters—$\rho_{PAY}$, $\rho_{BRINE}$, $\bar{\rho}$, $\phi$, $$\frac{\Delta Vp}{Vp}$$

—can be accurately estimated.
Using equation 11, $$S_{PAY} = 1 - \frac{2A - \frac{\Delta Vp}{Vp}}{\phi((\rho_{BR} - \rho_{BPAY}))} \quad \text{Equation 76}$$

Or, using equation 9, in terms of $B_0$, $B_1$ and $B_2$:

$$S_w = \frac{\left(2B_0 - \frac{\Delta Vp}{Vp}\right)}{\phi(\rho_{BR} - \rho_{PAY})} \quad \text{Equation 77}$$

Where:
$B_0$, $B_1$, and $B_2$ are the data derived curve fit coefficients;
$\rho_{PAY}$ is an estimate of the density of pay fluid in situ;

$\rho_{BR}$ is an estimate of the density of brine fluid in situ;
$\bar{\rho}$ is an estimate of the average density of the fluid filled reservoir and the cap rock;
$\phi$ is an estimate of the porosity of the reservoir; and $$\frac{\Delta Vp}{Vp}$$

is the velocity contrast.
The five parameters—$\rho_{PAY}$, $\rho_{BRINE}$, $\bar{\rho}$, $\phi$, $$\frac{\Delta Vp}{Vp}$$

—can be accurately estimated.
Using equation 11, $$\delta = \delta_{intr} + e \cdot \left(\frac{32}{(9 \cdot (1 + Kf))} - \frac{16}{15}\right) \quad \text{Equation 81}$$

Where $\epsilon_{intr}$ and $\delta_{intr}$ are the contributions due to the intrinsic anisotropy—the part not due to the presence of cracks. The fluid incompressibility as a function of water saturation $S_w$ can be written approximately as:

$$k_f = \frac{k_p \cdot k_b}{k_b + s_w(k_p - k_b)} \quad \text{Equation 82}$$

Where:
$k_f$ is the incompressibility of the composite fluid;
$k_b$ is the incompressibility of the pure brine fluid; and
$k_p$ is the incompressibility of the pure pay fluid.
Where, by substituting Equation 34 into Equation 35, we get:

$$\varepsilon = \frac{8 \cdot e(S_w[k_p - k_b] + k_b)}{3(k_b(k_p + 1) + S(k_p - k_b))} \quad \text{Equation 83}$$

$$\Delta\varepsilon = \frac{8 \cdot e(S_w[k_p - k_b] + k_b)}{3(k_b(k_p + 1) + S(k_p - k_b))} + C \quad \text{Equation 84}$$

Where C is a constant dependent on the anisotropy of the cap rock.
Solving for $S_w$ we get:

$$S_w = \frac{8e - 3(\Delta\varepsilon - C) \cdot (1 + k_p)}{(8e - 3(\Delta\varepsilon - C)) \cdot \left(1 - \frac{k_p}{k}\right)} \quad \text{Equation 85}$$

And $S_{PAY}$ is given by:

$$S_{PAY} = \frac{3 \cdot (\Delta\varepsilon - C) \cdot kp}{\left(1 - \frac{kp}{kb}\right) \cdot (8e - 3(\Delta\varepsilon) \cdot)} - \frac{\frac{kp}{kb}}{1 - \frac{kp}{kb}} \quad \text{Equation 86}$$

Next, by substituting Equation 35 into Equation 33, we get:

$$\delta = \frac{8 \cdot e \cdot (16 \cdot e \cdot (g-1) \cdot (9 \cdot g + 17) - 13 \cdot (3 \cdot g^2 - 2)) \cdot (kb \cdot (s-1) - kp \cdot s)}{3 \cdot (g-1) \cdot (9 \cdot g + 17) \cdot (3 \cdot g - 2) \cdot (kb \cdot (kp - s + 1) + kp \cdot s)}$$ Equation 87

$$\Delta\delta = \frac{8 \cdot e \cdot (16 \cdot e \cdot (g-1) \cdot (9 \cdot g + 17) - 13 \cdot (3 \cdot g^2 - 2)) \cdot (kb \cdot (s-1) - kp \cdot s)}{3 \cdot (g-1) \cdot (9 \cdot g + 17) \cdot (3 \cdot g - 2) \cdot (kb \cdot (kp - s + 1) + kp \cdot s)} + C$$ Equation 88

Where C is a constant dependent on the anisotropy of the cap rock. Solving for $S_w$ we get:

$$S_w = \frac{kb \cdot (3 \cdot \Delta\delta \cdot (g-1) \cdot (kp+1) \cdot (9 \cdot g + 17) \cdot (3 \cdot g^2 - 2) + 8 \cdot e(16 \cdot e \cdot (g-1) \cdot (9 \cdot g + 17) - 13 \cdot (3 \cdot g^2 - 2)))}{(kb - kp) \cdot (3 \cdot \Delta\delta \cdot (g-1) \cdot (9 \cdot g + 17) \cdot (3 \cdot g^2 - 2) + 8 \cdot e \cdot (16 \cdot e \cdot (g-1) \cdot (9 \cdot g + 17) - 13 \cdot (3 \cdot g^2 - 2)))}$$ Equation 89

Or, if g≅2, by substituting Equation 53 into Equation 52, we get:

$$\delta = \frac{480 \cdot e \cdot (kp \cdot s - kb \cdot (s-1))}{kb \cdot (135 \cdot kp - 119 \cdot (s-1)) + 119 \cdot kp \cdot s}$$ Equation 90

$$\Delta\delta = \frac{480 \cdot e \cdot (kps \cdot s - kb) \cdot (s-1)}{kb \cdot (135 \cdot kp - 119 \cdot (s-1)) + 119 \cdot kp \cdot s} + C$$ Equation 90.5

Solving for $S_w$ we get:

$$S_w = \frac{kb \cdot ((\Delta\delta - C) \cdot 135 \cdot kp + 119) - 480 \cdot e}{(kb - kp) \cdot (119 \cdot (\Delta\delta - C) - 480 \cdot e)}$$ Equation 91

Method 5

The next method uses the amplitudes from the angle stacks of seismic data to determine optimal stack attributes (OSA) by forming linear combinations and products of linear combinations of the angle stacks. These attributes are formed so that their values are strongly dependent on the water saturation $S_w$ or the pay saturation $S_{pay}$. These OSA attributes can be calculated for 2-D or 3-D data sets and displayed in 2-D or 3-D to highlight zones which are fully pay saturated, or to allow discrimination of partial versus fully saturated reservoirs. The ability to provide such discrimination is an essential and valuable part of the risk assessment of a prospect. To form the OSA it is necessary to start with the AVO equations:

$$AMP(\theta) = A + B\,TAN^2\theta + C(TAN^2\theta - SIN^2\theta)$$

Or:

$$AMP(\theta) = B_0 + B_1\,TAN^2\theta + B_2\,TAN^2\theta\,SIN^2\theta$$

The angle stack and ending angle $\theta_e$ of the data, from some starting angle $\theta_s$, can be calculated from either of the above equations to produce:

$$STACK(\theta_s, \theta_e) = \frac{\int_{\theta_s}^{\theta_e} AMP(\theta)\,d\theta}{\int_{\theta_s}^{\theta_e} d\theta}$$

This gives:

$$STACK(\theta_s, \theta_e) = A \cdot f_1(\theta_s, \theta_e) + B \cdot f_2(\theta_s, \theta_e) + C \cdot f_3(\theta_s, \theta_e)$$ Equation 92

Where:
  A, B and C are the AVO curve shape parameters
And:

$$f_1 = 1$$ Equation 93

$$f_2 = \frac{1}{2}\left[1 - \left(\frac{SIN(\theta_e)COS(\theta_e)}{(\theta_e - \theta_s)} - \frac{SIN(\theta_s)COS(\theta_s)}{(\theta_e - \theta_s)}\right)\right]$$ Equation 94

$$f_3 = \frac{1}{2}\left[\begin{array}{c} -3 + \frac{TAN(\theta_e) - TAN(\theta_s)}{(\theta_e - \theta_s)} + \\ \frac{SIN(\theta_e)COS(\theta_e) - SIN(\theta_s)COS(\theta_s)}{(\theta_e - \theta_s)} \end{array}\right]$$ Equation 95

Or:

$$STACK(\theta_s, \theta_e) = B_0 \cdot G_1(\theta_s, \theta_e) + B_1 \cdot G_2(\theta_s, \theta_e) + B_2 \cdot G_3(\theta_{sT}, \theta_e)$$ Equation 96

Where $B_0$, $B_1$ and $B_2$ are the AVO curve shape parameters.

$$G_1 = 1$$ Equation 97

$$G_2 = \left[\frac{1}{(\theta_e - \theta_s)}(TAN(\theta_e) - TAN(\theta_s)) - 1\right]$$ Equation 98

$$G_3 = \left[\begin{array}{c} -\frac{3}{2} + \left(\frac{1}{\theta_e - \theta_s}\right)(TAN\theta_e - TAN\theta_s) + \\ \frac{1}{2}\left(\frac{1}{\theta_e - \theta_s}\right)(SIN\theta_e COS\theta_e - SIN\theta_s COS\theta_s) \end{array}\right]$$ Equation 99

The amplitude of the angle stacks can be written for set specific values for $\theta_s$ and $\theta_e$ as:

$$STACK(\theta_s, \theta_e) = \alpha_1 \frac{\Delta V\rho}{V\rho} + \alpha_2 \frac{\Delta V_s}{V_s} + \alpha_3 \frac{\Delta\rho}{\rho} + \alpha_4 \Delta\delta + \alpha_5 \Delta\varepsilon$$ Equation 100

Where $a_1 \ldots a_5$ are contrasts determined by $\theta_s$ and $\theta_e$. Linear combinations of angle stacks can be formed as follows:

$$\sum_{i=1} C_i STACK(\theta_{s_i}, \theta_{e_i})$$ Equation 101

And products of linear combinations of the angle stack can be formed as follows:

$$= \left(\sum_i C_i STACK(\theta_{s_i}, \theta_{e_i})\right)\left(\sum_j D_j STACK(\theta_{s_j}, \theta_{e_j})\right)$$ Equation 102

Where:
  $C_i$ and $D_i$ are constants;
  $\theta_{s_i}$ is the starting angle;
  $\theta_{e_i}$ is the ending angle;
  $\phi_{s_i}$ is the starting angle; and
  $\phi_{e_i}$ is the ending angle.

With proper choices of $\theta_s$, $\theta_e$, $\phi_s$, $\phi_e$ and $C_i$ and $D_i$, an angle stack attribute can be created which varies strongly with $S_w$ or $S_{PAY}$. An example of an optimal angle stack attribute (OSA) for the case of an anisotropic low impedance reservoir is:

$$OSA = (STACK(30-45)) - STACK(15-30)) \qquad \text{Equation 103}$$

$$OSA = .22\left(\frac{\Delta g}{g} + .51\frac{\Delta \rho}{\rho} - .51\Delta\delta - .49\Delta\varepsilon\right) \qquad \text{Equation 103.1}$$

Figure 10:
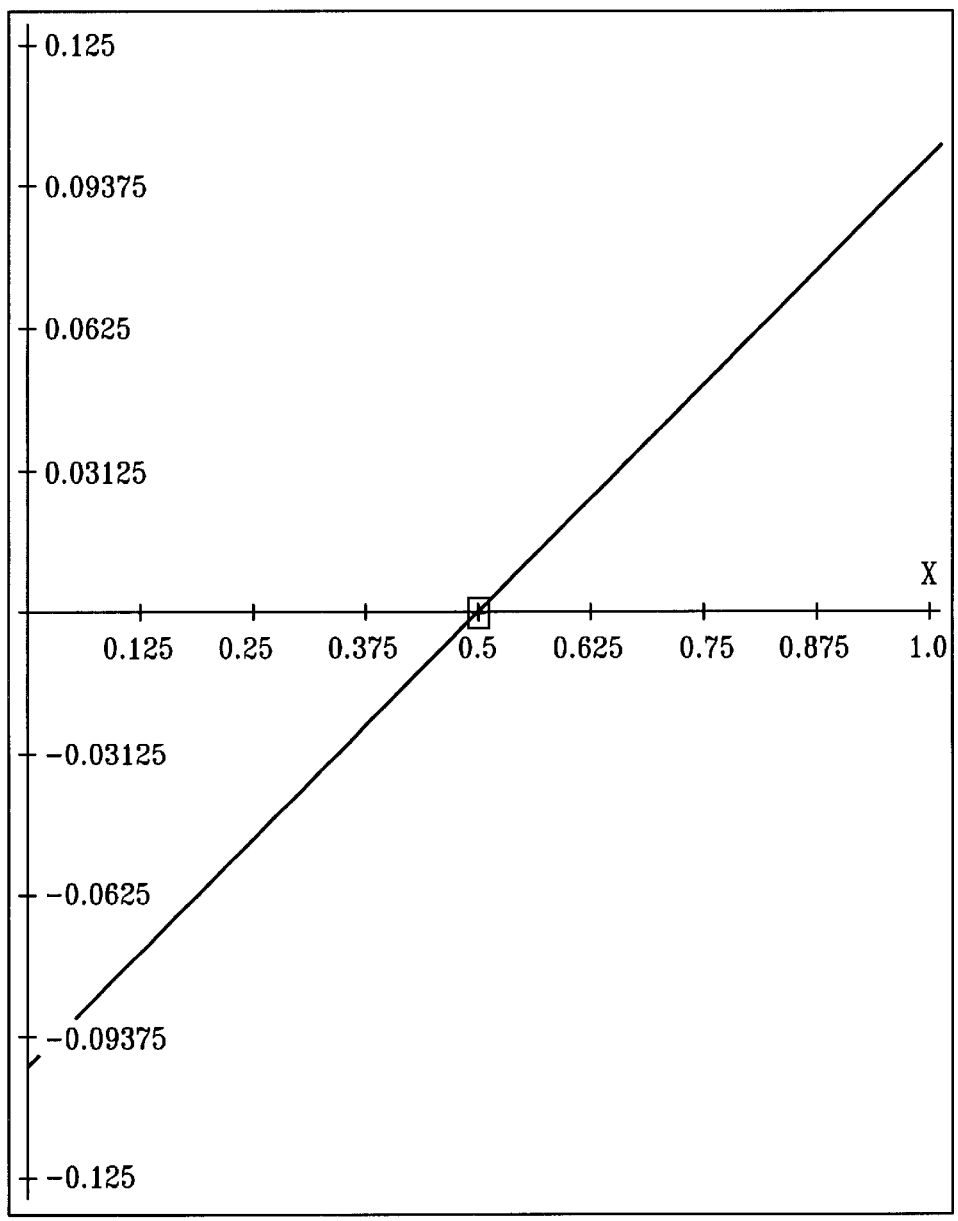
FIG. 10 illustrates the OSA's behavior as a function of $S_w$.

This OSA's behavior as a function of $S_w$ is given in FIG. 10. This type of attribute is an optimal stack attribute (OSA). Monitoring the value of this attribute from the brine to pay portion of the reservoir, and noting the optimal attribute change, allows prediction of the degree of pay saturation from seismic.

Method 6

The final method applies where P-S data is available which has been sorted into CCP ("common conversion point") gathers after having been velocity corrected, and preprocessed so as to preserve amplitude information. Next, amplitudes are extracted from the data on a lobe or sample-by-sample basis. These amplitudes, along with the P-wave velocity function and S-wave velocity function derived from the data or from a shear wave estimation, can be fitted using Equation 104, which describes the behavior of the amplitude as a function of the P-wave incidence angle ($\theta$).

Figure 12:
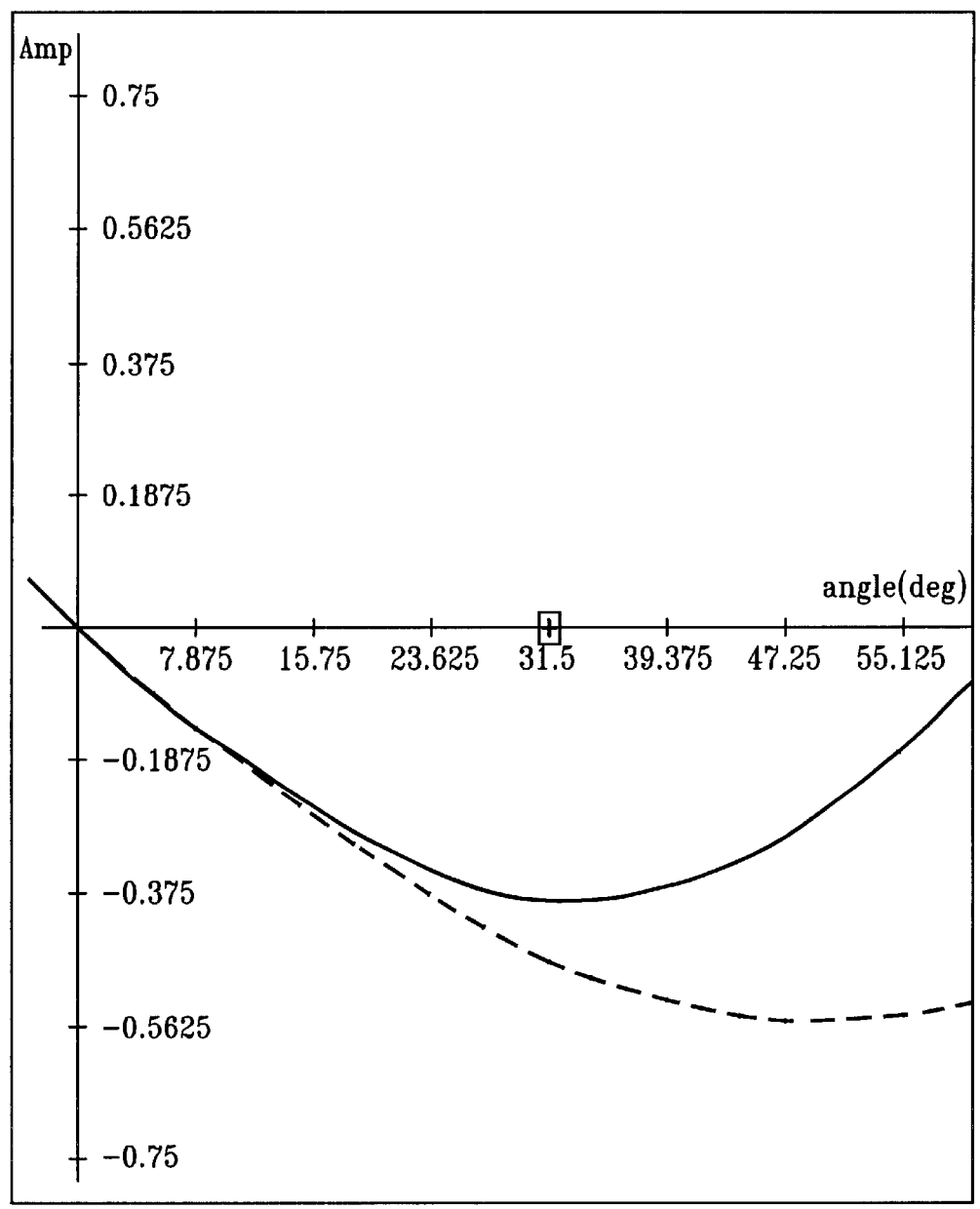
FIG. 12 illustrates AVO signatures for g=2, of a density contrast and shear wave velocity contrast respectively.

Equation 104 represents the linearization of the exact P-S reflectivity equations. The form of the equation is important and unique because each of the two terms $D_0$ and $D_1$ represent the AVO signatures of a density contrast and shear wave velocity contrast respectively. These signatures for g=2 are shown in FIG. 12. Note these two functions form the basic functions for linearized AVO analysis. These rock property contrasts are the most useful for establishing rock property interpretation. Besides providing $$\frac{\Delta \rho}{\rho} \text{ and } \frac{\Delta V_s}{V_s},$$

Equations 107 and 108 show the basis functions for density and shear wave velocity contrasts given by Equations 107 and 108 respectively.

The curve shape interpretation of these basic functions is noticeably different compared with the P-P case. The P-P AVO signature can be characterized by intercept (A or $B_0$) slope (B or $B_1$) and curvature (C and B or $B_2$ and $B_1$). In the P-S case the intercept is always zero and hence is not a meaningful parameter. FIG. 12 shows the shape of the two basic functions which are approximately up to 60 degrees.

$$AMP\_PS(\theta) = D_0\left(\frac{SIN\theta(2SIN^2\theta - g^2)}{2g\sqrt{g^2 - SIN^2\theta}} - \frac{SIN\theta COS\theta}{g}\right) + \qquad \text{Equation 104}$$

$$D_1\left(\frac{2SIN^3\theta}{g\sqrt{g^2 - SIN^2\theta}} - \frac{2SIN\theta COS\theta}{g}\right)$$

Where:

$$D_0 = \frac{\Delta \rho}{\rho} \qquad \text{Equation 105}$$

$$D_1 = \frac{\Delta V_s}{V_s} \qquad \text{Equation 106}$$

And g is an estimate of Vp/Vs found either directly from the data or by using Vp and Vs estimates. The resulting curve fit parameter is:

$$D_0 = \frac{\Delta \rho}{\rho}$$

And its basis function is:

$$\left(\frac{SIN\theta(2SIN^2\theta - g^2)}{2g\sqrt{g^2 - SIN^2\theta}} - \frac{SIN\theta COS\theta}{g}\right) \qquad \text{Equation 107}$$

And:

$$D_1 = \frac{\Delta V_s}{V_s}$$

The other curve fit parameter is:

$$\left(\frac{2SIN^3\theta}{g\sqrt{g^2 + SIN^2\theta}} - \frac{2SIN\theta COS\theta}{g}\right) \qquad \text{Equation 108}$$

These can be used to determine the water saturation in the following way:

$$S_w = \frac{\Delta \rho_{PS} - \Delta \rho_{BR}}{\phi(\rho_{BR} - \rho_{PAY})} \qquad \text{Equation 109}$$

Where:

$\Delta \rho_{PS} = \rho_{PS} - \rho_{SHALE}$;

$\Delta \rho_{BS} = \rho_{BS} - \rho_{SHALE}$;

$\rho_{FLUID}$=Density of the fluid filling the pore space $\phi$—the fluid has water saturation $S_w$;

$\rho_{BR}$=Density of the brine;

$\rho_{PAY}$=Density of the pure pay;

$\phi$=Porosity of the reservoir;

$\rho_{PS}$=Density of pay filled layer of saturation $S_w$; and $\rho_{PS}$=Density of brine filled layer.

Figure 9:
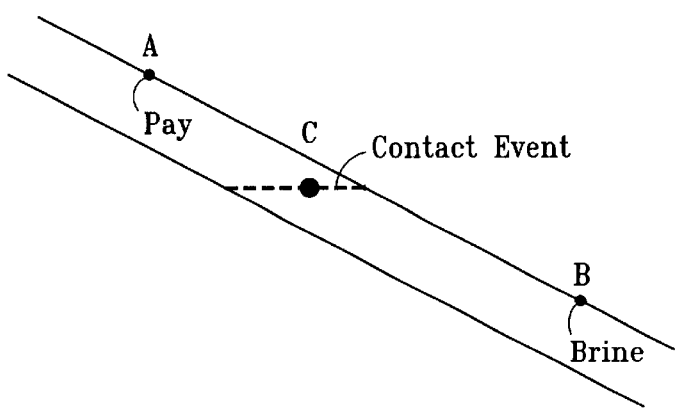
FIG. 9 shows the geometry of a layer where the upper portion is a pay-filled reservoir (location A), a brine-filled portion of the reservoir (location B), and the contact event (location C).

The pay saturation can be determined by combining the information provided by determining $D_0$ at two locations A and B as shown in FIG. 9. FIG. 9 shows the geometry of a layer where the upper portion is a pay-filled reservoir (location A), a brine-filled portion of the reservoir (location B), and the contact event (location C).

This gives:

$$(D_0)_A \cdot \overline{\rho} = \Delta \rho_{PS} \qquad \text{Equation 110}$$

$$(D_0)_B \cdot \overline{\rho} = \Delta \rho_{BS} \qquad \text{Equation 111}$$

Which produces:

$$\Delta \rho_{PS} - \Delta \rho_{BS} = (D_{0_A} - D_{0_B})\overline{\rho} \qquad \text{Equation 112}$$

Resulting in:

$$S_w = \frac{(D_{0_A} - D_{0_B})\bar{\rho}}{\phi(\rho_{BR} - \rho_{PAY})} \quad \text{Equation 113}$$

And:

$$S_{PAY} = 1 - S_w = 1 - \frac{(D_{0_B} - D_{0_A})\bar{\rho}}{\phi(\rho_{BR} - \rho_{PAY})} \quad \text{Equation 114}$$

Where:

$\Delta\rho_{PS} = \rho_{PS} - \rho_{SHALE}$;

$\Delta\rho_{BS} = \rho_{BS} - \rho_{SHALE}$;

$\rho_{FLUID}$=Density of the fluid filling the pore space $\phi$—the fluid has water saturation $S_w$;

$\rho_{BR}$=Density of the brine;

$\rho_{PAY}$=Density of the pure pay;

$\phi$=Porosity of the reservoir;

$\rho_{PS}$=Density of pay filled layer of saturation $S_w$; and $\rho_{PS}$=Density of brine filled layer.

In summary, what has been shown are the following methods to determine pay saturation ($S_{PAY}$) and water saturation ($S_w$) of subsurface layers, from surface seismic data.

1. A method to determine pay saturation ($S_{PAY}$) of subsurface isotropic layers for P-P data, comprising the following steps:

a) Positioning and employing a plurality of seismic wave source-detector pairs having different offsets and one common horizontal midpoint.

b) Generating seismic waves with said sources, and detecting and recording the amplitudes of seismic waves reflected by discontinuities in isotropic parameters of said strata for each source-detector pair.

c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces.

d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by by their tuning effects.

e) Velocity correcting the data using hyperbolic or non-hyperbolic methods, the result of which will be to produce optimally flat events.

f) Extracting amplitudes for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample.

g) Calculating the angle of incidence ($\theta$) by using the velocity function and the source receiver separations for each sample or lobe for each trace.

h) Fitting the extracted amplitudes using the above method along with the corresponding angles of incidence ($\theta$), resulting in the optimal data derived fit parameters (the curve shape parameters) A, B and C if Equation 1 is used, or $B_0$, $B_1$ and $B_2$ if Equation 2 is used.

i) Extracting the rock property contrasts from the curve shaped parameters using Equations 3, 4 and 5 if A, B and C are used, or Equations 6, 7 and 8 if $B_0$, $B_1$ and $B_2$ are used.

j) By determining the density contrast using Equation 3 if A, B and C are used, or Equation 6 if $B_0$, $B_1$ and $B_2$ are used, along with Equation 9, the water saturation will be given by Equation 10 or Equation 14, respectively.

k) Calculating the pay saturation using Equation 11 and resulting in Equation 12 in the case of A, B and C, or resulting in Equation 15 in the case of $B_0$, $B_1$ and $B_2$.

2. A method to determine pay saturation ($S_{PAY}$) of subsurface anisotropic layers for P-P data, comprising the following steps:

a) Positioning and employing a plurality of seismic wave source-detector pairs having different offsets and one common horizontal midpoint.

b) Generating seismic waves with said sources, and detecting and recording the amplitudes of seismic waves reflected by discontinuities in anisotropic parameters of said strata for each source-detector pair.

c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces.

d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by their tuning effects.

e) Velocity correcting the data using hyperbolic or non-hyperbolic methods, the result of which will be to produce optimally flat events.

f) Extracting amplitudes for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample.

g) Calculating the angle of incidence ($\theta$) by using the velocity function and the source receiver separations for each sample or lobe for each trace.

h) Fitting the extracted amplitudes using the above method along with the corresponding angles of incidence ($\theta$), resulting in the optimal data derived fit parameters (the curve shape parameters) A, B and C if Equation 16 is used, or $B_0$, $B_1$ and $B_2$ if Equation 17 is used.

i) Extracting the rock property contrasts from the curve shaped parameters using Equations 18, 19, 20, 21 and 22 if A, B and C are used, or Equations 23, 24, 25, 26 and 27 if $B_0$, $B_1$ and $B_2$ are used.

This method provides four ways of calculating $S_w$ and $S_{PAY}$:

j) By determining the density contrast using Equation 18 if A, B and C are used, or Equation 23 if $B_0$, $B_1$ and $B_2$ are used, along with Equation 9, the $S_w$ will be given by Equation 28 or Equation 30, respectively.

k) Calculating the $S_{PAY}$ using Equation 11 results in Equation 29 in the case of A, B and C, or Equation 31 in the case of $B_0$, $B_1$ and $B_2$.

l) Using Equations 38 and 21, $S_w$ can be found in the case where A, B and C are used. Equations 38 and 27 can be used when $B_0$, $B_1$ and $B_2$ are used.

m) Using Equations 39 and 21, $S_{PAY}$ can be found in the case where A, B and C are used. Equations 39 and 27 can be used when $B_0$, $B_1$ and $B_2$ are used.

n) Using Equations 42 and 22, $S_w$ can be found in terms of A, B and C, or Equations 42 and 26 can be used in the case where $B_0$, $B_1$ and $B_2$ are used.

o) Using Equations 11, 42 and 22, $S_{PAY}$ can be found in terms of of A, B and C, or Equations 11, 42 and 26 can be used in the case where $B_0$, $B_1$ and $B_2$ are used.

p) Using Equations 44 and 22, $S_w$ can be found in terms of A, B and C, or Equations 44 and 26 can be used in the case where $B_0$, $B_1$ and $B_2$ are used.

q) Using Equations 11, 44 and 22, $S_{PAY}$ can be found in terms of A, B and C, or Equations 11, 44 and 26 can be used in the case where $B_0$, $B_1$ and $B_2$ are used.

3. A method to determine pay saturation ($S_{PAY}$) of subsurface layers when a contact event is evident within the layers, comprising the following steps:

a) Positioning and employing a plurality of seismic wave source-detector pairs having different offsets and one common horizontal midpoint.

b) Generating seismic waves with said sources, and detecting and recording the amplitudes of seismic waves reflected by discontinuities in isotropic parameters of said strata for each source-detector pair.

c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces.

d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by their tuning effects.

e) Velocity correcting the data using hyperbolic or non-hyperbolic methods, the result of which will be to produce optimally flat events.

f) Extracting amplitudes for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample.

g) Calculating the angle of incidence ($\theta$) by using the velocity function and the source receiver separations for each sample or lobe for each trace.

h) Fitting the amplitudes extracted from the contact events using Equations 45 or 46 resulting in the optimal data derived fit parameters-the curve shape parameters A, B and C, or $B_0$, $B_1$ and $B_2$, respectively.

i) Extracting the rock property contrasts from the curve shaped parameters described above using Equations 47 or 51.

j) Using the density contrast resulting from Equation 3, along with Equation 20, the water saturation can be calculated giving Equations 49 or 53.

k) Calculating the pay saturation gives Equations 50 or 54.

4. A method to determine pay saturation ($S_{PAY}$) of subsurface isotropic or anisotropic layers for P-P data, comprising the following steps:

a) Positioning and employing a plurality of seismic wave source-detector pairs having different offsets and one common horizontal midpoint.

b) Generating seismic waves with said sources, and detecting and recording the amplitudes of seismic waves reflected by discontinuities in isotropic parameters of said strata for each source-detector pair.

c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces.

d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by their tuning effects.

e) Velocity correcting the data using hyperbolic or non-hyperbolic methods, the result of which will be to produce optimally flat events.

f) Calculating the angle of incidence ($\theta$) by using the velocity function and the source receiver separations for each sample or lobe for each trace.

g) Angle stacking of the data through various angle ranges $\theta_s$ and $\theta_e$.

h) Extracting amplitudes for each horizon from each angle stack in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample.

i) Fitting the extracted angle stack amplitudes using the above method, resulting in the optimal data derived fit parameters (the curve shape parameter) A, B and C, or $B_0$, $B_1$ and $B_2$ using Equation 60 or 64.

j) Extracting the rock property contrasts from the curve shaped parameters using Equations 68, 69 and 70 if A, B and C are used, or Equations 71, 72 and 73 if $B_0$, $B_1$ and $B_2$ are used.

k) Using the density contrast resulting from Equation 70 or 73, along with Equation 20, the water saturation can be calculated giving Equations 75 or 77.

l) Calculating the pay saturation using Equation 11 gives Equations 76 and 78.

This method provides three ways of calculating $S_w$ and $S_{PAY}$.

m) By determining the density contrast using Equation 70 if A, B and C are used, or Equation 73 if $B_0$, $B_1$ and $B_2$ are used, along with Equation 9, the water saturation will be given by Equation 75 or Equation 77, respectively.

n) Calculating the pay saturation using Equation 11 results in Equation 76 in the case of A, B and C, or Equation 78 in the case of $B_0$, $B_1$ and $B_2$.

o) Using Equations 85 and 69, $S_w$ can be found in the case where A, B and C are used. Equations 85 and 72 can be used when $B_0$, $B_1$ and $B_2$ are used.

p) Using Equations 86 and 69, $S_{PAY}$ can be found in the case where A, B and C are used. Equations 86 and 72 can be used when $B_0$, $B_1$ and $B_2$ are used.

q) Using Equations 89 and 68, $S_w$ can be found in terms of A, B and C, or Equations 89 and 71 can be used in the case where $B_0$, $B_1$ and $B_2$ are used.

r) Using Equations 89, 11 and 68, $S_{PAY}$ can be found in terms of of A, B and C, or Equations 89, 11 and 71 can be used in the case where $B_0$, $B_1$ and $B_2$ are used.

s) Using Equations 91 and 68, $S_w$ can be found in terms of A, B and C, or Equations 91 and 71 can be used in the case where $B_0$, $B_1$ and $B_2$ are used.

t) Using Equations 91, 11 and 68, $S_{PAY}$ can be found in terms of of A, B and C, or Equations 91, 11 and 71 can be used in the case where $B_0$, $B_1$ and $B_2$ are used.

5. A method to determine pay saturation ($S_{PAY}$) of subsurface anisotropic or isotropic layers for P-P data, comprising the following steps:

a) Positioning and employing a plurality of seismic wave source-detector pairs having different offsets and one common horizontal midpoint.

b) Generating seismic waves with said sources, and detecting and recording the amplitudes of seismic waves reflected by discontinuities in isotropic parameters of said strata for each source-detector pair.

c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces.

d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by their tuning effects.

e) Velocity correcting the data using hyperbolic or non-hyperbolic methods, the result of which will be to produce optimally flat events.

f) Calculating the angle of incidence ($\theta$) to be determined using the velocity function and the source receiver separations for each sample or lobe for each trace.

g) Angle stacking of the data through various angle ranges, $\theta_s$ and $\theta_e$, will be performed.

h) Extracting amplitudes from the angle stacks for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample.

i) Generating the OSA by making linear combinations of the angle stacks or products of linear combinations using Equations 101 and 102, or products of linear combinations of the angle stacks, so as to generate a quantity which is strongly sensitive to the value of the water saturation $S_w$, or pay saturation $S_{PAY}$. See FIG. 10. Using Equations 92 or 96 and 100, establish relationships between the OSA's and rock property contrasts.

j) Using Equations 74, 84, 88 and other well known relationships, relating the rock property contrasts to the water saturation, $S_w$, and pay saturation, $S_{PAY}$.

k) Relating the water saturation, $S_w$, and pay saturation, $S_{PAY}$, using Equation 100 and the relationships from item "k."

l) Displaying the OSA attributes in 2-D or 3-D and using them as a discriminating tool to find fully saturated layers and allowing the avoidance of low pay saturation layers.

6. A method to determine pay saturation ($S_{PAY}$) of subsurface layers for P-S data, comprising the following steps:

a) Positioning and employing a plurality of seismic wave source-detector pairs having different offsets and one common horizontal midpoint.

b) Generating seismic waves with said sources, and detecting and recording the amplitudes of seismic waves reflected by discontinuities in isotropic, anisotropic or absorption parameters of said strata for each source-detector pair.

c) Acquiring seismic data by using a collection of sources and a collection of receivers with the data acquired in either 2-D or 3-D to be sorted into common reflection point (CRP), gathers which have a common reflection point with varying offsets for each of the traces as represented in this ensemble of traces.

d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic, statistical or combined nature. These corrections will result in amplitudes which now are governed purely by rock property contrasts in the subsurface and by their tuning effects.

e) Velocity correcting the data using hyperbolic or non-hyperbolic methods, the result of which will be to produce optimally flat events.

f) Extracting amplitudes for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample.

g) Calculating the angle of incidence ($\theta$) to be determined using the velocity function and the source receiver separations for each sample or lobe for each trace.

h) Fitting the extracted amplitudes using the above method resulting in the optimal data derived fit parameters (the curve shape parameter) DO and Di using Equation 104.

i) Extracting the rock property contrasts from the curve shaped parameters described above using Equations 105 and 106.

j) Using the density contrast resulting from Equations 105 and 106, along with Equation 109, to calculate the water saturation giving Equation 113.

k) Calculating the pay saturation using Equation 114.

7. A method to determine pay saturation ($S_{PAY}$) of subsurface isotropic layers for P-P data, comprising the following steps:

a) positioning and employing a plurality of seismic wave source-detector pairs having different offsets and one common horizontal midpoint;

b) generating seismic waves with the source-detector pairs, and detecting and recording into traces, as seismic data samples, the amplitudes of seismic waves reflected by discontinuities in the subsurface isotropic layers, for each source-detector pair;

c) sorting the traces into common midpoint (CMP) gathers, which have a common midpoint or reflection point, and have varying offsets;

d) providing amplitude corrections to the seismic data samples to eliminate effects associated with spherical divergence, array effects, transmission effects, absorption effects, and other effects associated with energy propagating through and reflecting from subsurface horizons;

e) modifying the seismic data samples to generate velocity-corrected seismic data samples;

f) extracting amplitudes from the seismic data samples, for each subsurface horizon, to generate extracted amplitudes;

g) calculating the angle of incidence ($\theta$) by using a velocity function and source receiver separations, for each seismic data sample;

h) fitting the extracted amplitudes and the corresponding angles of incidence ($\theta$), to the following equation, $$AMP(\theta) = A + B\ SIN^2\theta + C(TAN^2\theta - SIN^2\theta)$$

where:

$$A = \frac{1}{2}\frac{\Delta Vp}{Vp} + \frac{1}{2}\frac{\Delta\rho}{\rho}$$

$$B = \frac{1}{2}\frac{\Delta Vp}{Vp} - \frac{2}{g^2}\left(2\frac{\Delta Vs}{Vs} + \frac{\Delta\rho}{\rho}\right) + \frac{1}{2}\Delta\delta$$

$$C = \frac{1}{2}\frac{\Delta Vp}{Vp} + \frac{1}{2}\Delta\varepsilon$$

to generate curve shape parameters A, B and C;

i) extracting rock property contrasts from the curve shape parameters using the following equations, $$\frac{\Delta\rho}{\rho} = 2(A - C)$$

$$\frac{\Delta Vp}{Vp} = 2C$$

$$\frac{\Delta Vs}{Vs} = (C - A) + \frac{g^2}{4}(C - B);$$

j) determining the density contrast using the following equation, $$S_w = \frac{\Delta\rho}{\phi(\rho_{BR} - \rho_{PAY})}$$

determining the water saturation by the following equation, $$S_w = \frac{2(A - C)\bar{\rho}}{\phi(\rho_{BR} - \rho_{PAY})}; \text{ and}$$

k) calculating the pay saturation using the following equations:

$$S_{PAY} = 1 - S_w \text{ and } S_{PAY} = 1 - \frac{2(A - C)\bar{\rho}}{\phi(\rho_{BR} - \rho_{PAY})}$$

8. A method to determine pay saturation ($S_{PAY}$) of subsurface isotropic layers for P-P data, comprising the following steps:

a) positioning and employing a plurality of seismic wave source-detector pairs having different offsets and one common horizontal midpoint;

b) generating seismic waves with the source-detector pairs, and detecting and recording into traces, as seismic data samples, the amplitudes of seismic waves reflected by discontinuities in the subsurface isotropic layers, for each source-detector pair;

c) sorting the traces into common midpoint (CMP) gathers, which have a common midpoint or reflection point, and have varying offsets;

d) providing amplitude corrections to the seismic data samples to eliminate effects associated with spherical divergence, array effects, transmission effects, absorption effects, and other effects associated with energy propagating through and reflecting from subsurface horizons;

e) modifying the seismic data samples to generate velocity-corrected seismic data samples;

f) extracting amplitudes from the seismic data samples, for each subsurface horizon, to generate extracted amplitudes;

g) calculating the angle of incidence ($\theta$) by using a velocity function and source receiver separations, for each seismic data sample;

h) fitting the extracted amplitudes and the corresponding angles of incidence ($\theta$), to the following equation, $$AMP(\theta) = B_0 + B_1\ TAN^2\theta + B_2\ TAN^2\theta\ SIN^2\theta$$

Where:

$$B_0 = A = \frac{1}{2}\frac{\Delta Vp}{Vp} + \frac{1}{2}\frac{\Delta \rho}{\rho}$$

$$B_1 = B = \frac{1}{2}\frac{\Delta Vp}{Vp} - \frac{2}{g^2}\left(2\frac{\Delta Vs}{Vs} + \frac{\Delta \rho}{\rho}\right)$$

$$B_2 = C - B = \frac{2}{g^2}\left(2\frac{\Delta Vs}{Vs} + \frac{\Delta \rho}{\rho}\right)$$

Where:

$$g = \frac{\overline{Vp}}{\overline{Vs}}$$

$$\frac{\Delta Vp}{Vp} = \frac{Vp_2 - Vp_1}{\overline{Vp}}$$

$$\frac{\Delta Vs}{Vs} = \frac{Vs_2 - Vs_1}{\overline{Vs}}$$

$$\frac{\Delta \rho}{\rho} = \frac{\rho_2 - \rho_1}{\overline{\rho}}$$

$$\overline{Vp} = \frac{Vp_1 + Vp_2}{2}$$

$$\overline{Vs} = \frac{Vs_1 + Vs_2}{2}$$

$$\overline{\rho} = \frac{\rho_1 + \rho_2}{2}$$

i) to generate curve shape parameters $B_0$, $B_1$ and $B_2$;
j) extracting rock property contrasts from the curve shape parameters using the following equations, Equations 6, 7 and 8 if $B_0$, $B_1$ and $B_2$ are used $$\frac{\Delta \rho}{\rho} = 2(B_0 - B_1 - B_2)$$

$$\frac{\Delta Vp}{Vp} = 2C = 2(B_1 + B_2)$$

$$\frac{\Delta Vs}{Vs} = B_0 - B_1 - B_2\left(1 + \frac{g^2}{4}\right)$$

determining the density contrast using the following equation, $$S_w = \frac{\Delta \rho}{\phi(\rho_{BR} - \rho_{PAY})}$$

k) determining the water saturation by the following equation, $$S_W = \frac{2(B_0 - B_1 - B_2)\overline{\rho}}{\phi(\rho_{BR} - \rho_{PAY})}; \text{ and}$$

l) calculating the pay saturation using the following equations:

$$S_{PAY} = 1 - S_w \text{ and } S_{PAY} = 1 - \frac{2(B_0 - B_1 - B_2)\overline{\rho}}{\phi(\rho_{BR} - \rho_{PAY})}$$

Although this detailed description has shown and described illustrative embodiments of the invention, this description contemplates a wide range of modifications, changes, and substitutions. In some instances, one may employ some features of the present invention without a corresponding use of the other features. Accordingly, it is appropriate that readers should construe the appended claims broadly, and in a manner consistent with the scope of the invention.

What is claimed is:

1. A method to determine pay saturation ($S_{PAY}$) of subsurface isotropic layers for P-P data, comprising the following steps:

a) positioning and employing a plurality of seismic wave source-detector pairs having different offsets and one common horizontal midpoint;

b) generating seismic waves with the source-detector pairs, and detecting and recording into traces, as seismic data samples, the amplitudes of seismic waves reflected by discontinuities in the subsurface isotropic layers, for each source-detector pair;

c) sorting the traces into common midpoint (CMP) gathers, which have a common midpoint or reflection point, and have varying offsets;

d) providing amplitude corrections to the seismic data samples to eliminate effects associated with spherical divergence, array effects, transmission effects, absorption effects, and other effects associated with energy propagating through and reflecting from subsurface horizons;

e) modifying the seismic data samples to generate velocity-corrected seismic data samples;

f) extracting amplitudes from the seismic data samples, for each subsurface horizon, to generate extracted amplitudes;

g) calculating the angle of incidence ($\theta$) by using a velocity function and source receiver separations, for each seismic data sample;

h) fitting the extracted amplitudes and the corresponding angles of incidence ($\theta$), to the following equation, $$AMP(\theta) = A + B \sin^2\theta + C(\tan^2\theta \sin^2\theta)$$

where:

$$A = \frac{1}{2}\frac{\Delta Vp}{Vp} + \frac{1}{2}\frac{\Delta \rho}{\rho}$$

$$B = \frac{1}{2}\frac{\Delta Vp}{Vp} - \frac{2}{g^2}\left(2\frac{\Delta Vs}{Vs} + \frac{\Delta \rho}{\rho}\right) + \frac{1}{2}\Delta\delta$$

$$C = \frac{1}{2}\frac{\Delta Vp}{Vp} + \frac{1}{2}\Delta\varepsilon$$

to generate curve shape parameters A, B and C;

i) extracting rock property contrasts from the curve shape parameters using the following equations, $$\frac{\Delta \rho}{\rho} = 2(A - C)$$

$$\frac{\Delta Vp}{Vp} = 2C$$

$$\frac{\Delta Vs}{Vs} = (C - A) + \frac{g^2}{4}(C - B);$$

j) determining the density contrast using the following equation, $$S_w = \frac{\Delta\rho}{\phi(\rho_{BR} - \rho_{PAY})}$$

determining the water saturation by the following equation, $$S_w = \frac{2(A-C)\bar{\rho}}{\phi(\rho_{BR} - \rho_{PAY})}; \text{ and}$$

k) calculating the pay saturation using the following equations:

$$S_{PAY} = 1 - S_w \text{ and } S_{PAY} = 1 - \frac{2(A-C)\bar{\rho}}{\phi(\rho_{BR} - \rho_{PAY})}.$$

2. A method to determine pay saturation ($S_{PAY}$) of subsurface isotropic layers for P-P data, comprising the following steps:

a) positioning and employing a plurality of seismic wave source-detector pairs having different offsets and one common horizontal midpoint;

b) generating seismic waves with the source-detector pairs, and detecting and recording into traces, as seismic data samples, the amplitudes of seismic waves reflected by discontinuities in the subsurface isotropic layers, for each source-detector pair;

c) sorting the traces into common midpoint (CMP) gathers, which have a common midpoint or reflection point, and have varying offsets;

d) providing amplitude corrections to the seismic data samples to eliminate effects associated with spherical divergence, array effects, transmission effects, absorption effects, and other effects associated with energy propagating through and reflecting from subsurface horizons;

e) modifying the seismic data samples to generate velocity-corrected seismic data samples;

f) extracting amplitudes from the seismic data samples, for each subsurface horizon, to generate extracted amplitudes;

g) calculating the angle of incidence ($\theta$) by using a velocity function and source receiver separations, for each seismic data sample;

h) fitting the extracted amplitudes and the corresponding angles of incidence ($\theta$), to the following equation, $$AMP(\theta) = B_0 + B_1 \tan^2\theta, B_2 \tan^2\theta \sin^2\theta$$

Where:

$$B_0 = A = \frac{1}{2}\frac{\Delta Vp}{Vp} + \frac{1}{2}\frac{\Delta\rho}{\rho}$$

$$B_1 = B = \frac{1}{2}\frac{\Delta Vp}{Vp} - \frac{2}{g^2}\left(2\frac{\Delta Vs}{Vs} + \frac{\Delta\rho}{\rho}\right)$$

$$B_2 = C - B = \frac{2}{g^2}\left(2\frac{\Delta Vs}{Vs} + \frac{\Delta\rho}{\rho}\right)$$

Where:

$$g = \frac{\overline{Vp}}{\overline{Vs}}$$

$$\frac{\Delta Vp}{\overline{Vp}} = \frac{Vp_2 - Vp_1}{\overline{Vp}}$$

$$\frac{\Delta Vs}{\overline{Vs}} = \frac{Vs_2 - Vs_1}{\overline{Vs}}$$

$$\frac{\Delta\rho}{\bar{\rho}} = \frac{\rho_2 - \rho_1}{\bar{\rho}}$$

$$\overline{Vp} = \frac{Vp_1 + Vp_2}{2}$$

$$\overline{Vs} = \frac{Vs_1 + Vs_2}{2}$$

$$\bar{\rho} = \frac{\rho_1 + \rho_2}{2}$$

i) to generate curve shape parameters $B_0$, $B_1$ and $B_2$;

j) extracting rock property contrasts from the curve shape parameters using the following equations, $$\frac{\Delta\rho}{\rho} = 2(B_0 - B_1 - B_2)$$

$$\frac{\Delta Vp}{Vp} = 2C = 2(B_1 + B_2)$$

$$\frac{\Delta Vs}{Vs} = B_0 - B_1 - B_2\left(1 + \frac{g^2}{4}\right)$$

determining the density contrast using the following equation, $$S_w = \frac{\Delta\rho}{\phi(\rho_{BR} - \rho_{PAY})}$$

k) determining the water saturation by the following equation, $$S_W = \frac{2(B_0 - B_1 - B_2)\bar{\rho}}{\phi(\rho_{BR} - \rho_{PAY})}; \text{ and}$$

l) calculating the pay saturation using the following equations:

$$S_{PAY} = 1 - S_w \text{ and } S_{PAY} = 1 - \frac{2(B_0 - B_1 - B_2)\bar{\rho}}{\phi(\rho_{BR} - \rho_{PAY})}.$$

3. A method for determining pay saturation ($S_{PAY}$) of subsurface anisotropic layers for P-P data, comprising the following steps:

a) positioning and employing a plurality of seismic wave source-detector pairs having different offsets and one common horizontal midpoint;

b) generating seismic waves with the source-detector pairs, and detecting and recording into traces, as seismic data samples, the amplitudes of seismic waves reflected by discontinuities in the subsurface anisotropic layers, for each source-detector pair;

c) sorting the traces into common midpoint (CMP) gathers, which have a common midpoint or reflection point, and have varying offsets;

d) providing amplitude corrections to the seismic data samples to eliminate effects associated with spherical divergence, array effects, transmission effects, absorption effects, and other effects associated with energy propagating through and reflecting from subsurface horizons;

e) modifying the seismic data samples to generate velocity-corrected seismic data samples;

f) extracting amplitudes from the seismic data samples, for each subsurface horizon, to generate extracted amplitudes; and g) calculating the angle of incidence ($\theta$) by using a velocity function and source receiver separations, for each seismic data sample.

4. The method of claim 3, further comprising the steps of:

a) fitting the extracted amplitudes and the corresponding angles of incidence ($\theta$), to the following equation, $$AMP(\theta)=A+B\ SIN^2\theta+C(TAN^2\theta-SIN^2\theta)$$

Where:

$$A = \frac{1}{2}\frac{\Delta Vp}{Vp} + \frac{1}{2}\frac{\Delta \rho}{\rho}$$

$$B = \frac{1}{2}\frac{\Delta VP}{Vp} - \frac{2}{g^2}\left(2\frac{\Delta Vs}{Vs} + \frac{\Delta \rho}{\rho}\right) + \frac{1}{2}\Delta\delta$$

$$C = \frac{1}{2}\frac{\Delta VP}{Vp} + \frac{1}{2}\Delta\varepsilon$$

to generate curve shape parameters A, B and C; and b) extracting rock property contrasts from the curve shape parameters using the following equations, $$\frac{\Delta \rho}{\rho} = 2(A-C) + \Delta\varepsilon$$

$$\frac{\Delta V\rho}{V\rho} = 2C - \Delta\varepsilon$$

$$\frac{\Delta Vs}{Vs} = (C-A) + \frac{g^2}{4}(C-B) + \frac{g^2}{8}(\Delta\varepsilon - \Delta\delta) + \frac{1}{2}\Delta\varepsilon$$

$$\Delta\varepsilon = 2C - \frac{\Delta V\rho}{V\rho}$$

$$\Delta\delta = \frac{8}{g^2}\cdot A + 2\cdot B - \left(1 + \frac{4}{g^2}\right)\frac{dV\rho}{V\rho} + \frac{8dV_s}{V_s}.$$

5. The method of claim 4, further comprising the steps of:

a) determining the water saturation by the following equation, $$S_w = \frac{\left(2A - \frac{\Delta Vp}{Vp}\right)}{\phi(\rho_{BR} - \rho_{PAY})};$$

where:

A and C are the data derived curve fit coefficients;
$\rho_{PAY}$ is the density of the pay fluid in situ;
$\rho_{BR}$ is the density of brine fluid in situ;
$\bar{\rho}$ is the average density of the fluid filled reservoir and the shale cap rock;

$\phi$ is the porosity of the reservoir; and $$\frac{\Delta Vp}{Vp}$$

is the velocity contrast, and b) calculating the pay saturation using the following equation:

$$S_{PAY} = 1 - \frac{2A - \frac{\Delta Vp}{Vp}}{\phi((\rho_{BR} - \rho_{BPAY})}.$$

6. The method of claim 4, further comprising the steps of:

a) determining the water saturation by the following equations, $$S_w \cong \frac{8e - 3(\Delta\varepsilon - C)\cdot(1+k_p)}{(8e - 3(\Delta\varepsilon - C))\cdot\left(1 - \frac{k_p}{k}\right)} \text{ and}$$

$$\Delta\varepsilon = 2C - \frac{\Delta V\rho}{V\rho}; \text{ and}$$

b) calculating the pay saturation using the following equation:

$$S_{PAY} \cong \frac{3\cdot(\Delta\varepsilon - C)\cdot kp}{\left(1 - \frac{kp}{kb}\right)\cdot(8e - 3(\Delta\varepsilon - C))} - \frac{\frac{kp}{kb}}{1 - \frac{kp}{kb}}$$

7. The method of claim 4, further comprising the steps of:

a) determining the water saturation by the following equations, $$S_w \cong \frac{\begin{aligned}&kb\cdot(3\cdot(\Delta\delta - C)\cdot(g-1)\cdot(kp+1)\cdot(9\cdot g+17)\cdot(3\cdot g^2-2) + \\ & 8\cdot e(16\cdot e\cdot(g-1)\cdot(9\cdot g+17) - 13\cdot(3\cdot g^2-2)))\end{aligned}}{\begin{aligned}&(kb-kp)\cdot(3\cdot(\Delta\delta - C)\cdot(g-1)\cdot(9\cdot g+17)\cdot(3\cdot g^2-2) + \\ & 8\cdot e\cdot(16\cdot e\cdot(g-1)\cdot(9\cdot g+17) - 13\cdot(3\cdot g^2-2)))\end{aligned}}$$

and $$\Delta\delta = \frac{8}{g^2}\cdot A + 2\cdot B - \left(1 + \frac{4}{g^2}\right)dV\frac{\rho}{V\rho} + \frac{8dV_s}{V_s};$$

and b) calculating the pay saturation using the following equation:

$$S_{PAY}=1-S_w.$$

8. The method of claim 4, further comprising the steps of:

a) determining the water saturation by the following equations, $$S_w = \frac{kb\cdot((\Delta\delta - C)\cdot 135\cdot kp + 119) - 480\cdot e}{(kb-kp)\cdot(119\cdot(\Delta\delta - C) - 480\cdot e)}$$

and $$\Delta\delta = \frac{8}{g^2}\cdot A + 2\cdot B - \left(1 + \frac{4}{g^2}\right)\frac{dV\rho}{V\rho} + \frac{8dV_s}{V_s}; \text{ and}$$

b) calculating the pay saturation using the following equation:

$S_{PAY}=1-S_w$.

9. The method of claim 3, further comprising the following steps:

a) fitting the extracted amplitudes and the corresponding angles of incidence ($\theta$), to the following equations, $$AMP(\theta)=B_0+B_1 \, TAN^2\theta+B_2 \, TAN^2\theta \, SIN^2\theta$$

Where:

$$B_0 = A = \frac{1}{2}\frac{\Delta Vp}{Vp} + \frac{1}{2}\frac{\Delta \rho}{\rho}$$

$$B_1 = B = \frac{1}{2}\frac{\Delta Vp}{Vp} - \frac{2}{g^2}\left(2\frac{\Delta Vs}{Vs} + \frac{\Delta\rho}{\rho}\right) + \frac{1}{2}\Delta\delta$$

$$B_2 = C - B = \frac{2}{g^2}\left(2\frac{\Delta Vs}{Vs} + \frac{\Delta\rho}{\rho}\right) + \frac{1}{2}\Delta\varepsilon - \frac{1}{2}\Delta\delta$$

and where:

$$g = \frac{\overline{Vp}}{\overline{Vs}}$$

$$\frac{\Delta Vp}{Vp} = \frac{Vp_2 - Vp_1}{\overline{Vp}}$$

$$\frac{\Delta Vs}{Vs} = \frac{Vs_2 - Vs_1}{\overline{Vs}}$$

$$\frac{\Delta \rho}{\rho} = \frac{\rho_2 - \rho_1}{\overline{\rho}}$$

$$\Delta\delta = \delta_2 - \delta_1$$

$$\Delta\varepsilon = \varepsilon_2 - \varepsilon_1$$

$$\overline{Vp} = \frac{Vp_1 + Vp_2}{2}$$

$$\overline{Vs} = \frac{Vs_1 + Vs_2}{2}$$

$$\overline{\rho} = \frac{\rho_1 + \rho_2}{2}$$

to generate curve shape parameters $B_0$, $B_1$, and $_2$; and b) extracting rock property contrasts from the curve shape parameters using the following equations, $$\frac{\Delta\rho}{\rho} = 2(B_0 - B_1 - B_2) + \Delta\varepsilon$$

$$\frac{\Delta V\rho}{V\rho} = 2(B_1 + B_2) - \Delta\varepsilon$$

$$\frac{\Delta Vs}{Vs} = B_0 - B_1 - B_2\left(1 + \frac{g^2}{4}\right) + \frac{g^2}{g}(\Delta\varepsilon - \Delta\delta) + \frac{1}{2}\Delta\varepsilon$$

$$\Delta\delta = \frac{8}{g^2}B_0 + 2B_1 - \left(1 + \frac{4}{g^2}\right)\frac{dV\rho}{V\rho} + \frac{8dV_s}{g^2 V_s}$$

$$\Delta\varepsilon = 2(B_1 + B_2) - \frac{\Delta V\rho}{V\rho}.$$

10. The method of claim 9, further comprising the steps of:

a) determining the water saturation by the following equation, $$S_w = \frac{\left(2B_0 - \frac{\Delta Vp}{Vp}\right)}{\phi(\rho_{BR} - \rho_{PAY})}; \text{ and}$$

b) calculating the pay saturation using the following equation:

$$S_{PAY} = 1 - \frac{2B_0 - \frac{\Delta Vp}{Vp}}{\phi(\rho_{BR} - \rho_{PAY})}.$$

11. The method of claim 9, further comprising the steps of:

a) determining the water saturation by the following equation, $$S_w \cong \frac{8e - 3(\Delta\varepsilon - C)\cdot(1 + k_p)}{(8e - 3(\Delta\varepsilon - C))\cdot\left(1 - \frac{k_p}{k}\right)}; \text{ and}$$

b) calculating the pay saturation using the following equation:

$$S_{PAY} \cong \frac{3\cdot(\Delta\varepsilon - C)\cdot kp}{\left(1 - \frac{kp}{kb}\right)\cdot(8e - 3(\Delta\varepsilon - C))} - \frac{\frac{kp}{kb}}{1 - \frac{kp}{kb}}.$$

12. The method of claim 9, further comprising the steps of:

a) determining the water saturation by the following equation, $$S_w \cong \frac{kb\cdot(3\cdot(\Delta\delta - C)\cdot(g-1)\cdot(kp+1)\cdot(9\cdot g + 17)\cdot(3\cdot g^2 - 2) + 8\cdot e(16\cdot e\cdot(g-1)\cdot(9\cdot g + 17) - 13\cdot(3\cdot g^2 - 2)))}{(kb-kp)\cdot(3\cdot(\Delta\delta - C)\cdot(g-1)\cdot(9\cdot g + 17)\cdot(3\cdot g^2 - 2) + 8\cdot e\cdot(16\cdot e\cdot(g-1)\cdot(9\cdot g + 17) - 13\cdot(3\cdot g^2 - 2)))}$$

and b) calculating the pay saturation using the following equation:

$$S_{PAY}=1-S_w.$$

13. The method of claim 9, further comprising the steps of:

a) determining the water saturation by the following equation, $$S_w = \frac{kb\cdot((\Delta\delta - C)\cdot 135\cdot kp + 119) - 480\cdot e}{(kb-kp)\cdot(119\cdot(\Delta\delta - C) - 480\cdot e)}; \text{ and}$$

b) calculating the pay saturation using the following equation:

$$S_{PAY}=1-S_w.$$

14. A method for determining pay saturation ($S_{PAY}$) of subsurface layers when a contact event is evident within the layers, comprising the following steps:

a) positioning and employing a plurality of seismic wave source-detector pairs having different offsets and one common horizontal midpoint;

b) generating seismic waves with the source-detector pairs, and detecting and recording into traces, as seismic data samples, the amplitudes of seismic waves reflected by discontinuities in the subsurface anisotropic layers, for each source-detector pair;

c) sorting the traces into common midpoint (CMP) gathers, which have a common midpoint or reflection point, and have varying offsets;

d) providing amplitude corrections to the seismic data samples to eliminate effects associated with spherical divergence, array effects, transmission effects, absorption effects, and other effects associated with energy propagating through and reflecting from subsurface horizons;

e) modifying the seismic data samples to generate velocity-corrected seismic data samples;

f) extracting amplitudes from the seismic data samples, for each subsurface horizon, to generate extracted amplitudes; and g) calculating the angle of incidence ($\theta$) by using a velocity function and source receiver separations, for each seismic data sample.

15. The method of claim 14, further comprising the steps of:

a) fitting the extracted amplitudes and the corresponding angles of incidence ($\theta$), to the following equation, $$AMP = A + B\ SIN^2\theta + C(TAN^2\theta - SIN^2\theta)$$

Where:

$$A = \frac{1}{2}\frac{\Delta Vp}{Vp} + \frac{1}{2}\frac{\Delta\rho}{\rho}$$

$$B = \frac{1}{2}\frac{\Delta Vp}{Vp}$$

$$C = \frac{1}{2}\frac{\Delta Vp}{Vp}$$

to generate curve shape parameters A, B and C; and b) extracting rock property contrasts from the curve shape parameters using the following equation, $$\frac{\Delta\rho}{\rho} = 2(A - B)$$

c) determining the water saturation by the following equation, $$S_w = \frac{2(A - B)\bar{\rho}}{\phi(\rho_{BR} - \rho_{PAY})}$$

where:
A and B are the data derived curve fit coefficients;
$\rho_{PAY}$ is the density of pure pay in situ;
$\rho_{BR}$ is the density of pure brine in situ;
$\bar{\rho}$ is the average density if the brine and fluid filled reservoir; and
$\phi$ is the porosity of the reservoir; and d) calculating the pay saturation using the following equation:

$$S_{PAY} = 1 - \frac{2(A - B)\bar{\rho}}{\phi(\rho_{BR} - \rho_{PAY})}.$$

16. The method of claim 14, further comprising the steps of:

a) fitting the extracted amplitudes and the corresponding angles of incidence ($\theta$), to the following equation, $$AMP = B_0 + B_1\ TAN^2\theta + B_2\ TAN^2\theta * SIN^2\theta,$$

where:

$$B_0 = \frac{1}{2}\frac{\Delta Vp}{Vp} + \frac{1}{2}\frac{\Delta\rho}{\rho}$$

$$B_1 = \frac{1}{2}\frac{\Delta Vp}{Vp}$$

$$B_2 = 0$$

to generate curve shape parameters $B_0$, $B_1$ and $B_2$;

b) extracting rock property contrasts from the curve shape parameters using the following equation, $$\frac{\Delta\rho}{\rho} = 2(B_0 - B_1)$$

c) determining the water saturation by the following equation, $$S_w = \frac{2(B_0 - B_1)\bar{\rho}}{\phi(\rho_{BR} - \rho_{PAY})}$$

where:
$B_0$ and $B_1$ are the data derived curve fit coefficients;
$\rho_{PAY}$ is the density of pure pay in situ;
$\rho_{BR}$ is the density of pure brine in situ;
$\bar{\rho}$ is the average density of the brine and fluid filled reservoir; and;
$\phi$ is the porosity of the reservoir; and d) calculating the pay saturation using the following equation:

$$S_{PAY} = 1 - \frac{2(B_0 - B_1)\bar{\rho}}{\phi(\rho_{BR} - \rho_{PAY})}.$$

17. A method for determining pay saturation ($S_{PAY}$) of subsurface layers for P-P data, comprising the following steps:

a) positioning and employing a plurality of seismic wave source-detector pairs having different offsets and one common horizontal midpoint;

b) generating seismic waves with the source-detector pairs, and detecting and recording into traces, as seismic data samples, the amplitudes of seismic waves reflected by discontinuities in the subsurface anisotropic layers, for each source-detector pair;

c) sorting the traces into common midpoint (CMP) gathers, which have a common midpoint or reflection point, and have varying offsets;

d) providing amplitude corrections to the seismic data samples to eliminate effects associated with spherical divergence, array effects, transmission effects, absorption effects, and other effects associated with energy propagating through and reflecting from subsurface horizons;

e) modifying the seismic data samples to generate velocity-corrected seismic data samples;

f) calculating the angle of incidence (θ) by using a velocity function and source receiver separations, for each seismic data sample;

g) angle stacking the seismic data samples through angle ranges $\theta_s$ and $\theta_e$; and h) extracting amplitudes from the seismic data samples, for each subsurface horizon, to generate extracted angle stack amplitudes.

18. The method of claim 17, further comprising the steps of:

a) fitting the extracted angle stack amplitudes and the corresponding angles of incidence (θ), to the following equation, $$\text{STACK}(\theta_s,\theta_e)=A \cdot f_1(\theta_s,\theta_e)+B \cdot f_2(\theta_s,\theta_e)+C \cdot f_3(\theta_s,\theta_e) \quad 60$$

to generate AVO curve shape parameters A, B and C; and b) extracting rock property contrasts from the AVO curve shape parameters using the following equations, $$\Delta\delta = \frac{8}{g^2} \cdot A + 2 \cdot B - \left(1 + \frac{4}{g^2}\right)\frac{dV\rho}{V\rho} + \frac{8}{g^2}\frac{dV_s}{V_s} \quad 68$$

$$\Delta\varepsilon = 2C - \frac{\Delta V\rho}{V\rho} \quad 69$$

$$\frac{\Delta\rho}{\rho} = 2(A - C) + \Delta\varepsilon \quad 70$$

c) determining the water saturation by the following equation, $$S_w = \frac{\left(2A - \frac{\Delta Vp}{Vp}\right)}{\phi(\rho_{BR} - \rho_{PAY})} \quad 75$$

Where:
A and C are the data derived curve fit coefficients;
$\rho_{PAY}$ is the density of the pay fluid in situ;
$\rho_{BR}$ is the density of brine fluid in situ;
$\rho$ is the average density of the fluid filled reservoir and the shale cap rock;
$\phi$ is the porosity of the reservoir; and $$\frac{\Delta Vp}{Vp}$$

is the velocity contrast; and d) calculating the pay saturation using the following equation:

$$S_{PAY} = 1 - \frac{2A - \frac{\Delta Vp}{Vp}}{\phi((\rho_{BR} - \rho_{BPAY})}. \quad 76$$

19. The method of claim 17, further comprising the steps of:

a) fitting the extracted angle stack amplitudes and the corresponding angles of incidence (θ), to the following equation, $$\text{STACK}(\theta_s,\theta_e)=B_0 \cdot G_1(\theta_s, \theta_e)+B_1 \cdot G_2(\theta_s, \theta_e)+B_2 \cdot G_3(\theta_{sT}, \theta_e) \quad 64$$

to generate AVO curve shape parameters $B_0$, $B_1$ and $B_2$; and b) extracting rock property contrasts from the AVO curve shape parameters using the following equations, $$\Delta\delta = \frac{8}{g^2}B_0 + 2B_1 - \left(1 + \frac{4}{g^2}\right)dV\frac{\rho}{V\rho} + \frac{8}{g^2}d\frac{V_s}{V_s} \quad 71$$

$$\Delta\varepsilon = 2(B_1 + B_2) - \frac{\Delta V\rho}{V\rho} \quad 72$$

$$\frac{\Delta\rho}{\rho} = 2(B_0 - B_1 - B_2); \quad \text{and} \quad 73$$

c) determining the water saturation by the following equation, $$S_w = \frac{\left(2B_0 - \frac{\Delta Vp}{Vp}\right)}{\phi(\rho_{BR} - \rho_{PAY})} \quad 77$$

Where:
$B_0$, $B_1$ and $B_2$ are the data derived curve fit coefficients;
$\rho_{PAY}$ is an estimate of the density of pay fluid in situ;
$\rho_{BR}$ is an estimate of the density of brine fluid in situ;
$\rho$ is an estimate of the average density of the fluid filled reservoir and the cap rock;
$\phi$ is an estimate of the porosity of the reservoir; and $$\frac{\Delta V\rho}{V\rho}$$

is the velocity contrast; and d) calculating the pay saturation using the following equation:

$$S_{PAY} = 1 - \frac{2B_0 - \frac{\Delta Vp}{Vp}}{\phi(\rho_{BR} - \rho_{PAY})}. \quad 78$$

20. The method of claim 17, further comprising the steps of:

a) determining the water saturation by the following equation, $$S_w = \frac{8e - 3(\Delta\varepsilon - C) \cdot (1 + k_p)}{(8e - 3(\Delta\varepsilon - C)) \cdot \left(1 + \frac{k_p}{k}\right)} \quad 85$$

and b) calculating the pay saturation using the following equation:

$$S_{PAY} = \frac{3 \cdot (\Delta\varepsilon - C) \cdot kp}{\left(1 - \frac{kp}{kb}\right) \cdot (8e - 3(\Delta\varepsilon) \cdot)} - \frac{\frac{kp}{kb}}{1 - \frac{kp}{kb}}. \quad 86$$

21. The method of claim 17, further comprising the step of determining the water saturation by the following equation:

$$s_w = \frac{kb \cdot (3 \cdot \Delta\delta \cdot (g-1) \cdot (kp+1) \cdot (9 \cdot g+17) \cdot (3 \cdot g^2-2) +}{(kb-kp) \cdot (3 \cdot \Delta\delta \cdot (g-1) \cdot (9 \cdot g+17) \cdot (3 \cdot g^2-2) +} \quad 89$$
$$\frac{8 \cdot e(16 \cdot e \cdot (g-1) \cdot (9 \cdot g+17) - 13 \cdot (3 \cdot g^2-2)))}{8 \cdot e \cdot (16 \cdot e \cdot (g-1) \cdot (9 \cdot g+17) - 13 \cdot (3 \cdot g^2-2)))}$$

22. The method of claim 17, further comprising the step of determining the water saturation by the following equation:

$$S_w = \frac{kb \cdot ((\Delta\delta - C) \cdot 135 \cdot kp + 119) - 480 \cdot e}{(kb - kp) \cdot (119 \cdot (\Delta\delta - C) - 480 \cdot e)}. \quad 91$$

23. The method of claim 17, further comprising the steps of:
   a) fitting the extracted angle stack amplitudes and the corresponding angles of incidence ($\theta$), to the following equation, $$\text{STACK}(\theta_s, \theta_e) = A \cdot f_1(\theta_s, \theta_e) + B \cdot f_2(\theta_s, \theta_e) + C \cdot f_3(\theta_s, \theta_e) \quad 92$$

where:

$$f_1 = 1 \quad 93$$

$$f_2 = \frac{1}{2}\left[1 - \left(\frac{\text{SIN}(\theta_e)\text{COS}(\theta_e)}{(\theta_e - \theta_s)} - \frac{\text{SIN}(\theta_s)\text{COS}(\theta_s)}{(\theta_e - \theta_s)}\right)\right] \quad 94$$

$$f_3 = \frac{1}{2}\left[-3 + \frac{\text{TAN}(\theta_e) - \text{TAN}(\theta_s)}{(\theta_e - \theta_s)} + \frac{\text{SIN}(\theta_e)\text{COS}(\theta_e) - \text{SIN}(\theta_s)\text{COS}(\theta_s)}{(\theta_e - \theta_s)}\right] \quad 95$$

to generate AVO curve shape parameters A, B and C; and
   b) extracting rock property contrasts from the AVO curve shape parameters using the following equations, $$\Delta\delta = \frac{8 \cdot e(16 \cdot e \cdot (g-1) \cdot (9 \cdot g+17) - 13 \cdot (3 \cdot g^2 - 2)) \cdot (kb \cdot (s-1) \cdot kp \cdot s)}{3 \cdot (g-1) \cdot (9 \cdot g+17) \cdot (3 \cdot g-2) \cdot (kb \cdot (kp-s+1) + kp \cdot s)} + C \quad 88$$

$$\Delta\varepsilon = \frac{8 \cdot e(S_w[k_p - k_b] + k_b)}{3(k_b(k_p+1) + S(k_p - k_b))} + C \quad 84$$

$$\frac{\Delta\rho}{\rho} = 2(A - C) + \Delta\varepsilon; \quad \text{and,} \quad 18$$

c) determining the water saturation by the following equation, $$S_w = \frac{\Delta\rho}{\phi(\rho_{BR} - \rho_{PAY})}. \quad 74$$

24. The method of claim 17, further comprising the steps of:
   a) fitting the extracted angle stack amplitudes and the corresponding angles of incidence ($\theta$), to the following equation, $$\text{STACK}(\theta_s, \theta_e) = B_0 \cdot G_1(\theta_s, \theta_e) + B_1 \cdot G_2(\theta_s, \theta_e) + B_2 \cdot G_3(\theta_{sT}, \theta_e) \quad 96$$

where:

$$G_1 = 1 \quad 97$$

$$G_2 = \left[\frac{1}{(\theta_e - \theta_s)}(\text{TAN}(\theta_e) - \text{TAN}(\theta_s)) - 1\right] \quad 98$$

$$G_3 = \left[-\frac{3}{2} + \left(\frac{1}{(\theta_e - \theta_s)}\right)(\text{TAN}\,\theta_e - \text{TAN}\,\theta_s) + \frac{1}{2}\left(\frac{1}{\theta_e - \theta_s}\right)(\text{SIN}\,\theta_e\text{COS}\,\theta_e - \text{SIN}\,\theta_s\text{COS}\,\theta_s)\right] \quad 99$$

to generate AVO curve shape parameters $B_0$, $B_1$ and $B_2$; and
   b) extracting rock property contrasts from the AVO curve shape parameters using the following equations, $$\Delta\delta = \frac{8 \cdot e(16 \cdot e \cdot (g-1) \cdot (9 \cdot g+17) - 13 \cdot (3 \cdot g^2 - 2)) \cdot (kb \cdot (s-1) \cdot kp \cdot s)}{3 \cdot (g-1) \cdot (9 \cdot g+17) \cdot (3 \cdot g-2) \cdot (kb \cdot (kp-s+1) + kp \cdot s)} + C \quad 88$$

$$\Delta\varepsilon = \frac{8 \cdot e(S_w[k_p - k_b] + k_b)}{3(k_b(k_p+1) + S(k_p - k_b))} + C \quad 84$$

c) $\frac{\Delta\rho}{\rho} = 2(A - C) + \Delta\varepsilon;$ and, $\quad 18$ d) determining the water saturation by the following equation, $$S_w = \frac{\Delta\rho}{\phi(\rho_{BR} - \rho_{PAY})}. \quad 74$$

25. A method to determine pay saturation ($S_{PAY}$) of subsurface layers for P-S data, comprising the following steps:
   a) positioning and employing a plurality of seismic wave source-detector pairs having different offsets and one common horizontal midpoint;
   b) generating seismic waves with the source-detector pairs, and detecting and recording into traces, as seismic data samples, the amplitudes of seismic waves reflected by discontinuities in the subsurface anisotropic layers, for each source-detector pair;
   c) sorting the traces into common reflection point (CRP) gathers, which have a common reflection point, and have varying offsets;
   d) providing amplitude corrections to the seismic data samples to eliminate effects associated with spherical divergence, array effects, transmission effects, absorption effects, and other effects associated with energy propagating through and reflecting from subsurface horizons;
   e) modifying the seismic data samples to generate velocity-corrected seismic data samples;
   f) calculating the angle of incidence ($\theta$) by using a velocity function and source receiver separations, for each seismic data sample; and
   g) extracting amplitudes from the seismic data samples, for each subsurface horizon, to generate extracted amplitudes.

26. The method of claim 25, further comprising the steps of:
   a) fitting the extracted angle stack amplitudes and the corresponding angles of incidence ($\theta$), to the following equation, $$\text{AMP\_PS}(\theta) = D_0 \left( \frac{\text{SIN}\theta(\text{SIN}^2\theta - g^2)}{2g\sqrt{g^2 - \text{SIN}^2\theta}} - \frac{\text{SIN}\theta\text{COS}\theta}{g} \right) +$$

$$D_1 \left( \frac{2\text{SIN}^3\theta}{g\sqrt{g^2 - \text{SIN}^2\theta}} - \frac{2\text{SIN}\theta\text{COS}\theta}{g} \right)$$

where $$D_0 = \frac{\Delta\rho}{\overline{\rho}}$$

$$D_1 = \frac{\Delta Vs}{\overline{Vs}}$$

b) calculating the water saturation using the following equation:

$$S_w = \frac{\Delta\rho_{PS} - \Delta\rho_{BR}}{\phi(\rho_{BR} - \rho_{PAY})}$$

Where:
  $\Delta\rho_{PS} = \rho_{PS} - \rho_{SHALE}$;
  $\rho_{BS} = \rho_{BS} - \rho_{SHALE}$;
  $\rho_{FLUID}$=Density of the fluid filling the pore space $\phi$—the fluid has water saturation $S_w$;
  $\rho_{BR}$=Density of the brine;
  $\rho_{PAY}$=Density of the pure pay;
  $\phi$=Porosity of the reservoir;
  $\rho_{PS}$=Density of pay filled layer of saturation $S_w$; and
  $\rho_{PS}$=Density of brine filled layer; and
c) calculating the pay saturation using the following equation:

$$S_{PAY} = 1 - S_w = 1 - \frac{(D_{0_B} - D_{0_A})\overline{\rho}}{\phi(\rho_{BR} - \rho_{PAY})}.$$

* * * * *

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Drawings,
Please insert Figures 15A, 15B, 16A, 16B, 16C, 17A, 17B, 17C, 17D, 18, 19, 20, 21, 22, 23, 24, 25, 26, 27, 28, 29, 30, 31, 32, 33, and 34. (attached).

Column 1,
Line 20, change "providing a methods" to -- providing methods --
In the BRIEF DESCRIPTION OF THE DRAWINGS:
change "FIG. 1 illustrates the AVO signature that results from using Equation 1." to
-- Figure 1 illustrates the AVO signature that results from using Equation 1 and shows how the AVO signature can be quantitatively described by 3 curve shape parameters A, B and C. --;
change "FIG. 2 illustrates the AVO signature that results from using Equation 2." to
-- Figure 2 illustrates the AVO signature that results from using Equation 2 and shows how the AVO signature can be quantitatively described by 3 curve shape parameters B0, B1 and B2. --;
change "FIG. 3 shows the density contrast $\Delta\rho$ as a function of the water saturation $S_W$." to
-- Figure 3 shows the density contrast $\Delta\rho$ as a function of the water saturation $S_W$ for a low impedance pay layer of 25% porosity where the pay fluid is dry gas. -- ;
change "FIG. 4 shows the density contrast $\Delta\rho$ as a function of the water saturation $S_{PAY}$. "
to -- Figure 4 shows the density contrast $\Delta\rho$ as a function of the water saturation $S_{PAY}$ for a low impedance pay layer of 25% porosity where the pay fluid is dry gas. -- ;
change "FIG. 5 illustrates, for a pay fluid of gas, the sensitivity of the anisotropic parameter $\delta$ to $S_w$, for various reasonable crack densities." to -- Figure 5 illustrates, for a pay fluid of gas, the sensitivity of the anisotropic parameter $\delta$ to $S_W$, for various reasonable crack densities and shows the manner in which delta varies as a function of $S_W$ for crack densities of .01 curve (short dashes), .05 curve (phantom line) and .1 curve (solid line). --;
change "FIG. 6 illustrates, for a pay fluid of gas, the sensitivity of the anisotropic parameter .delta. to $S_W$, for various reasonable crack densities." to -- Figure 6 illustrates, for a pay fluid of gas, the sensitivity of the anisotropic parameter $\delta\varepsilon$ to $S_{PAY}$, for various reasonable crack densities and shows the manner in which delta varies as a function of $S_{PAY}$ for crack densities of .01 curve (long dashes), .05 curve (phantom line) and .1 curve (short dashes). --;
change "FIG. 7 illustrates, for a pay fluid of gas, the sensitivity of the anisotropic parameter .epsilon. to $S_W$, for various reasonable crack densities." to -- Figure 7 illustrates, for a pay fluid of gas, the sensitivity of the anisotropic parameter $\varepsilon$ (epsilon) to $S_W$, for various reasonable crack densities and shows the manner in which epsilon varies as a function of $S_W$ for crack densities of .01 curve (short dashes), .05 curve (long dashes) and .1 curve (solid line). --;
change "FIG. 8 illustrates, for a pay fluid of gas, the sensitivity of the anisotropic parameter $\varepsilon$ to $S_{PAY}$, for various reasonable crack densities." to -- Figure 8 illustrates, for a

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

Figure 19:
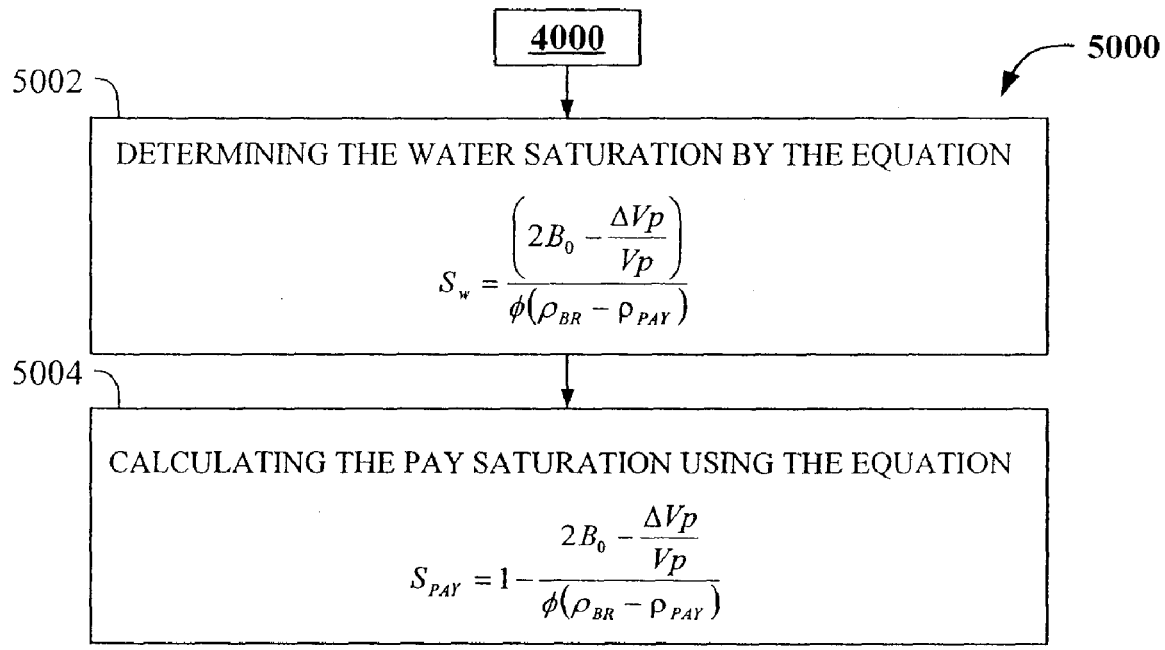
Figure 20:
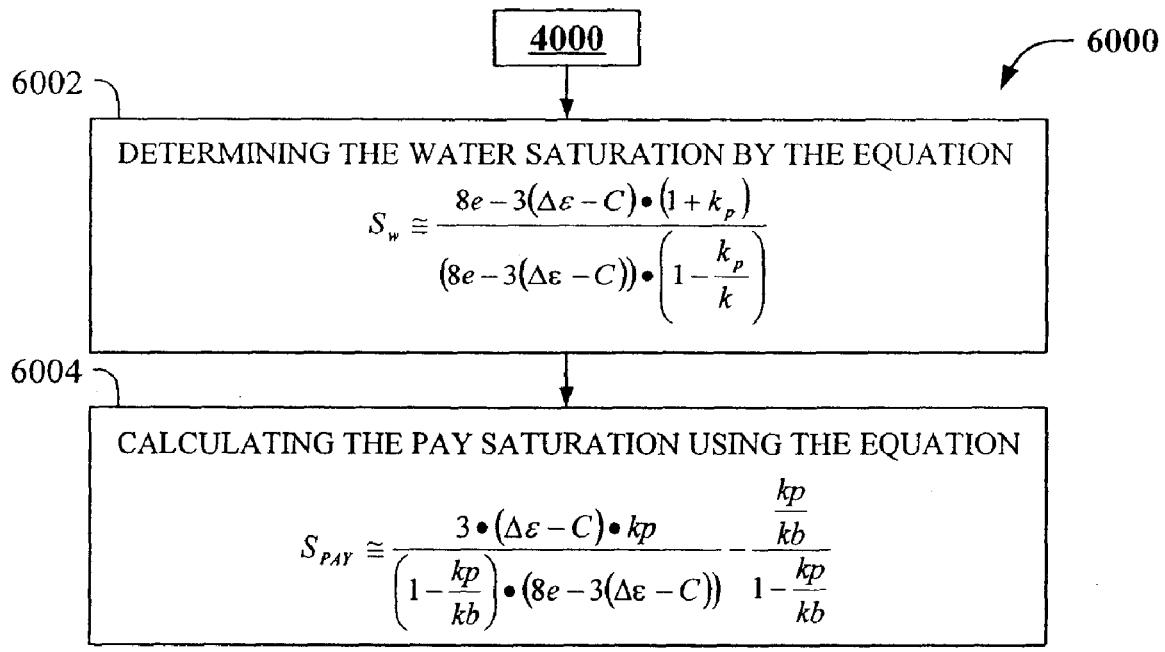
Figure 21:
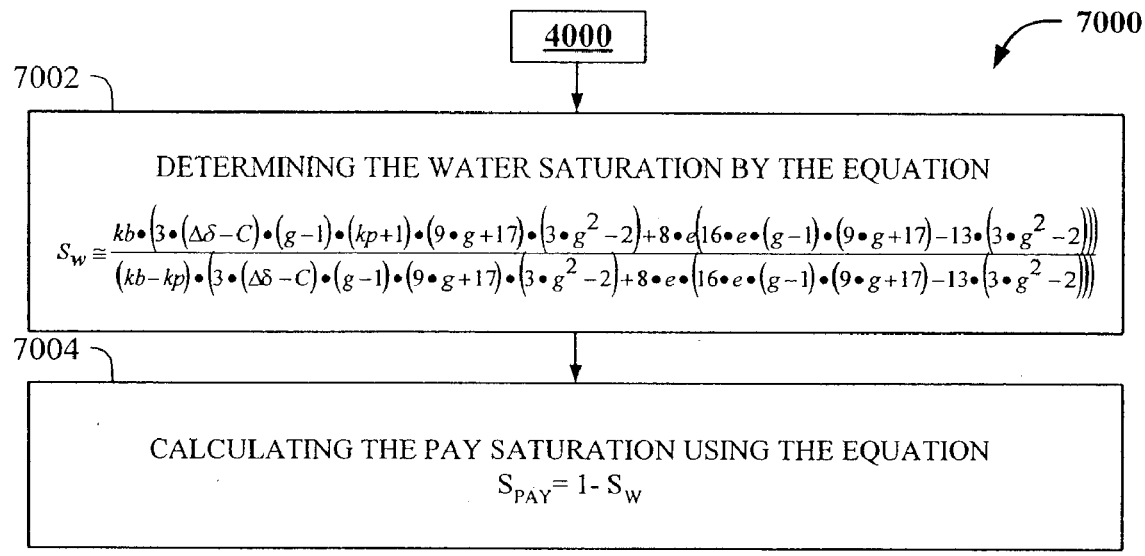
Figure 22:
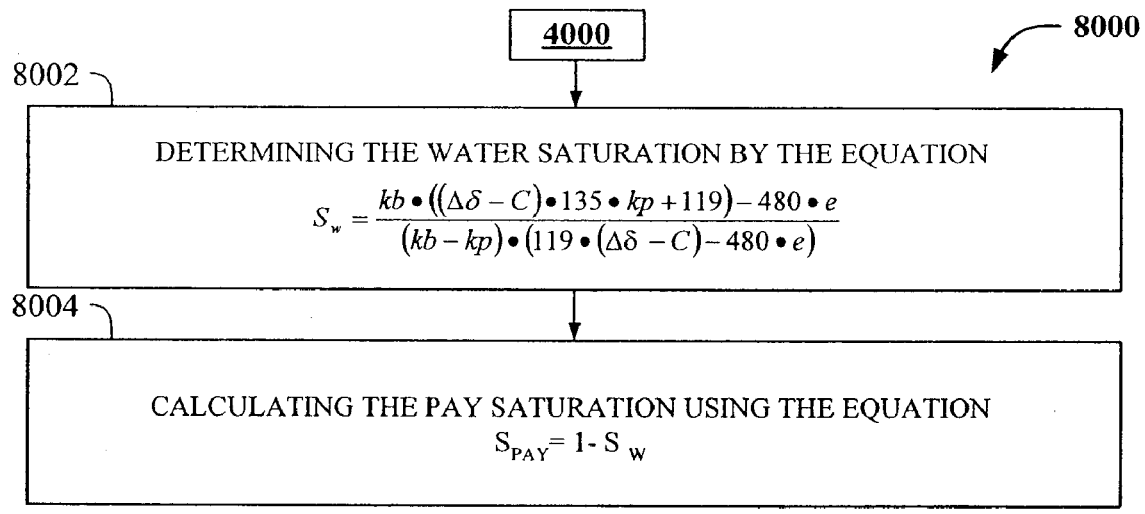
Figure 23:
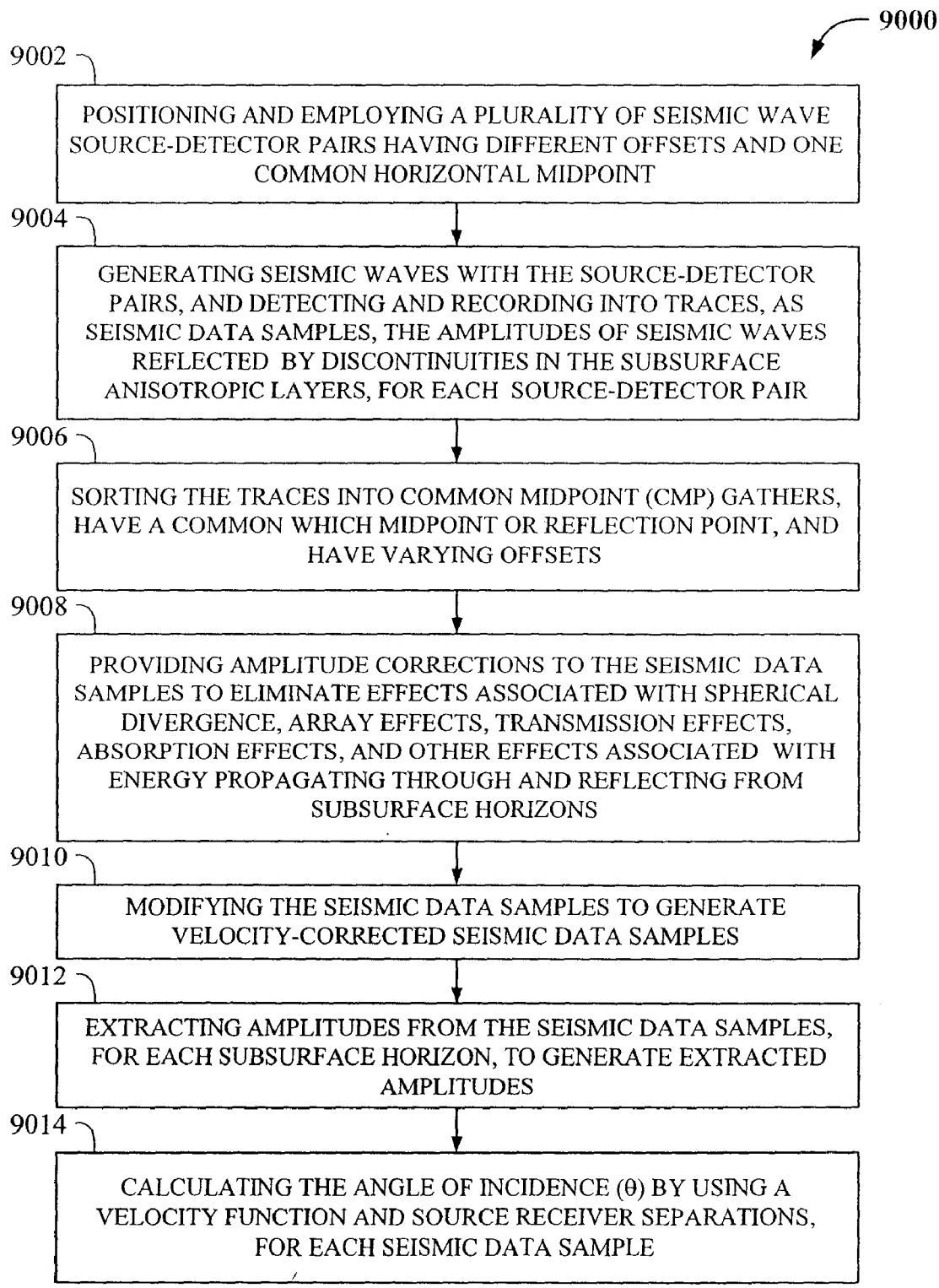
Figure 24:
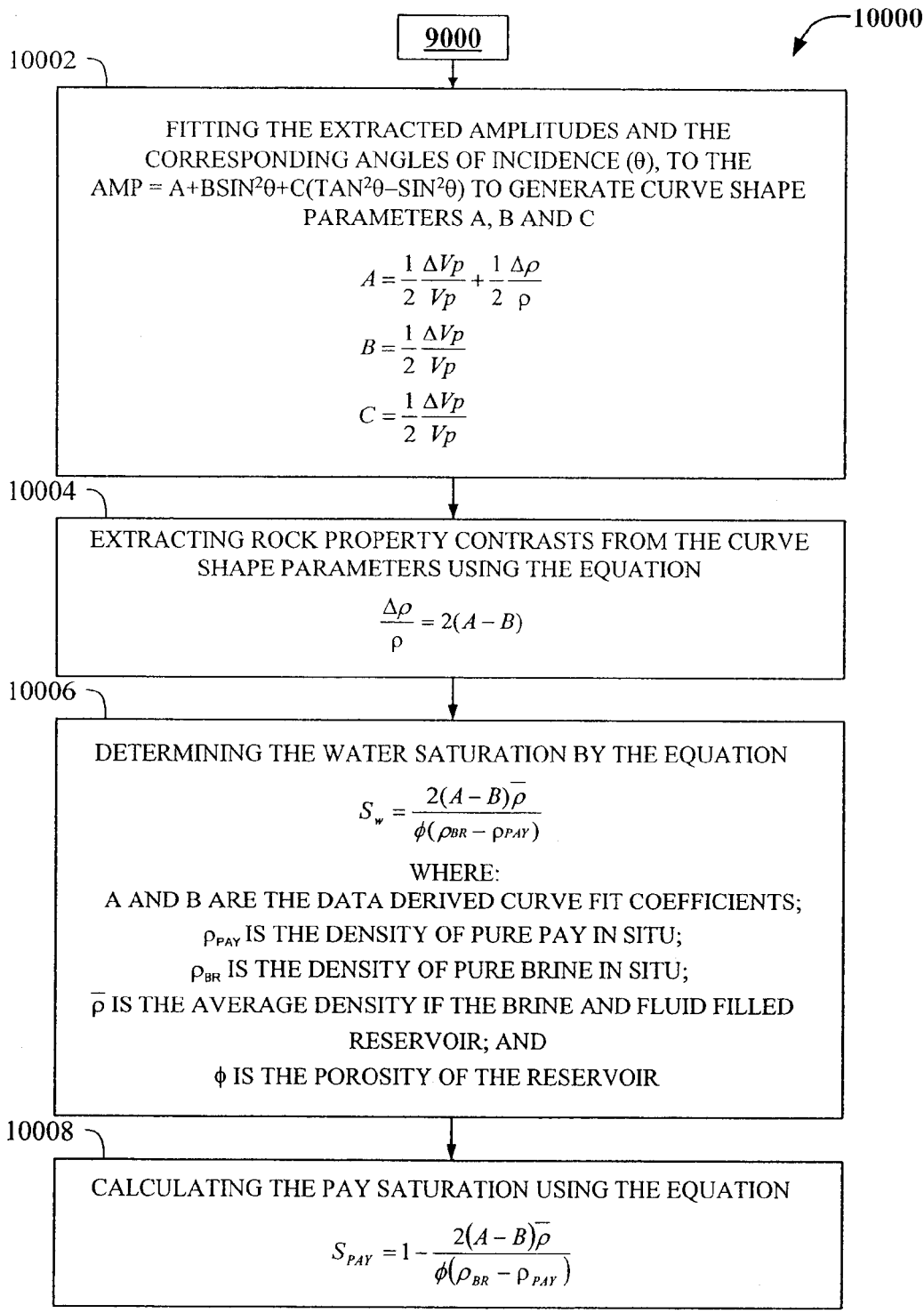
Figure 25:
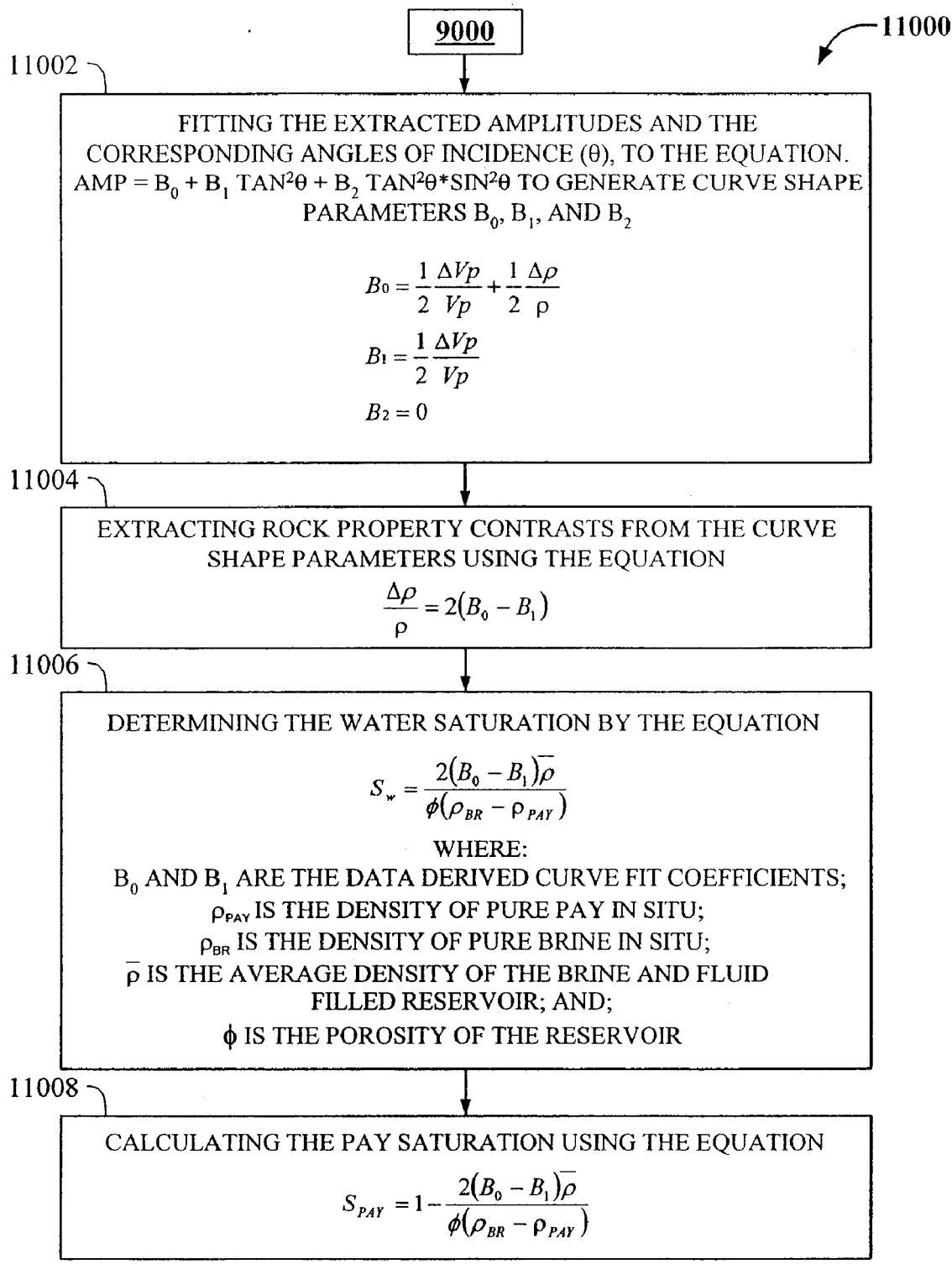
Figure 26:
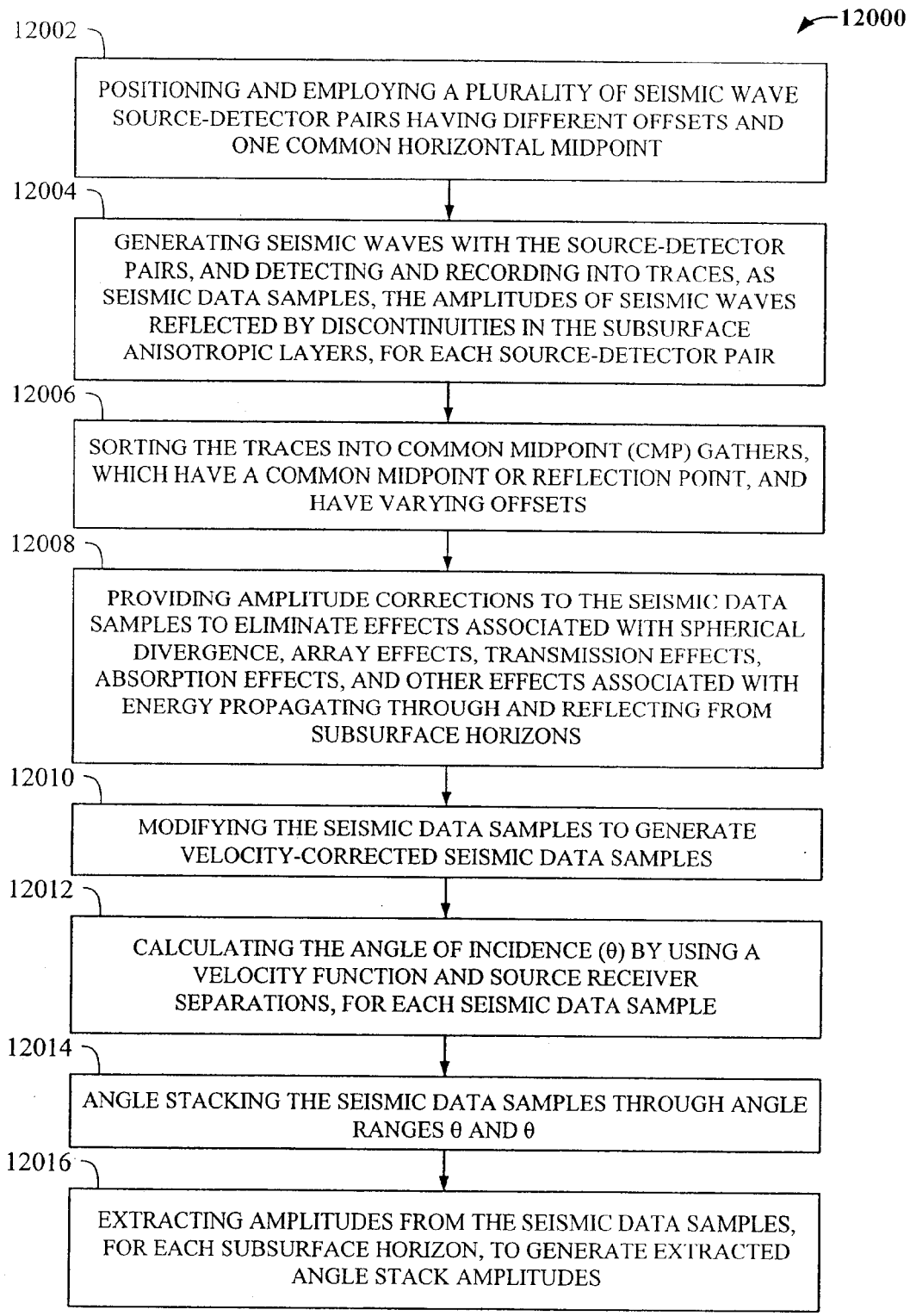
Figure 27:
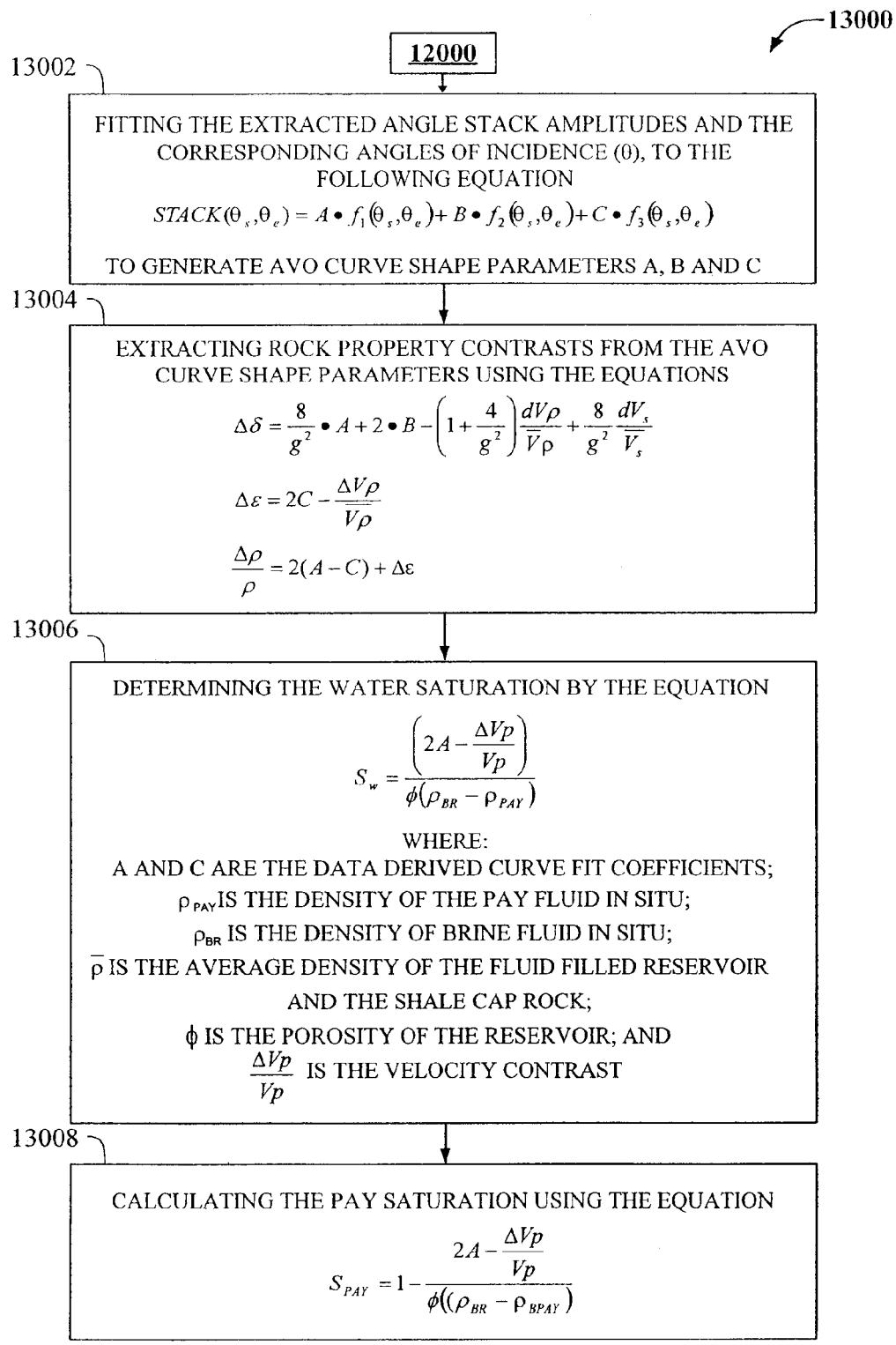

It is certified that error appears in the above-identified patent and that said Letters Patent is hereby corrected as shown below:

pay fluid of gas, the sensitivity of the anisotropic parameter ε to $S_{PAY}$, for various reasonable crack densities and shows the manner in which epsilon varies as a function of $S_{PAY}$ for crack densities of .01 curve (short dashes), .05 curve (long dashes) and .1 curve (solid line). --;
change "Figure 10 illustrates the OSA's behavior as a function of $S_W$." to -- Figure 10 illustrates the OSA's behavior as a function of Sw and shows the value of the OSA as a function of the water saturation $S_W$. --;
change "Figure 11 shows the sensitivity of $k_f$ to the water saturation $S_W$." to -- Figure 11 shows the sensitivity of $k_f$ to the water saturation $S_W$ and shows the incompressibility of a fluid $k_f$ as a function of $S_W$. --;
change "Figure 12 illustrates AVO signatures for $g = 2$, of a density contrast and shear wave velocity contrast respectively." to -- Figure 12 illustrates AVO signatures for $g = 2$, of a density contrast and shear wave velocity contrast respectively. Figure 12 shows the amplitude signature of the density basis function (continuous curve) and the shear velocity (dotted curve) for converted wave data. This uses the Equations. --;
Add -- Figure 15 is a flow chart illustration of an exemplary embodiment of a method to determine pay saturation ($S_{PAY}$) of subsurface isotropic layers for P-P data. --;
Add -- Figure 16 is a flow chart illustration of an alternative exemplary embodiment of a method to determine pay saturation ($S_{PAY}$) of subsurface isotropic layers for P-P data. --;
Add -- Figure 17 is a flow chart illustration of an exemplary embodiment of a method for determining pay saturation ($S_{PAY}$) of subsurface anisotropic layers for P-P data. --;
Add -- Figure 18 is a flow chart illustration of an alternative exemplary embodiment of the method illustrated in Figure 17. --;
Add -- Figure 19 is a flow chart illustration of an alternative exemplary embodiment of the method illustrated in Figure 18. --;
Add -- Figure 20 is a flow chart illustration of an alternative exemplary embodiment of the method illustrated in Figure 18. --;
Add -- Figure 21 is a flow chart illustration of an alternative exemplary embodiment of the method illustrated in Figure 18. --;
Add -- Figure 22 is a flow chart illustration of an alternative exemplary embodiment of the method illustrated in Figure 18. --;
Add -- Figure 23 is a flow chart illustration of an exemplary embodiment of a method for determining pay saturation ($S_{PAY}$) of subsurface layers when a contact event is evident within the layers. --;
Add -- Figure 24 is a flow chart illustration of an alternative exemplary embodiment of the method illustrated in Figure 23. --;
Add -- Figure 25 is a flow chart illustration of an alternative exemplary embodiment of the method illustrated in Figure 23. --;
Add -- Figure 26 is a flow chart illustration of an exemplary embodiment of a method for determining pay saturation ($S_{PAY}$) of subsurface layers for P-P data. --;
Add -- Figure 27 is a flow chart illustration of an alternative exemplary embodiment of the

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

Figure 28:
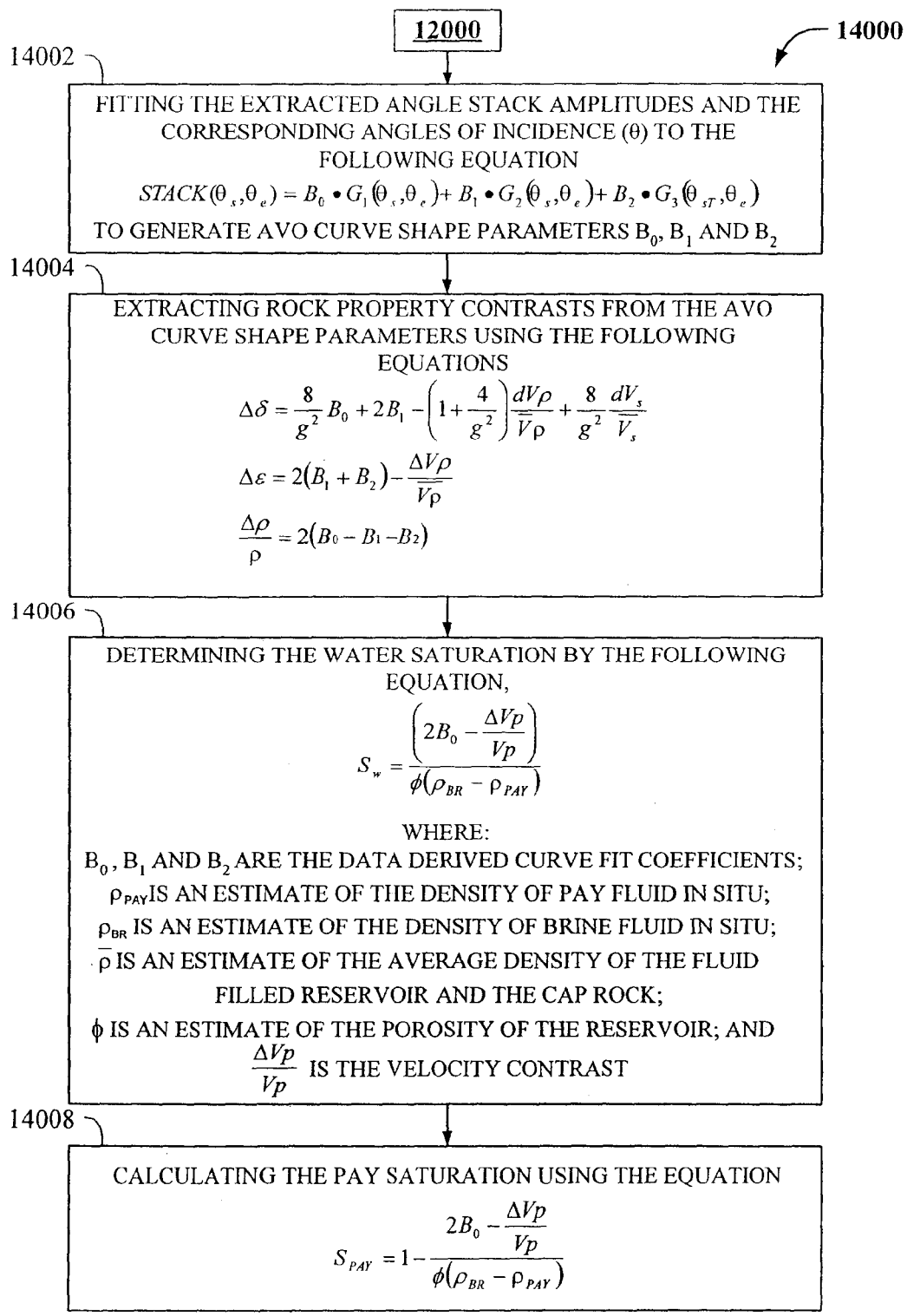
Figure 29:
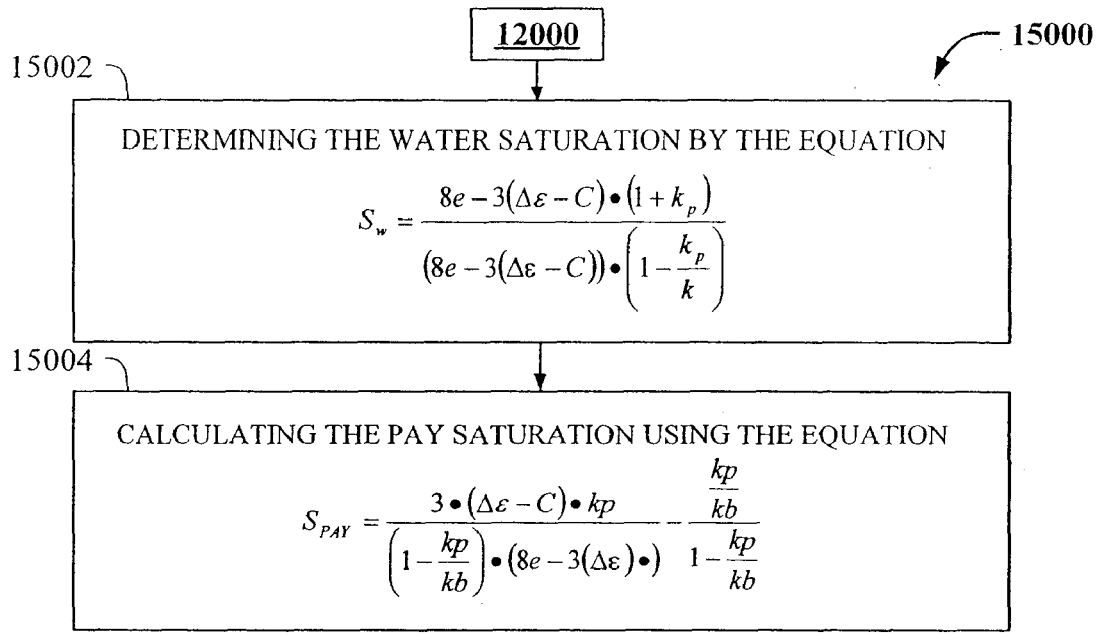
Figure 30:
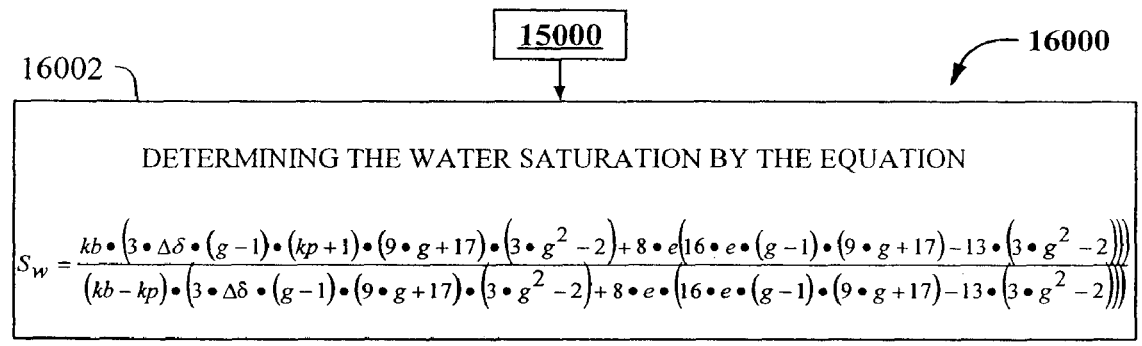
Figure 31:
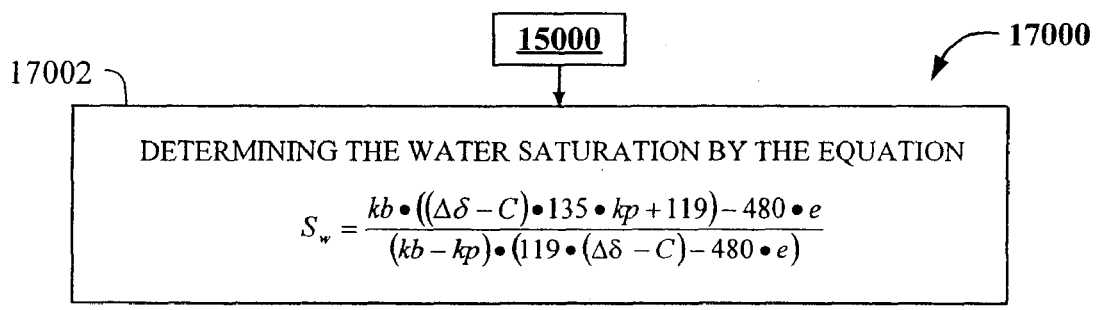
Figure 33:
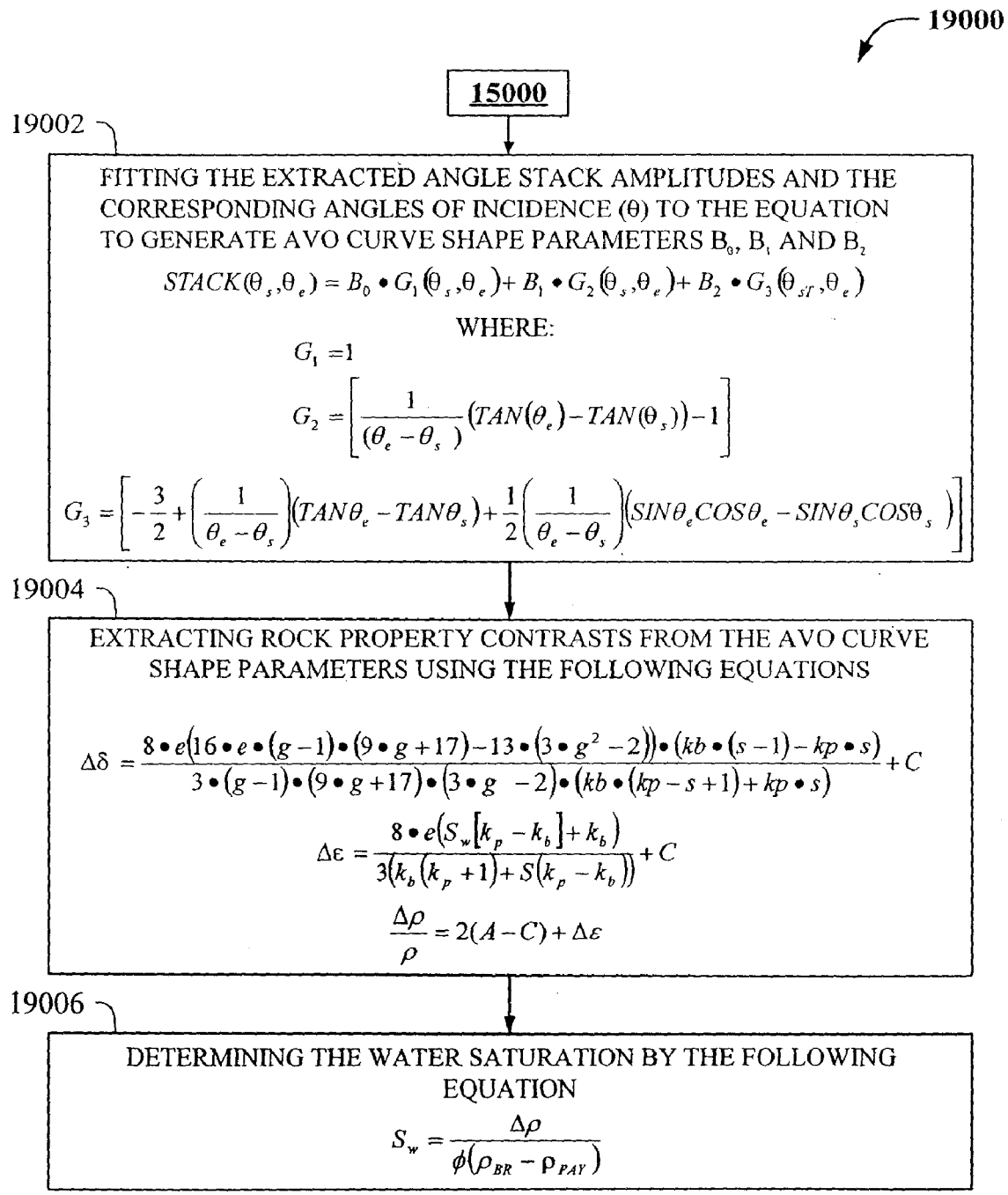
Figure 34:
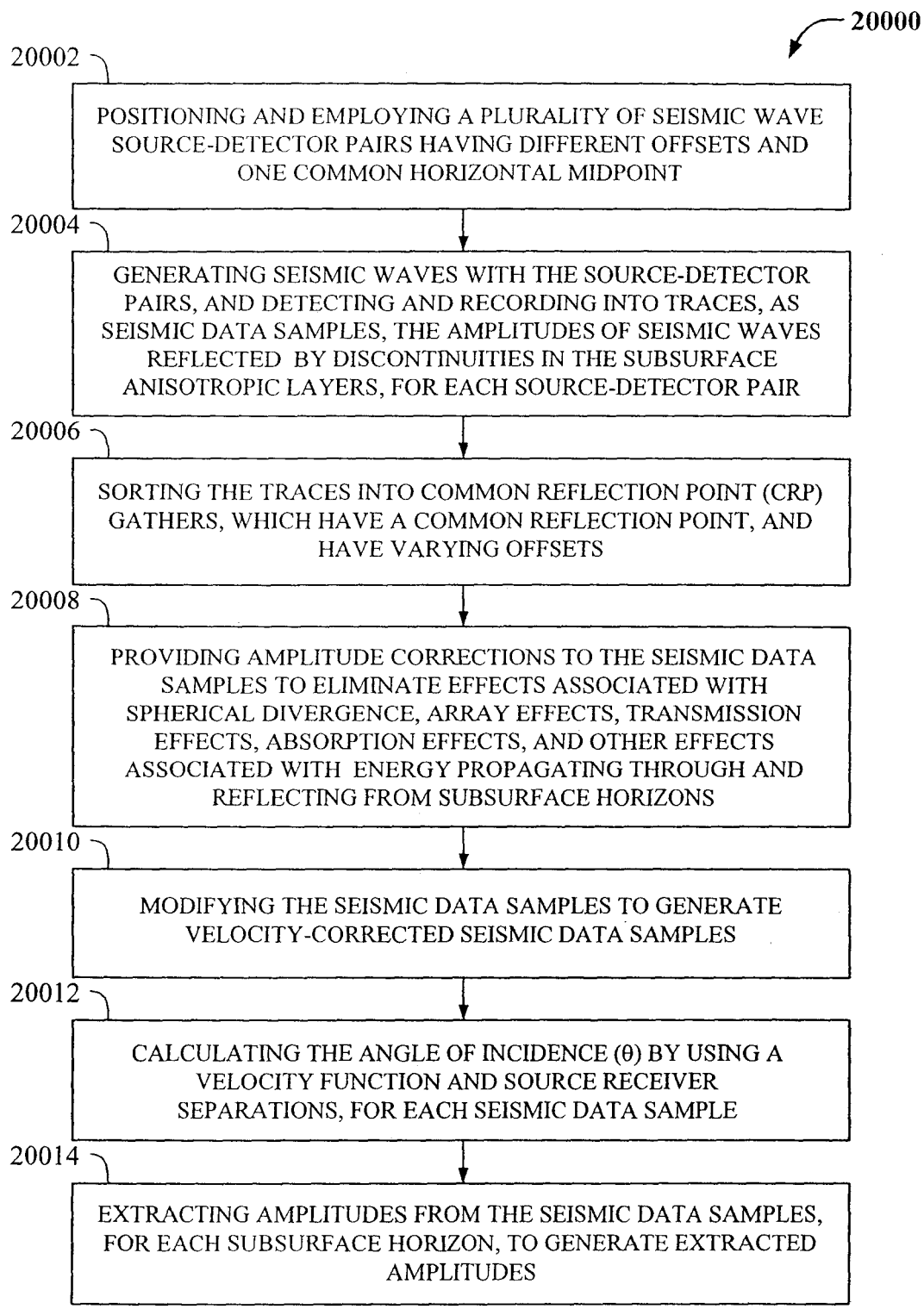
Figure 35:
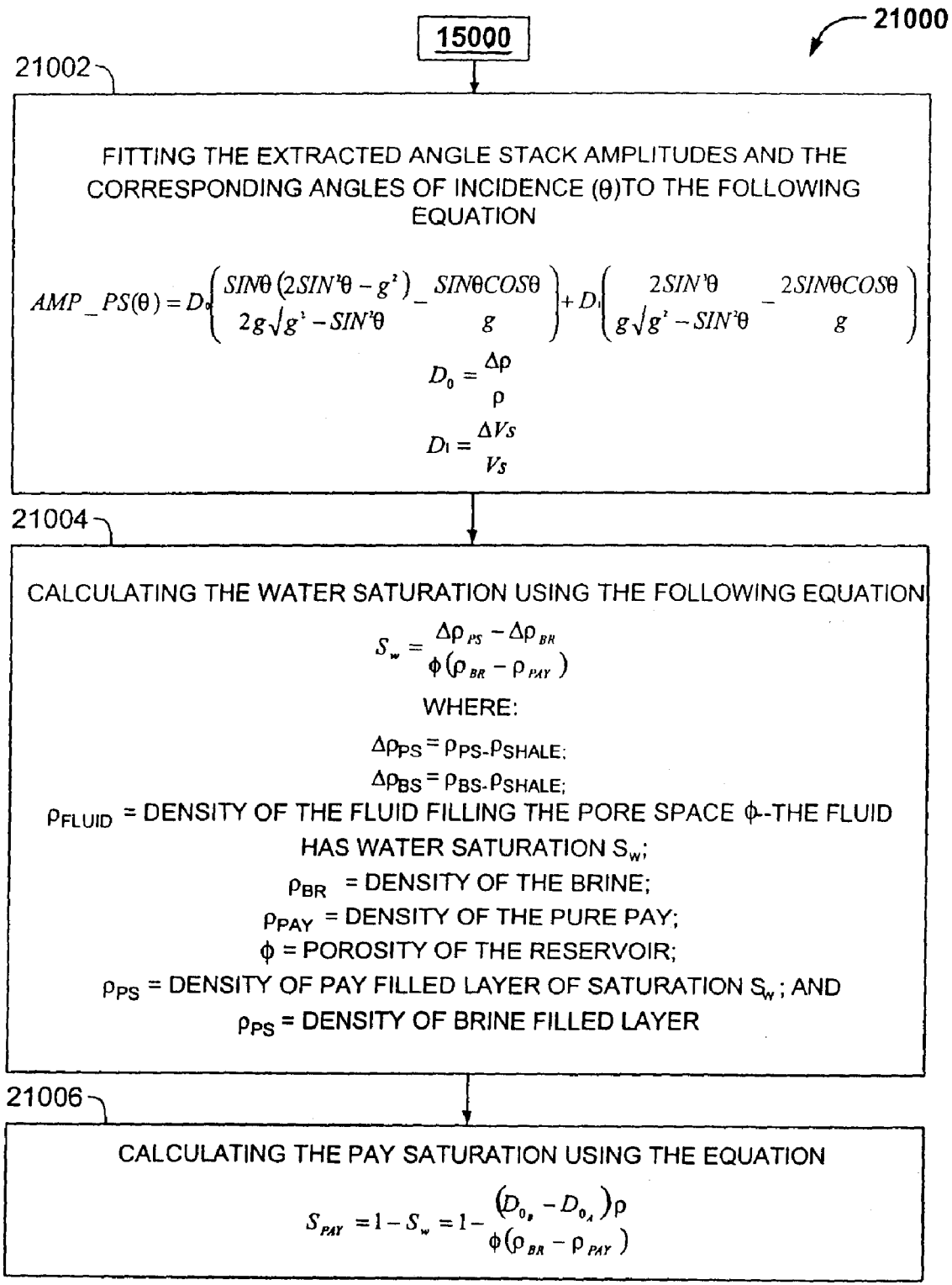

It is certified that error appears in the above-identified patent and that said Letters Patent is hereby corrected as shown below:

method illustrated in Figure 26. --;
Add -- Figure 28 is a flow chart illustration of an alternative exemplary embodiment of the method illustrated in Figure 26. --;
Add -- Figure 29 is a flow chart illustration of an alternative exemplary embodiment of the method illustrated in Figure 26. --;
Add -- Figure 30 is a flow chart illustration of an alternative exemplary embodiment of the method illustrated in Figure 26. --;
Add -- Figure 31 is a flow chart illustration of an alternative exemplary embodiment of the method illustrated in Figure 26. --;
Add -- Figure 32 is a flow chart illustration of an alternative exemplary embodiment of the method illustrated in Figure 26. --;
Add -- Figure 33 is a flow chart illustration of an alternative exemplary embodiment of the method illustrated in Figure 26. --;
Add -- Figure 34 is a flow chart illustration of an exemplary embodiment of a method for method to determine pay saturation ($S_{PAY}$) of subsurface layers for P-S data. --;
Add -- Figure 35 is a flow chart illustration of an alternative exemplary embodiment of the method illustrated in Figure 34. --;

Column 5,
Line 5, the part of the formula on line 28, reading "$V_s$" should read -- $g^2 V_s$ --. Therefore, Equation 26 should read:

$$\Delta\delta = \frac{8}{g^2} B_0 + 2B_1 - \left(1 + \frac{4}{g^2}\right)\frac{dV\rho}{V\rho} + \frac{8 dV_s}{g^2 V_s} \qquad \text{Equation 26}$$

Column 6,
Line 4, the part of the formula reading "$\rho_{PAY}$" should read -- $\rho_{BPAY}$ --. Therefore, the Equation 29 should read:

$$S_{PAY} = 1 - \frac{2A - \frac{\Delta V p}{V p}}{\phi((\rho_{BR} - \rho_{BPAY}))} \qquad \text{Equation 29}$$

Column 16,
Line 28, the part of the formula reading "$g\sqrt{g^2 + SIN^2\theta}$" should read -- $g\sqrt{g^2 - SIN^2\theta}$ --.
Therefore, Equation 108 should read:

$$\left(\frac{2SIN^3\theta}{g\sqrt{g^2 - SIN^2\theta}} - \frac{2SIN\theta COS\theta}{g}\right) \qquad \text{Equation 108}$$

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

Page 4 of 63

It is certified that error appears in the above-identified patent and that said Letters Patent is hereby corrected as shown below:

<u>Column 17, line 22, through Column 26, line 4 (cont'd),</u>
Change "In summary, what has been shown are the following methods to determine pay saturation ($S_{PAY}$) and water saturation ($S_w$) of subsurface layers, from surface seismic data.

1. A method to determine pay saturation ($S_{PAY}$) of subsurface isotropic layers for P-P data, comprising the following steps:
   a) Positioning and employing a plurality of seismic wave source-detector pairs having different offsets and one common horizontal midpoint.
   b) Generating seismic waves with said sources, and detecting and recording the amplitudes of seismic waves reflected by discontinuities in isotropic parameters of said strata for each source-detector pair.
   c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces.
   d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by their tuning effects.
   e) Velocity correcting the data using hyperbolic or nonhyperbolic methods, the result of which will be to produce optimally flat events.
   f) Extracting amplitudes for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample.
   g) Calculating the angle of incidence ($\theta$) using the velocity function and the source receiver separations for each sample or lobe for each trace.
   h) Fitting the extracted amplitudes using the above method along with the corresponding angles of incidence ($\theta$) resulting in the optimal data derived fit parameters (the curve shape parameters) $A$, $B$ and $C$ if Equation 1 is used or $B_0$, $B_1$ and $B_2$ if Equation 2 is used.
   i) Extracting the rock property contrasts from the curve shaped parameters using Equations 3, 4 and 5 if $A$, $B$ and $C$ are used, or Equations 6, 7 and 8 if $B_0$, $B_1$ and $B_2$ are used.
   j) By determining the density contrast using Equation 3 if $A$, $B$ and $C$ are used, or Equation 6 if $B_0$, $B_1$ and $B_2$ are used, along with Equation 9, the water saturation will be given by Equation 10 or Equation 14, respectively.

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), k) Calculating the pay saturation using Equation 11 and resulting in Equation 12 in the case of $A$, $B$ and $C$, or resulting in Equation 15 in the case of $B_0$, $B_1$ and $B_2$.

2. A method to determine pay saturation $(S_{PAY})$ of subsurface anisotropic layers for P-P data, comprising the following steps:

a) Positioning and employing a plurality of seismic wave source-detector pairs having different offsets and one common horizontal midpoint.

b) Generating seismic waves with said sources, and detecting and recording the amplitudes of seismic waves reflected by discontinuities in anisotropic parameters of said strata for each source-detector pair.

c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces.

d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by their tuning effects.

e) Velocity correcting the data using hyperbolic or nonhyperbolic methods, the result of which will be to produce optimally flat events.

f) Extracting amplitudes for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample.

g) Calculating the angle of incidence $(\theta)$ by using the velocity function and the source receiver separations for each sample or lobe for each trace.

h) Fitting the extracted amplitudes using the above method along with the corresponding angles of incidence $(\theta)$ resulting in the optimal data derived fit parameters (the curve shape parameters) $A$, $B$ and $C$ if Equation 16 is used, or $B_0$, $B_1$ and $B_2$ if Equation 17 is used.

i) Extracting the rock property contrasts from the curve shaped parameters using Equations 18, 19, 20, 21 and 22 if $A$, $B$ and $C$ are used, or Equations 23, 24, 25, 26 and 27 if $B_0$, $B_1$ and $B_2$ are used.

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

<u>Column 17, line 22, through Column 26, line 4 (cont'd),</u>

This method provides four ways of calculating $S_w$ and $S_{PAY}$:

j) By determining the density contrast using Equation 18 if $A$, $B$ and $C$ are used, or Equation 23 if $B_0$, $B_1$ and $B_2$ are used, along with Equation 9, the $S_w$ will be given by Equation 28 or Equation 30, respectively.

k) Calculating the $S_{PAY}$ using Equation 11 results in Equation 29 in the case of $A$, $B$ and $C$, or Equation 31 in the case of $B_0$, $B_1$ and $B_2$.

l) Using Equations 38 and 21, $S_w$ can be found in the case where $A$, $B$ and $C$ are used. Equations 38 and 27 can be used when $B_0$, $B_1$ and $B_2$ are used.

m) Using Equations 39 and 21, $S_{PAY}$ can be found in the case where $A$, $B$ and $C$ are used. Equations 39 and 27 can be used when $B_0$, $B_1$ and $B_2$ are used.

n) Using Equations 42 and 22, $S_w$ can be found in terms of $A$, $B$ and $C$, or Equations 42 and 26 can be used in the case where $B_0$, $B_1$ and $B_2$ are used.

o) Using Equations 11, 42 and 22, $S_{PAY}$ can be found in terms of $A$, $B$ and $C$, or Equations 11, 42 and 26 can be used in the case where $B_0$, $B_1$ and $B_2$ are used.

p) Using Equations 44 and 22, $S_w$ can be found in terms of $A$, $B$ and $C$, or Equations 44 and 26 can be used in the case where $B_0$, $B_1$ and $B_2$ are used.

q) Using Equations 11, 44 and 22, $S_{PAY}$ can be found in terms of $A$, $B$ and $C$, or Equations 11, 44 and 26 can be used in the case where $B_0$, $B_1$ and $B_2$ are used.

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

<u>Column 17, line 22, through Column 26, line 4 (cont'd),</u>

3. A method to determine pay saturation $(S_{PAY})$ of subsurface layers when a contact event is evident within the layers, comprising the following steps:
   a) Positioning and employing a plurality of seismic wave source-detector pairs having different offsets and one common horizontal midpoint.
   b) Generating seismic waves with said sources, and detecting and recording the amplitudes of seismic waves reflected by discontinuities in isotropic parameters of said strata for each source-detector pair.
   c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces.
   d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by their tuning effects.
   e) Velocity correcting the data using hyperbolic or nonhyperbolic methods, the result of which will be to produce optimally flat events.
   f) Extracting amplitudes for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample.
   g) Calculating the angle of incidence $(\theta)$ by using the velocity function and the source receiver separations for each sample or lobe for each trace.
   h) Fitting the amplitudes extracted from the contact events using Equations 45 or 46 resulting in the optimal data derived fit parameters—the curve shape parameters $A$, $B$ and $C$, or $B_0$, $B_1$ and $B_2$, respectively.
   i) Extracting the rock property contrasts from the curve shaped parameters described above using Equations 47 or 51.
   j) Using the density contrast resulting from Equation 3, along with Equation 20, the water saturation can be calculated giving Equations 49 or 53.
   k) Calculating the pay saturation gives Equations 50 or 54.
4. A method to determine pay saturation $(S_{PAY})$ of subsurface isotropic or anisotropic layers for P-P data, comprising the following steps:

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), a) Positioning and employing a plurality of seismic wave source-detector pairs having different offsets and one common horizontal midpoint.

b) Generating seismic waves with said sources, and detecting and recording the amplitudes of seismic waves reflected by discontinuities in isotropic parameters of said strata for each source-detector pair.

c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces.

d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by their tuning effects.

e) Velocity correcting the data using hyperbolic or nonhyperbolic methods, the result of which will be to produce optimally flat events.

f) Calculating the angle of incidence $(\theta)$ by using the velocity function and the source receiver separations for each sample or lobe for each trace.

g) Angle stacking of the data through various angle ranges $\theta_s$ and $\theta_e$.

h) Extracting amplitudes for each horizon from each angle stack in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample.

i) Fitting the extracted angle stack amplitudes using the above method, resulting in the optimal data derived fit parameters (the curve shape parameter) $A$, $B$ and $C$, or $B_0$, $B_1$ and $B_2$ using Equation 60 or 64.

j) Extracting the rock property contrasts from the curve shaped parameters using Equations 68, 69 and 70 if $A$, $B$ and $C$ are used, or Equations 71, 72 and 73 if $B_0$, $B_1$ and $B_2$ are used.

k) Using the density contrast resulting from Equation 70 or 73, along with Equation 20, the water saturation can be calculated giving Equations 75 or 77.

l) Calculating the pay saturation using Equation 11 gives Equations 76 and 78.

This method provides three ways of calculating $S_w$ and $S_{PAY}$.

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), m) By determining the density contrast using Equation 70 if $A$, $B$ and $C$ are used, or Equation 73 if $B_0$, $B_1$ and $B_2$ are used, along with Equation 9, the water saturation will be given by Equation 75 or Equation 77, respectively.

n) Calculating the pay saturation using Equation 11 results in Equation 76 in the case of $A$, $B$ and $C$ or Equation 78 in the case of $B_0$, $B_1$ and $B_2$.

o) Using Equations 85 and 69, $S_w$ can be found in the case where $A$, $B$ and $C$ are used. Equations 85 and 72 can be used when $B_0$, $B_1$ and $B_2$ are used.

p) Using Equations 86 and 69, $S_{PAY}$ can be found in the case where $A$, $B$ and $C$ are used. Equations 86 and 72 can be used when $B_0$, $B_1$ and $B_2$ are used.

q) Using Equations 89 and 68, $S_w$ can be found in terms of $A$, $B$ and $C$, or Equations 89 and 71 can be used in the case where $B_0$, $B_1$ and $B_2$ are used.

r) Using Equations 89, 11 and 68, $S_{PAY}$ can be found in terms of $A$, $B$ and $C$, or Equations 89, 11 and 71 can be used in the case where $B_0$, $B_1$ and $B_2$ are used.

s) Using Equations 91 and 68, $S_w$ can be found in terms of $A$, $B$ and $C$, or Equations 91 and 71 can be used in the case where $B_0$, $B_1$ and $B_2$ are used.

t) Using Equations 91, 11 and 68, $S_{PAY}$ can be found in terms of $A$, $B$ and $C$, or Equations 91, 11 and 71 can be used in the case where $B_0$, $B_1$ and $B_2$ are used.

5. A method to determine pay saturation $(S_{PAY})$ of subsurface anisotropic or isotropic layers for P-P data, comprising the following steps:

a) Positioning and employing a plurality of seismic wave source-detector pairs having different offsets and one common horizontal midpoint.

b) Generating seismic waves with said sources, and detecting and recording the amplitudes of seismic waves reflected by discontinuities in isotropic parameters of said strata for each source-detector pair.

c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces.

d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by their tuning effects.

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), e) Velocity correcting the data using hyperbolic or nonhyperbolic methods, the result of which will be to produce optimally flat events.

f) Calculating the angle of incidence $(\theta)$ to be determined using the velocity function and the source receiver separations for each sample or lobe for each trace.

g) Angle stacking of the data through various angle ranges, $\theta_s$ and $\theta_e$, will be performed.

h) Extracting amplitudes from the angle stacks for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample.

i) Generating the OSA by making linear combinations of the angle stacks or products of linear combinations using Equations 101 and 102, or products of linear combinations of the angle stacks, so as to generate a quantity which is strongly sensitive to the value of the water saturation $S_w$, or pay saturation $S_{PAY}$. See Figure 10. Using Equations 92 or 96 and 100, establish relationships between the OSA's and rock property contrasts.

j) Using Equations 74, 84, 88 and other well known relationships, relating the rock property contrasts to the water saturation, $S_W$, and pay saturation, $S_{PAY}$.

k) Relating the water saturation, $S_W$, and pay saturation, $S_{PAY}$, using Equation 100 and the relationships from item "j."

l) Displaying the OSA attributes in 2-D or 3-D and using them as a discriminating tool to find fully saturated layers and allowing the avoidance of low pay saturation layers.

6. A method to determine pay saturation $(S_{PAY})$ of subsurface layers for P-S data, comprising the following steps:

a) Positioning and employing a plurality of seismic wave source-detector pairs having different offsets and one common horizontal midpoint.

b) Generating seismic waves with said sources, and detecting and recording the amplitudes of seismic waves reflected by discontinuities in isotropic, anisotropic or absorption parameters of said strata for each source-detector pair.

c) Acquiring seismic data by using a collection of sources and a collection of receivers with the data acquired in either 2-D or 3-D to be sorted into common reflection point (CRP), gathers which have a common reflection point with varying offsets for each of the traces as represented in this ensemble of traces.

d) Providing amplitude corrections to the data to eliminate effects associated with spherical divergence, array effects, transmission effects, absorption effects, and other effects associated with energy

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), propagating through and reflecting from subsurface horizons and emerging back at the surface and being received by hydrophone or geophone recording devices. These corrections can be of a deterministic, statistical or combined nature. These corrections will result in amplitudes which now are governed purely by rock property contrasts in the subsurface and by their tuning effects.

e) Velocity correcting the data using hyperbolic or nonhyperbolic methods, the result of which will be to produce optimally flat events.

f) Extracting amplitudes for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample.

g) Calculating the angle of incidence $(\theta)$ to be determined using the velocity function and the source receiver separations for each sample or lobe for each trace.

h) Fitting the extracted amplitudes using the above method resulting in the optimal data derived fit parameters (the curve shape parameter) $D_0$ and $D_i$ using Equation 104.

i) Extracting the rock property contrasts from the curve shaped parameters described above using Equations 105 and 106.

j) Using the density contrast resulting from Equations 105 and 106, along with Equation 109, to calculate the water saturation giving Equation 113.

k) Calculating the pay saturation using Equation 114.

7. A method to determine pay saturation $(S_{PAY})$ of subsurface isotropic layers for P-P data, comprising the following steps:

a) positioning and employing a plurality of seismic wave source-detector pairs having different offsets and one common horizontal midpoint;

b) generating seismic waves with the source-detector pairs, and detecting and recording into traces, as seismic data samples, the amplitudes of seismic waves reflected by discontinuities in the subsurface isotropic layers, for each source-detector pair;

c) sorting the traces into common midpoint (CMP) gathers, which have a common midpoint or reflection point, and have varying offsets;

d) providing amplitude corrections to the seismic data samples to eliminate effects associated with spherical divergence, array effects, transmission effects, absorption effects, and other effects associated with energy propagating through and reflecting from subsurface horizons;

e) modifying the seismic data samples to generate velocity-corrected seismic data samples;

f) extracting amplitudes from the seismic data samples, for each subsurface horizon, to generate extracted amplitudes;

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), g) calculating the angle of incidence $(\theta)$ by using a velocity function and source receiver separations, for each seismic data sample;

h) fitting the extracted amplitudes and the corresponding angles of incidence $(\theta)$ to the following equation, $$AMP(\theta) = A + B\,SIN^2\,\theta + C\,(\,TAN^2\,\theta - SIN^2\,\theta)$$

where:

$$A = \frac{1}{2}\frac{\Delta Vp}{Vp} + \frac{1}{2}\frac{\Delta\rho}{\rho}$$

$$B = \frac{1}{2}\frac{\Delta Vp}{Vp} - \frac{2}{g^2}\left(2\frac{\Delta Vs}{Vs} + \frac{\Delta\rho}{\rho}\right) + \frac{1}{2}\Delta\delta$$

$$C = \frac{1}{2}\frac{\Delta Vp}{Vp} + \frac{1}{2}\Delta\varepsilon$$

to generate curve shape parameters $A$, $B$ and $C$;

i) extracting rock property contrasts from the curve shape parameters using the following equations, $$\frac{\Delta\rho}{\rho} = 2(A - C)$$

$$\frac{\Delta Vp}{Vp} = 2C$$

$$\frac{\Delta Vs}{Vs} = (C - A) + \frac{g^2}{4}(C - B);$$

j) determining the density contrast using the following equation, $$S_w = \frac{\Delta\rho}{\phi(\rho_{BR} - \rho_{PAY})}$$

determining the water saturation by the following equation, $$S_w = \frac{2(A - C)\overline{\rho}}{\phi(\rho_{BR} - \rho_{PAY})}\;;\;\text{and}$$

k) calculating the pay saturation using the following equations:

$$S_{PAY} = 1 - S_w \quad \text{and} \quad S_{PAY} = 1 - \frac{2(A - C)\overline{\rho}}{\phi(\rho_{BR} - \rho_{PAY})}$$

8. A method to determine pay saturation $(S_{PAY})$ of subsurface isotropic layers for P-P data, comprising the following steps:

UNITED STATES PATENT AND TRADEMARK OFFICE
CERTIFICATE OF CORRECTION

PATENT NO.   : 6,421,611 B1
DATED        : July 16, 2002
INVENTOR(S)  : Kelly et al.

It is certified that error appears in the above-identified patent and that said Letters Patent is hereby corrected as shown below:

<u>Column 17, line 22, through Column 26, line 4 (cont'd),</u> a) positioning and employing a plurality of seismic wave source-detector pairs having different offsets and one common horizontal midpoint;

b) generating seismic waves with the source-detector pairs, and detecting and recording into traces, as seismic data samples, the amplitudes of seismic waves reflected by discontinuities in the subsurface isotropic layers, for each source-detector pair;

c) sorting the traces into common midpoint (CMP) gathers, which have a common midpoint or reflection point, and have varying offsets;

d) providing amplitude corrections to the seismic data samples to eliminate effects associated with spherical divergence, array effects, transmission effects, absorption effects, and other effects associated with energy propagating through and reflecting from subsurface horizons;

e) modifying the seismic data samples to generate velocity-corrected seismic data samples;

f) extracting amplitudes from the seismic data samples, for each subsurface horizon, to generate extracted amplitudes;

g) calculating the angle of incidence $(\theta)$ by using a velocity function and source receiver separations, for each seismic data sample;

h) fitting the extracted amplitudes and the corresponding angles of incidence $(\theta)$ to the following equation,
$AMP(\theta) = B_0 + B_1 \sin^2\theta + B_2(\tan^2\theta - \sin^2\theta)$ Where:

$$B_0 = A = \frac{1}{2}\frac{\Delta Vp}{Vp} + \frac{1}{2}\frac{\Delta \rho}{\rho}$$

$$B_1 = B = \frac{1}{2}\frac{\Delta Vp}{Vp} - \frac{2}{g^2}\left(2\frac{\Delta Vs}{Vs} + \frac{\Delta \rho}{\rho}\right)$$

$$B_2 = C - B = \frac{2}{g^2}\left(2\frac{\Delta Vs}{Vs} + \frac{\Delta \rho}{\rho}\right)$$

Where:

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), $$g = \frac{\overline{Vp}}{\overline{Vs}}$$

$$\frac{\Delta Vp}{\overline{Vp}} = \frac{Vp_2 - Vp_1}{\overline{Vp}}$$

$$\frac{\Delta Vs}{\overline{Vs}} = \frac{Vs_2 - Vs_1}{\overline{Vs}}$$

$$\frac{\Delta \rho}{\overline{\rho}} = \frac{\rho_2 - \rho_1}{\overline{\rho}}$$

$$\overline{Vp} = \frac{Vp_1 + Vp_2}{2}$$

$$\overline{Vs} = \frac{Vs_1 + Vs_2}{2}$$

$$\overline{\rho} = \frac{\rho_1 + \rho_2}{2}$$

i) to generate curve shape parameters $B_0$, $B_1$ and $B_2$;

j) extracting rock property contrasts from the curve shape parameters using the following equations, Equations 6, 7 and 8 if $B_0$, $B_1$ and $B_2$ are used $$\frac{\Delta \rho}{\rho} = 2(B_0 - B_1 - B_2)$$

$$\frac{\Delta Vp}{Vp} = 2C = 2(B_1 + B_2)$$

$$\frac{\Delta Vs}{Vs} = B_0 - B_1 - B_2\left(1 + \frac{g^2}{4}\right)$$

determining the density contrast using the following equation, $$S_w = \frac{\Delta \rho}{\phi(\rho_{BR} - \rho_{PAY})}$$

k) determining the water saturation by the following equation, $$S_W = \frac{2(B_0 - B_1 - B_2)\overline{\rho}}{\phi(\rho_{BR} - \rho_{PAY})} \text{ ; and}$$

l) calculating the pay saturation using the following equations:

$$S_{PAY} = 1 - S_w \quad \text{and} \quad S_{PAY} = 1 - \frac{2(B_0 - B_1 - B_2)\overline{\rho}}{\phi(\rho_{BR} - \rho_{PAY})}$$

Although this detailed description has shown and described illustrative embodiments of the invention, this

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), description contemplates a wide range of modifications, changes, and substitutions. In some instances, one may employ some features of the present invention without a corresponding use of the other features. Accordingly, it is appropriate that readers should construe the appended claims broadly, and in a manner consistent with the scope of the invention."

to

-- In summary, what has been shown are the following methods to determine pay saturation ($S_{PAY}$) and water saturation ($S_w$) of subsurface layers, from surface seismic data.

With Reference to Figure 15:
1. A method 1000 to determine pay saturation ($S_{PAY}$) of subsurface isotropic layers for P-P data, comprising the following steps:
   a) Positioning and employing a plurality of seismic wave source-detector pairs having different offsets and one common horizontal midpoint. (Step 1002)
   b) Generating seismic waves with said sources, and detecting and recording the amplitudes of seismic waves reflected by discontinuities in isotropic parameters of said strata for each source-detector pair. (Step 1004)
   c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces. (Step 1006)
   d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. (Step 1010) These corrections can be of a deterministic or statistical or combined nature. These corrections will result in amplitudes which now are governed purely by rock property contrasts in the subsurface and by their tuning effects.
   e) Velocity correcting the data using hyperbolic or nonhyperbolic methods, the result of which will be to produce optimally flat events. (Step 1012)
   f) Extracting amplitudes for each horizon in either of two ways. The first is to find the zero crossings of the trace, then find the extrema value between the zero crossings. Those extrema values will then be assigned to each sample of the data between the zero crossings. This is the lobe method. The second

UNITED STATES PATENT AND TRADEMARK OFFICE
CERTIFICATE OF CORRECTION

PATENT NO. : 6,421,611 B1  
DATED : July 16, 2002  
INVENTOR(S) : Kelly et al.

Page 16 of 63

It is certified that error appears in the above-identified patent and that said Letters Patent is hereby corrected as shown below:

Column 17, line 22, through Column 26, line 4 (cont'd), method is to extract the amplitude sample-by-sample. (Steps 1014)

g) Calculating the angle of incidence $(\theta)$ by using the velocity function and the source receiver separations for each sample or lobe for each trace. (Step 1016)

With reference to Figures 15 and 16:

h) Fitting the extracted amplitudes using the above method along with the corresponding angles of incidence $(\theta)$ resulting in the optimal data derived fit parameters (the curve shape parameters) $A$, $B$ and $C$ if Equation 1 is used (Step 1018), or $B_0$, $B_1$ and $B_2$ if Equation 2 is used (Step 2016).

i) Extracting the rock property contrasts from the curve shaped parameters using Equations 3, 4 and 5 if $A$, $B$ and $C$ are used (Step 1020), or Equations 6, 7 and 8 if $B_0$, $B_1$ and $B_2$ are used (Step 2018).

j) By determining the density contrast using Equation 3 if $A$, $B$ and $C$ are used (Step 1022), or Equation 6 if $B_0$, $B_1$ and $B_2$ are used (Step 2018), along with Equation 9, the water saturation will be given by Equation 10 (Step 1024) or Equation 14 (Step 2022), respectively.

k) Calculating the pay saturation using Equation 11 and resulting in Equation 12 in the case of $A$, $B$ and $C$ (Step 1026), or resulting in Equation 15 in the case of $B_0$, $B_1$ and $B_2$. (Step 2024)

With reference to Figures 17 and 18:

2. A method 3000 or 4000 to determine pay saturation $(S_{PAY})$ of subsurface anisotropic layers for P-P data, comprising the following steps:

a) Positioning and employing a plurality of seismic wave source-detector pairs having different offsets and one common horizontal midpoint. (Step 3002)

b) Generating seismic waves with said sources, and detecting and recording the amplitudes of seismic waves reflected by discontinuities in anisotropic parameters of said strata for each source-detector pair. (Step 3004)

c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces. (Step 3006)

d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. (Step 3008) These corrections can be of a deterministic or statistical or combined nature. These corrections will result in amplitudes which now are governed purely by rock property contrasts in the subsurface and by their tuning effects.

e) Velocity correcting the data using hyperbolic or nonhyperbolic methods, the result of which will be to

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), produce optimally flat events. (Step 3010)

f) Extracting amplitudes for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample. (Step 3012)

g) Calculating the angle of incidence $(\theta)$ by using the velocity function and the source receiver separations for each sample or lobe for each trace. (Step 3014)

h) Fitting the extracted amplitudes using the above method along with the corresponding angles of incidence $(\theta)$ resulting in the optimal data derived fit parameters (the curve shape parameters) $A$, $B$ and $C$ if Equation 16 is used (Step 3016), or $B_0$, $B_1$ and $B_2$ if Equation 17 is used (Step 4002)

i) Extracting the rock property contrasts from the curve shaped parameters using Equations 18, 19, 20, 21 and 22 if $A$, $B$ and $C$ are used (Step 3018), or Equations 23, 24, 25, 26 and 27 if $B_0$, $B_1$ and $B_2$ are used (Step 4004).

With reference to Figures 18 through 22:

The methods 3000 and 4000 provide four ways of calculating $S_w$ and $S_{PAY}$ (methods 5000, 6000, 7000, and 8000):

j) By determining the density contrast using Equation 18 if $A$, $B$ and $C$ are used, or Equation 23 if $B_0$, $B_1$ and $B_2$ are used, along with Equation 9, the $S_w$ will be given by Equation 28 (Step 3020) or Equation 30 (Step 5002), respectively.

k) Calculating the $S_{PAY}$ using Equation 11 results in Equation 29 in the case of $A$, $B$ and $C$, (Step 3022) or Equation 31 in the case of $B_0$, $B_1$ and $B_2$ (Step 5004).

l) Using Equations 38 and 21, $S_w$ can be found in the case where $A$, $B$ and $C$ are used (Step 3024). Equations 38 and 27 can be used when $B_0$, $B_1$ and $B_2$ are used. (Step 6002)

m) Using Equations 39 and 21, $S_{PAY}$ can be found in the case where $A$, $B$ and $C$ are used. (Step 3026) Equations 39 and 27 can be used when $B_0$, $B_1$ and $B_2$ are used. (Step 6004)

n) Using Equations 42 and 22, $S_w$ can be found in terms of $A$, $B$ and $C$ (Step 3028), or Equations 42 and 26 can be used in the case where $B_0$, $B_1$ and $B_2$ are used. (Step 7002)

o) Using Equations 11, 42 and 22, $S_{PAY}$ can be found in terms of $A$, $B$ and $C$ (Step 3030), or Equations 11, 42 and 26 can be used in the case where $B_0$, $B_1$ and $B_2$ are used. (Step 7004)

p) Using Equations 44 and 22, $S_w$ can be found in terms of $A$, $B$ and $C$ (Step 3032), or Equations 44 and 26 can be used in the case where $B_0$, $B_1$ and $B_2$ are used. (Step 8002)

q) Using Equations 11, 44 and 22, $S_{PAY}$ can be found in terms of $A$, $B$ and $C$ (Step 3034), or Equations 11, 44 and 26 can be used in the case where $B_0$, $B_1$ and $B_2$ are used. (Step 8004)

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd),

With reference to Figure 23:
3. A method 9000 to determine pay saturation $(S_{PAY})$ of subsurface layers when a contact event is evident within the layers, comprising the following steps:
   a) Positioning and employing a plurality of seismic wave source-detector pairs having different offsets and one common horizontal midpoint. (Step 9002)
   b) Generating seismic waves with said sources, and detecting and recording the amplitudes of seismic waves reflected by discontinuities in isotropic parameters of said strata for each source-detector pair. (Step 9004)
   c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces. (Step 9006)
   d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by their tuning effects. (Step 9008)
   e) Velocity correcting the data using hyperbolic or nonhyperbolic methods, the result of which will be to produce optimally flat events. (Step 9010)
   f) Extracting amplitudes for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample. (Step 9012)
   g) Calculating the angle of incidence $(\theta)$ by using the velocity function and the source receiver separations for each sample or lobe for each trace. (Step 9014)

With reference to Figures 24 and 25:
   h) Fitting the amplitudes extracted from the contact events using Equations 45 or 46 resulting in the optimal data derived fit parameters—the curve shape parameters $A$, $B$ and $C$, (Step 10002) or $B_0$, $B_1$ and $B_2$ (Step 11002), respectively.
   i) Extracting the rock property contrasts from the curve shaped parameters described above using Equations 47 (Step 10004) or 51 (Step 11004).
   j) Using the density contrast resulting from Equation 3, along with Equation 20, the water saturation can be calculated giving Equations 49 (Step 10006) or 53 (Step 11006).

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), k) Calculating the pay saturation gives Equations 50 (Step 10008) or 54 (Step 11008).

With reference to Figure 26:

4. A method 12000 to determine pay saturation $(S_{PAY})$ of subsurface isotropic or anisotropic layers for P-P data, comprising the following steps:

a) Positioning and employing a plurality of seismic wave source-detector pairs having different offsets and one common horizontal midpoint. (Step 12002)

b) Generating seismic waves with said sources, and detecting and recording the amplitudes of seismic waves reflected by discontinuities in isotropic parameters of said strata for each source-detector pair. (Step 12004)

c) Acquiring seismic data by using a collection of sources and a collection of receivers with the data acquired in either 2-D or 3-D to be sorted into common midpoint (CMP), also known as CDP, gathers which have a common midpoint or reflection point with varying offsets for each of the traces as represented in this ensemble of traces. (Step 12006)

d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by their tuning effects. (Step 12008)

e) Velocity correcting the data using hyperbolic or nonhyperbolic methods, the result of which will be to produce optimally flat events. (Step 12010)

f) Calculating the angle of incidence $(\theta)$ by using the velocity function and the source receiver separations for each sample or lobe for each trace. (Step 12012)

g) Angle stacking of the data through various angle ranges $\theta_s$ and $\theta_e$. (Step 12014)

h) Extracting amplitudes for each horizon from each angle stack in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample. (Step 12016)

With reference to Figures 27 and 28:

i) Fitting the extracted angle stack amplitudes using the above method, resulting in the optimal data derived fit parameters (the curve shape parameter) $A$, $B$ and $C$, or $B_0$, $B_1$ and $B_2$ using Equation 60 (Step 13002) or 64 (Step 14002).

j) Extracting the rock property contrasts from the curve shaped parameters using Equations 68, 69 and 70 if

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), $A$, $B$ and $C$ are used (Step 13004), or Equations 71, 72 and 73 if $B_0$, $B_1$ and $B_2$ are used (Step 14004).

k) Using the density contrast resulting from Equation 70 or 73, along with Equation 20, the water saturation can be calculated giving Equations 75 (Step 13006) or 77 (Step 14006).

l) Calculating the pay saturation using Equation 11 gives Equations 76 (Step 13008) and 78 (Step 14008).

With reference to Figures 29, 30 and 31:

This method provides three ways 15000, 16000, and 17000 of calculating $S_w$ and $S_{PAY}$.

m) By determining the density contrast using Equation 70 if $A$, $B$ and $C$ are used, or Equation 73 if $B_0$, $B_1$ and $B_2$ are used, along with Equation 9, the water saturation will be given by Equation 75 (Step 13006) or Equation 77 (Step 14006), respectively.

n) Calculating the pay saturation using Equation 11 results in Equation 76 in the case of $A$, $B$ and $C$ (Step 13008) or Equation 78 in the case of $B_0$, $B_1$ and $B_2$ (Step 14008)

o) Using Equations 85 and 69, $S_w$ can be found in the case where $A$, $B$ and $C$ are used Step 15002). Equations 85 and 72 can be used when $B_0$, $B_1$ and $B_2$ are used (Step 16002).

p) Using Equations 86 and 69, $S_{PAY}$ can be found in the case where $A$, $B$ and $C$ (See Step 13004) are used. Equations 86 and 72 can be used when $B_0$, $B_1$ and $B_2$ (See Step 14004) are used. (Step 15004)

q) Using Equations 89 and 68, $S_w$ can be found in terms of $A$, $B$ and $C$, (See Step 13004) or Equations 89 and 71 can be used in the case where $B_0$, $B_1$ and $B_2$ (See Step 14004) are used. (Step 16002)

r) Using Equations 89, 11 and 68, $S_{PAY}$ can be found in terms of $A$, $B$ and $C$ (See Steps 8004, 13004), or Equations 89, 11 and 71 can be used in the case where $B_0$, $B_1$ and $B_2$ (See Steps 8004, 14004) are used. (Step 16002)

s) Using Equations 91 and 68, $S_w$ can be found in terms of $A$, $B$ and $C$, or Equations 91 and 71 can be used in the case where $B_0$, $B_1$ and $B_2$ are used. (Step 17002)

t) Using Equations 91, 11 and 68, $S_{PAY}$ can be found in terms of $A$, $B$ and $C$, or Equations 91, 11 and 71 can be used in the case where $B_0$, $B_1$ and $B_2$ are used. (Step 17002)

With reference to Figures 26, 32 and 33:

5. A method 18000 to determine pay saturation $(S_{PAY})$ of subsurface anisotropic or isotropic layers for P-P data, comprising the following steps:

a) Positioning and employing a plurality of seismic wave source-detector pairs having different offsets and one common horizontal midpoint. (Step 12002)

b) Generating seismic waves with said sources, and detecting and recording the amplitudes of seismic waves reflected by discontinuities in isotropic parameters of said strata for each source-detector pair. (Step 12004)

c) Acquiring seismic data by using a collection of sources and a collection of receivers with the data acquired in either 2-D or 3-D to be sorted into common midpoint (CMP), also known as CDP, gathers

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), which have a common midpoint or reflection point with varying offsets for each of the traces as represented in this ensemble of traces. (Step 12006)

d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic or statistical or combined nature. These corrections will result in amplitudes which now are governed purely by rock property contrasts in the subsurface and by their tuning effects. (Step 12008)

e) Velocity correcting the data using hyperbolic or nonhyperbolic methods, the result of which will be to produce optimally flat events. (Step 12010)

f) Calculating the angle of incidence $(\theta)$ to be determined using the velocity function and the source receiver separations for each sample or lobe for each trace. (Step 12012)

g) Angle stacking of the data through various angle ranges, $\theta_s$ and $\theta_e$, will be performed. (Step 12014)

h) Extracting amplitudes from the angle stacks for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample. (Step 12016)

i) Generating the OSA by making linear combinations of the angle stacks or products of linear combinations using Equations 101 and 102, or products of linear combinations of the angle stacks, so as to generate a quantity which is strongly sensitive to the value of the water saturation $S_w$, or pay saturation $S_{PAY}$. See Figure 10. Using Equations 92 (Step 18002) or 96 (Step 19002) and 100, establish relationships between the OSA's and rock property contrasts.

j) Using Equations 74, 84, 88 and other well known relationships, relating the rock property contrasts to the water saturation, $S_W$, and pay saturation, $S_{PAY}$. (Steps 18004 and 19004).

k) Relating the water saturation, $S_W$, and pay saturation, $S_{PAY}$, using Equation 100 and the relationships from item "j." (Steps 18006 and 19006)

l) Displaying the OSA attributes in 2-D or 3-D and using them as a discriminating tool to find fully saturated layers and allowing the avoidance of low pay saturation layers.

With reference to Figure 34:

6. A method 20000 to determine pay saturation $(S_{PAY})$ of subsurface layers for P-S data, comprising the following steps:

a) Positioning and employing a plurality of seismic wave source-detector pairs having different offsets and one common horizontal midpoint. (Step 20002)

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

<u>Column 17, line 22, through Column 26, line 4 (cont'd),</u> b) Generating seismic waves with said sources, and detecting and recording the amplitudes of seismic waves reflected by discontinuities in isotropic, anisotropic or absorption parameters of said strata for each source-detector pair. (Step 20004)

c) Acquiring seismic data by using a collection of sources and a collection of receivers with the data acquired in either 2-D or 3-D to be sorted into common reflection point (CRP), gathers which have a common reflection point with varying offsets for each of the traces as represented in this ensemble of traces. (Step 20006)

d) Providing amplitude corrections to the data to eliminate effects associated with spherical divergence, array effects, transmission effects, absorption effects, and other effects associated with energy propagating through and reflecting from subsurface horizons and emerging back at the surface and being received by hydrophone or geophone recording devices. These corrections can be of a deterministic, statistical or combined nature. These corrections will result in amplitudes which now are governed purely by rock property contrasts in the subsurface and by their tuning effects. (Step 20008)

e) Velocity correcting the data using hyperbolic or nonhyperbolic methods, the result of which will be to produce optimally flat events. (Step 20010)

f) Extracting amplitudes for each horizon in either of two ways. The first is to find the zero crossings of the trace, then find the extrema value between the zero crossings. Those extrema values will then be assigned to each sample of the data between the zero crossings. This is the lobe method. The second method is to extract the amplitude sample-by-sample. (Step 20014)

g) Calculating the angle of incidence $(\theta)$ to be determined using the velocity function and the source receiver separations for each sample or lobe for each trace. (Step 20012)

With reference to Figure 35:

h) Fitting the extracted amplitudes using the above method resulting in the optimal data derived fit parameters (the curve shape parameter) $D_0$ and $D_i$ using Equation 104. (Step 21002)

i) Extracting the rock property contrasts from the curve shaped parameters described above using Equations 105 and 106. (Step 21002)

j) Using the density contrast resulting from Equations 105 and 106, along with Equation 109, to calculate the water saturation giving Equation 113. (Step 21004)

k) Calculating the pay saturation using Equation 114. (Step 21006)

With reference to Figure 16:

7. A method 2000 to determine pay saturation $(S_{PAY})$ of subsurface isotropic layers for P-P data, comprising the following steps:

a) positioning and employing a plurality of seismic wave source-detector pairs having different offsets and one common horizontal midpoint; (Step 2002)

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), b) generating seismic waves with the source-detector pairs, and detecting and recording into traces, as seismic data samples, the amplitudes of seismic waves reflected by discontinuities in the subsurface isotropic layers, for each source-detector pair; (Step 2004)

c) sorting the traces into common midpoint (CMP) gathers, which have a common midpoint or reflection point, and have varying offsets; (Step 2006)

d) providing amplitude corrections to the seismic data samples to eliminate effects associated with spherical divergence, array effects, transmission effects, absorption effects, and other effects associated with energy propagating through and reflecting from subsurface horizons; (Step 2008)

e) modifying the seismic data samples to generate velocity-corrected seismic data samples; (Step 2010)

f) extracting amplitudes from the seismic data samples, for each subsurface horizon, to generate extracted amplitudes; (Step 2012)

g) calculating the angle of incidence $(\theta)$ by using a velocity function and source receiver separations, for each seismic data sample; (Step 2014)

h) fitting the extracted amplitudes and the corresponding angles of incidence $(\theta)$ to the following equation,
$AMP(\theta) = A + B \, SIN^2 \, \theta + C \, (\, TAN^2 \, \theta \, - \, SIN^2 \, \theta)$
where:

$$A = \frac{1}{2}\frac{\Delta Vp}{Vp} + \frac{1}{2}\frac{\Delta \rho}{\rho}$$

$$B = \frac{1}{2}\frac{\Delta Vp}{Vp} - \frac{2}{g^2}\left(2\frac{\Delta Vs}{Vs} + \frac{\Delta \rho}{\rho}\right) + \frac{1}{2}\Delta \delta$$

$$C = \frac{1}{2}\frac{\Delta Vp}{Vp} + \frac{1}{2}\Delta \varepsilon$$

to generate curve shape parameters $A$, $B$ and $C$; (Step 2016)

i) extracting rock property contrasts from the curve shape parameters using the following equations, $$\frac{\Delta \rho}{\rho} = 2(A - C)$$

$$\frac{\Delta Vp}{Vp} = 2C$$

$$\frac{\Delta Vs}{Vs} = (C - A) + \frac{g^2}{4}(C - B);$$

j) determining the density contrast using the following equation, (Step 2018)

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), $$S_w = \frac{\Delta\rho}{\phi(\rho_{BR} - \rho_{PAY})}$$

determining the water saturation by the following equation, (Step 2020)

$$S_w = \frac{2(A-C)\bar{\rho}}{\phi(\rho_{BR} - \rho_{PAY})} \text{ ; and}$$

k) calculating the pay saturation using the following equations: (Step 2022)

$$S_{PAY} = 1 - S_w \quad \text{and} \quad S_{PAY} = 1 - \frac{2(A-C)\bar{\rho}}{\phi(\rho_{BR} - \rho_{PAY})}$$

8. A method (2000) to determine pay saturation $(S_{PAY})$ of subsurface isotropic layers for P-P data, comprising the following steps:
   a) positioning and employing a plurality of seismic wave source-detector pairs having different offsets and one common horizontal midpoint; (Step 2002)
   b) generating seismic waves with the source-detector pairs, and detecting and recording into traces, as seismic data samples, the amplitudes of seismic waves reflected by discontinuities in the subsurface isotropic layers, for each source-detector pair; (Step 2004)
   c) sorting the traces into common midpoint (CMP) gathers, which have a common midpoint or reflection point, and have varying offsets; (Step 2006)
   d) providing amplitude corrections to the seismic data samples to eliminate effects associated with spherical divergence, array effects, transmission effects, absorption effects, and other effects associated with energy propagating through and reflecting from subsurface horizons; (Step 2008)
   e) modifying the seismic data samples to generate velocity-corrected seismic data samples; (Step 2010)
   f) extracting amplitudes from the seismic data samples, for each subsurface horizon, to generate extracted amplitudes; (Step 2012)
   g) calculating the angle of incidence $(\theta)$ by using a velocity function and source receiver separations, for each seismic data sample; (Step 2014)
   h) fitting the extracted amplitudes and the corresponding angles of incidence $(\theta)$ to the following equation,
   $AMP(\theta) = B_0 + B_1 SIN^2 \theta + B_2 (TAN^2 \theta - SIN^2 \theta)$
   Where:

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), $$B_0 = A = \frac{1}{2}\frac{\Delta Vp}{Vp} + \frac{1}{2}\frac{\Delta \rho}{\rho}$$

$$B_1 = B = \frac{1}{2}\frac{\Delta Vp}{Vp} - \frac{2}{g^2}\left(2\frac{\Delta Vs}{Vs} + \frac{\Delta \rho}{\rho}\right)$$

$$B_2 = C - B = \frac{2}{g^2}\left(2\frac{\Delta Vs}{Vs} + \frac{\Delta \rho}{\rho}\right)$$

Where:

$$g = \frac{\overline{Vp}}{\overline{Vs}}$$

$$\frac{\Delta Vp}{\overline{Vp}} = \frac{Vp_2 - Vp_1}{\overline{Vp}}$$

$$\frac{\Delta Vs}{\overline{Vs}} = \frac{Vs_2 - Vs_1}{\overline{Vs}}$$

$$\frac{\Delta \rho}{\overline{\rho}} = \frac{\rho_2 - \rho_1}{\overline{\rho}}$$

$$\overline{Vp} = \frac{Vp_1 + Vp_2}{2}$$

$$\overline{Vs} = \frac{Vs_1 + Vs_2}{2}$$

$$\overline{\rho} = \frac{\rho_1 + \rho_2}{2}$$

to generate curve shape parameters $B_0$, $B_1$ and $B_2$; (Step 2016)

i) extracting rock property contrasts from the curve shape parameters using the following equations, Equations 6, 7 and 8 if $B_0$, $B_1$ and $B_2$ are used (Step 2018)

$$\frac{\Delta \rho}{\rho} = 2(B_0 - B_1 - B_2)$$

$$\frac{\Delta Vp}{Vp} = 2C = 2(B_1 + B_2)$$

$$\frac{\Delta Vs}{Vs} = B_0 - B_1 - B_2\left(1 + \frac{g^2}{4}\right)$$

j) determining the density contrast using the following equation, (Step 2020)

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), $$S_w = \frac{\Delta\rho}{\phi(\rho_{BR} - \rho_{PAY})}$$

k) determining the water saturation by the following equation, (Step 2022)

$$S_W = \frac{2(B_0 - B_1 - B_2)\overline{\rho}}{\phi(\rho_{BR} - \rho_{PAY})} \; ; \text{and}$$

l) calculating the pay saturation using the following equations: (Step 2024)

$$S_{PAY} = 1 - S_w \quad \text{and} \quad S_{PAY} = 1 - \frac{2(B_0 - B_1 - B_2)\overline{\rho}}{\phi(\rho_{BR} - \rho_{PAY})}$$

Although this detailed description has shown and described illustrative embodiments of the invention, this description contemplates a wide range of modifications, changes, and substitutions. In some instances, one may employ some features of the present invention without a corresponding use of the other features. Accordingly, it is appropriate that readers should construe the appended claims broadly, and in a manner consistent with the scope of the invention. --

Column 27, starting on line 6, change

"determining the water saturation by the following equation;

$$S_w = \frac{2(A - C)\overline{\rho}}{\phi(\rho_{BR} - \rho_{PAY})} \; ; \text{and}$$

k) calculating the pay saturation using the following equations:

$$S_{PAY} = 1 - S_w \quad \text{and} \quad S_{PAY} = 1 - \frac{2(A - C)\overline{\rho}}{\phi(\rho_{BR} - \rho_{PAY})} \text{''}$$

to

-- k) determining the water saturation by the following equation:

$$S_w = \frac{2(A - C)\overline{\rho}}{\phi(\rho_{BR} - \rho_{PAY})} \; ; \text{and}$$

l) calculating the pay saturation using the following equations:

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 17, line 22, through Column 26, line 4 (cont'd), $$S_{PAY} = 1 - S_w \quad \text{and} \quad S_{PAY} = 1 - \frac{2(A-C)\overline{\rho}}{\phi(\rho_{BR} - \rho_{PAY})} \text{ --}$$

Column 27, line 55, the portion of the formula reading "," should be "+". Thus, the formula should read:

$$AMP(\theta) = B_0 + B_1 TAN^2\theta + B_2 TAN^2\theta \, SIN^2\theta$$

Column 28, starting on line 28, change

" $\frac{\Delta Vs}{Vs} = B_0 - B_1 - B_2\left(1 + \frac{g2}{4}\right)$ determining the density contrast using the following equation, $$S_w = \frac{\Delta\rho}{\phi(\rho_{BR} - \rho_{PAY})}$$

k) determining the water saturation by the following equation, $$S_W = \frac{2(B_0 - B_1 - B_2)\overline{\rho}}{\phi(\rho_{BR} - \rho_{PAY})} \text{ ; and}$$

l) calculating the pay saturation using the following equations:

$$S_{PAY} = 1 - S_w \quad \text{and} \quad S_{PAY} = 1 - \frac{2(B_0 - B_1 - B_2)\overline{\rho}}{\phi(\rho_{BR} - \rho_{PAY})} \text{,,}$$

to

-- k) $\frac{\Delta Vs}{Vs} = B_0 - B_1 - B_2\left(1 + \frac{g2}{4}\right)$ l) determining the density contrast using the following equation, $$S_w = \frac{\Delta\rho}{\phi(\rho_{BR} - \rho_{PAY})}$$

m) determining the water saturation by the following equation, $$S_W = \frac{2(B_0 - B_1 - B_2)\overline{\rho}}{\phi(\rho_{BR} - \rho_{PAY})} \text{ ; and}$$

n) calculating the pay saturation using the following equations:

$$S_{PAY} = 1 - S_w \quad \text{and} \quad S_{PAY} = 1 - \frac{2(B_0 - B_1 - B_2)\overline{\rho}}{\phi(\rho_{BR} - \rho_{PAY})} \text{ --}$$

UNITED STATES PATENT AND TRADEMARK OFFICE
CERTIFICATE OF CORRECTION

PATENT NO. : 6,421,611 B1
DATED : July 16, 2002
INVENTOR(S) : Kelly et al.

It is certified that error appears in the above-identified patent and that said Letters Patent is hereby corrected as shown below:

Column 31,
Line 46, change "$B_0$, $B_1$ and $_2$" to -- $B_0$, $B1$ and $B_2$ --

Column 36,
Line 52, the part of the formula reading "$\left(1+\frac{k_p}{k}\right)$" should read $--\left(1-\frac{k_p}{k}\right)--$.
Therefore, the formula should read:

$$S_w = \frac{8e - 3(\Delta\varepsilon - C) \bullet (1 + k_p)}{(8e - 3(\Delta\varepsilon - C)) \bullet \left(1 - \frac{k_p}{k}\right)} \qquad 85$$

Column 38,
Line 16, the part of the formula reading: "($kb \bullet (s-1) \bullet kp \bullet s$)" should read -- ($kb \bullet (s-1) - kp \bullet s$) --. Therefore, the formula should read:

$$\Delta\delta = \frac{8 \bullet e(16 \bullet e \bullet (g-1) \bullet (9 \bullet g + 17) - 13 \bullet (3 \bullet g^2 - 2)) \bullet (kb \bullet (s-1) - kp \bullet s)}{3 \bullet (g-1) \bullet (9 \bullet g + 17) \bullet (3 \bullet g - 2) \bullet (kb \bullet (kp - s + 1) + kp \bullet s)} + C \qquad 88 --$$

Signed and Sealed this

Seventeenth Day of August, 2004

JON W. DUDAS
*Acting Director of the United States Patent and Trademark Office*

⊞ Cross: 0.50026, 0    Center: 0.47551, −0.14967    Scale: 0.13125 : 0.0625

⊞ Cross: 0.50041, 0.1    Center: 0.50041, 0.07    Scale: 0.1375 : 0.02

⊞ Cross: 0.50012, 0.074751   Center: 0.46736, 0.14003   Scale: 0.13322 : 0.040007

(A)

3016

FITTING THE EXTRACTED AMPLITUDES AND THE CORRESPONDING ANGLES OF INCIDENCE (θ) TO THE EQUATION, AMP(θ) = A + B SIN²θ+C (TAN²θ-SIN²θ ) WHERE TO GENERATE CURVE SHAPE PARAMETERS A, B AND C $$A = \frac{1}{2}\frac{\Delta Vp}{Vp} + \frac{1}{2}\frac{\Delta \rho}{\rho}$$

$$B = \frac{1}{2}\frac{\Delta VP}{Vp} - \frac{2}{g^2}\left(2\frac{\Delta Vs}{Vs} + \frac{\Delta \rho}{\rho}\right) + \frac{1}{2}\Delta\delta$$

$$C = \frac{1}{2}\frac{\Delta VP}{Vp} + \frac{1}{2}\Delta\varepsilon$$

3018

EXTRACTING ROCK PROPERTY CONTRASTS FROM THE CURVE SHAPE PARAMETERS USING THE EQUATIONS $$\frac{\Delta \rho}{\rho} = 2(A - C) + \Delta\varepsilon$$

$$\frac{\Delta Vp}{Vp} = 2C - \Delta\varepsilon$$

$$\frac{\Delta Vs}{Vs} = (C - A) + \frac{g^2}{4}(C - B) + \frac{g^2}{8}(\Delta\varepsilon - \Delta\delta) + \frac{1}{2}\Delta\varepsilon$$

$$\Delta\varepsilon = 2C - \frac{\Delta Vp}{Vp}$$

$$\Delta\delta = \frac{8}{g^2} \bullet A + 2 \bullet B - \left(1 + \frac{4}{g^2}\right)\frac{dVp}{Vp} + \frac{8dV_s}{V_s}$$

(B)

FIG. 17B

4002

FITTING THE EXTRACTED AMPLITUDES AND THE CORRESPONDING ANGLES OF INCIDENCE ($\theta$), TO THE EQUATION AMP($\theta$) = $B_0$ + $B_1$ TAN$^2\theta$+$B_2$ TAN$^2\theta$ SIN$^2\theta$ TO GENERATE CURVE SHAPE PARAMETERS $B_0$, $B_1$, AND $B_2$ $$B_0 = A = \frac{1}{2}\frac{\Delta Vp}{Vp} + \frac{1}{2}\frac{\Delta \rho}{\rho}$$

$$B_1 = B = \frac{1}{2}\frac{\Delta Vp}{Vp} - \frac{2}{g^2}\left(2\frac{\Delta Vs}{Vs} + \frac{\Delta \rho}{\rho}\right) + \frac{1}{2}\Delta\delta$$

$$B_2 = C - B = \frac{2}{g^2}\left(2\frac{\Delta Vs}{Vs} + \frac{\Delta \rho}{\rho}\right) + \frac{1}{2}\Delta\varepsilon - \frac{1}{2}\Delta\delta$$

AND WHERE $$g = \frac{\overline{Vp}}{\overline{Vs}}$$

$$\frac{\Delta Vp}{\overline{Vp}} = \frac{Vp_2 - Vp_1}{\overline{Vp}}$$

$$\frac{\Delta Vs}{\overline{Vs}} = \frac{Vs_2 - Vs_1}{\overline{Vs}}$$

$$\frac{\Delta \rho}{\overline{\rho}} = \frac{\rho_2 - \rho_1}{\overline{\rho}}$$

$$\Delta\delta = \delta_2 - \delta_1$$

$$\Delta\varepsilon = \varepsilon_2 - \varepsilon_1$$

$$\overline{Vp} = \frac{Vp_1 + Vp_2}{2}$$

$$\overline{Vs} = \frac{Vs_1 + Vs_2}{2}$$

$$\overline{\rho} = \frac{\rho_1 + \rho_2}{2}$$

4004

EXTRACTING ROCK PROPERTY CONTRASTS FROM THE CURVE SHAPE PARAMETERS USING THE EQUATIONS $$\frac{\Delta\rho}{\rho} = 2(B_0 - B_1 - B_2) + \Delta\varepsilon \qquad \frac{\Delta Vp}{Vp} = 2(B_1 + B_2) - \Delta\varepsilon$$

$$\frac{\Delta Vs}{Vs} = B_0 - B_1 - B_2\left(1 + \frac{g^2}{4}\right) + \frac{g^2}{g}(\Delta\varepsilon - \Delta\delta) + \frac{1}{2}\Delta\varepsilon$$

$$\Delta\delta = \frac{8}{g^2}B_0 + 2B_1 - \left(1 + \frac{4}{g^2}\right)\frac{dVp}{\overline{Vp}} + \frac{8dV_s}{g^2 V_s}$$

$$\Delta\varepsilon = 2(B_1 + B_2) - \frac{\Delta Vp}{\overline{Vp}}$$

FIG. 18

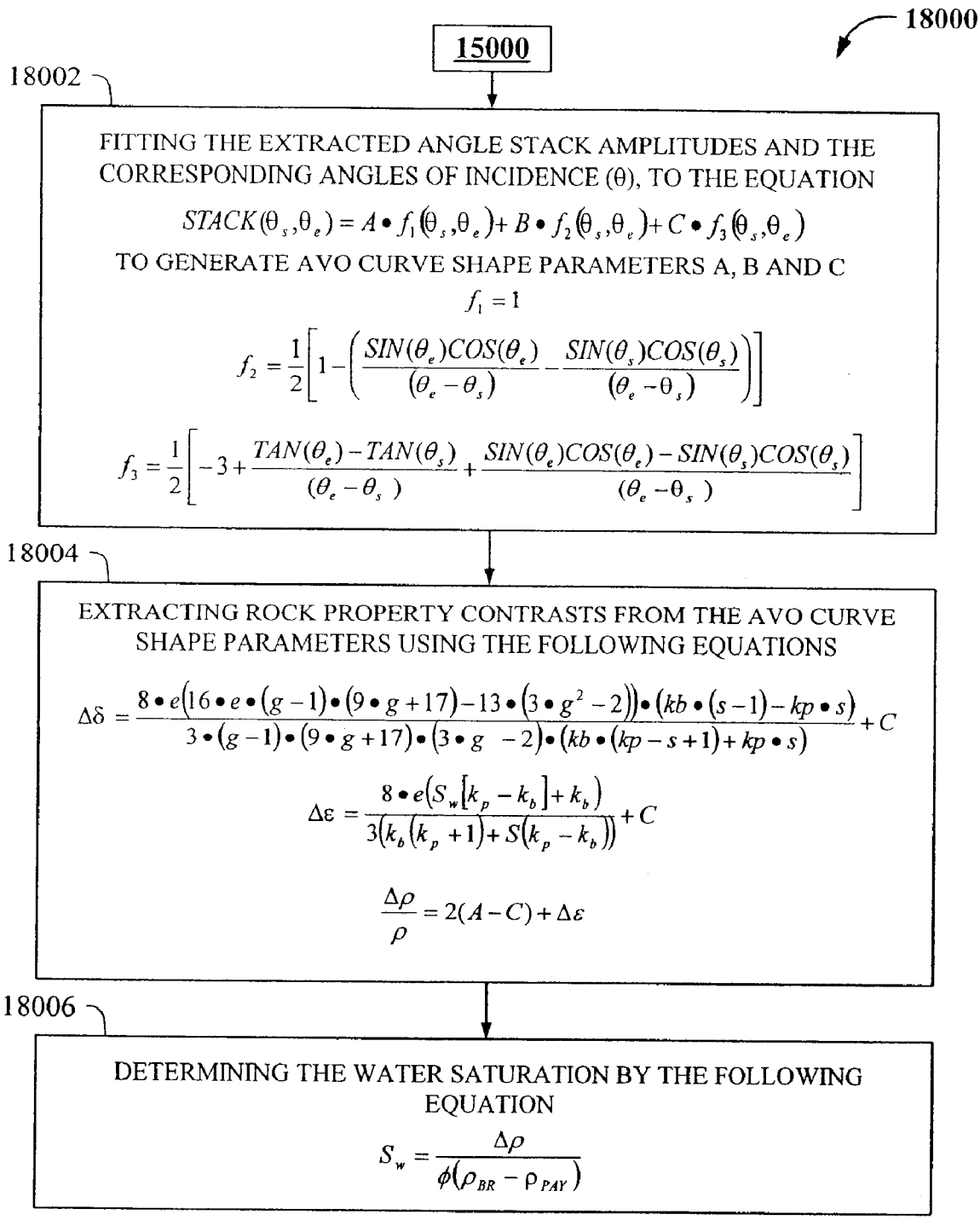

18002 — FITTING THE EXTRACTED ANGLE STACK AMPLITUDES AND THE CORRESPONDING ANGLES OF INCIDENCE ($\theta$), TO THE EQUATION $$STACK(\theta_s, \theta_e) = A \bullet f_1(\theta_s, \theta_e) + B \bullet f_2(\theta_s, \theta_e) + C \bullet f_3(\theta_s, \theta_e)$$

TO GENERATE AVO CURVE SHAPE PARAMETERS A, B AND C $$f_1 = 1$$

$$f_2 = \frac{1}{2}\left[1 - \left(\frac{SIN(\theta_e)COS(\theta_e)}{(\theta_e - \theta_s)} - \frac{SIN(\theta_s)COS(\theta_s)}{(\theta_e - \theta_s)}\right)\right]$$

$$f_3 = \frac{1}{2}\left[-3 + \frac{TAN(\theta_e) - TAN(\theta_s)}{(\theta_e - \theta_s)} + \frac{SIN(\theta_e)COS(\theta_e) - SIN(\theta_s)COS(\theta_s)}{(\theta_e - \theta_s)}\right]$$

18004 — EXTRACTING ROCK PROPERTY CONTRASTS FROM THE AVO CURVE SHAPE PARAMETERS USING THE FOLLOWING EQUATIONS $$\Delta\delta = \frac{8 \bullet e(16 \bullet e \bullet (g-1) \bullet (9 \bullet g + 17) - 13 \bullet (3 \bullet g^2 - 2)) \bullet (kb \bullet (s-1) - kp \bullet s)}{3 \bullet (g-1) \bullet (9 \bullet g + 17) \bullet (3 \bullet g - 2) \bullet (kb \bullet (kp - s + 1) + kp \bullet s)} + C$$

$$\Delta\varepsilon = \frac{8 \bullet e(S_w[k_p - k_b] + k_b)}{3(k_b(k_p + 1) + S(k_p - k_b))} + C$$

$$\frac{\Delta\rho}{\rho} = 2(A - C) + \Delta\varepsilon$$

18006 — DETERMINING THE WATER SATURATION BY THE FOLLOWING EQUATION $$S_w = \frac{\Delta\rho}{\phi(\rho_{BR} - \rho_{PAY})}$$

FIG. 32